United States Patent
Chong et al.

(10) Patent No.: US 12,089,241 B2
(45) Date of Patent: Sep. 10, 2024

(54) RESOURCE SCHEDULING METHOD FOR NETWORK SLICE AND DEVICE

(71) Applicant: Huawei Technologies Co., Ltd., Shenzhen (CN)

(72) Inventors: Weiwei Chong, Shenzhen (CN); Yang Xin, Shanghai (CN); Xiaobo Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 396 days.

(21) Appl. No.: 17/369,510

(22) Filed: Jul. 7, 2021

(65) Prior Publication Data

US 2021/0337553 A1 Oct. 28, 2021

Related U.S. Application Data

(63) Continuation of application No. PCT/CN2019/124618, filed on Dec. 11, 2019.

(30) Foreign Application Priority Data

Jan. 8, 2019 (CN) .......................... 201910017032.5
Jan. 23, 2019 (CN) .......................... 201910070695.3

(51) Int. Cl.
*H04W 72/542* (2023.01)

(52) U.S. Cl.
CPC ................................ *H04W 72/542* (2023.01)

(58) Field of Classification Search
CPC ........................... H04W 72/04; H04W 72/563
See application file for complete search history.

(56) References Cited

U.S. PATENT DOCUMENTS

2017/0289791 A1* 10/2017 Yoo .................... H04W 68/005
2017/0318468 A1   11/2017 Aijaz
(Continued)

FOREIGN PATENT DOCUMENTS

CN    107517488 A    12/2017
CN    107770794 A    3/2018
(Continued)

OTHER PUBLICATIONS

"3rd Generation Partnership Project; Technical Specification Group Services and System Aspects; Study of Enablers for Network Automation for 5G (Release 16)," 3GPP Standard; Technical Report; 3GPP TR 23.791, V16.0.0, Dec. 19, 2018, XP051591223, 121 pages.
(Continued)

*Primary Examiner* — Kevin Kim
(74) *Attorney, Agent, or Firm* — Conley Rose, P.C.

(57) ABSTRACT

A resource scheduling method for a network slice is provided, where a slice management network element sends a request to a data analysis network element. The request includes service experience requirement information of a first network slice. The slice management network element receives a response sent by the data analysis network element. The response includes information about a first area and/or information about a first time that are/is of the first network slice and that correspond/corresponds to the service experience requirement information. The slice management network element sends information about a second area and/or information about a second time to a network device based on the information about the first area and/or the information about the first time. The network device schedules a resource for the first network slice based on the information about the second area and/or the information about the second time.

21 Claims, 16 Drawing Sheets

(56) References Cited

U.S. PATENT DOCUMENTS

2019/0124704 A1    4/2019    Sun et al.
2019/0182752 A1    6/2019    Lou et al.

FOREIGN PATENT DOCUMENTS

| CN | 107889169 A | | 4/2018 | |
|---|---|---|---|---|
| EP | 3399797 B1 | * | 3/2020 | ........ H04W 36/0005 |
| JP | 2016076900 A | | 5/2016 | |
| JP | 2017200172 A | | 11/2017 | |
| WO | 2018033074 A1 | | 2/2018 | |
| WO | 2018153289 A1 | | 8/2018 | |
| WO | WO-2019024650 A1 | * | 2/2019 | ............ H04W 12/37 |

OTHER PUBLICATIONS

China Mobile et al., "Solution for Key Issue 14: How to ensure that slice SLA is guaranteed", SA WG2 Meeting #S2-129bis, S2-1813213, Oct. 26-30, 2018, West Palm Beach, Florida, USA, total 4 pages.

SA WG2 Meeting #S2-129bis, S2-1813213, "Solution for Key Issue 14: How to ensure that slice SLA is guaranteed," China Mobile, Oct. 26-30, 2018, West Palm Beach, Florida, USA, 4 pages.

3GPP TS 28.541 V15.1.0: "3rd Generation Partnership Project; Technical Specification Group Services and System Aspects; Management and orchestration; 5G Network Resource Model (NRM); Stage 2 and stage 3(Release 15)," Dec. 2018, 232 pages.

3GPP TS 28.550 V15.0.0: "3rd Generation Partnership Project; Technical Specification Group Services and System Aspects; Management and orchestration;Performance assurance(Release 15)," Dec. 2018, 61 pages.

3GPP TS 28.552 V16.0.0: "3rd Generation Partnership Project; Technical Specification Group Services and System Aspects; Management and orchestration; 5G performance measurements(Release 16)", Dec. 2018, 59 pages.

SA WG2 Meeting #S2-129-Bis, S2-1811732, Solution to Key Issue 14, Ericsson, Nov. 26-30, 2018, West Palm Beach, Florida, USA, 9 pages.

SA WG2 Meeting #S2-129bis, S2-1812127, "Solution for Key Issue 14: How to ensure that slice SLA is guaranteed," China Mobile, Oct. 26-30, 2018, West Palm Beach, Florida, USA, 5 pages.

SA WG2 Meeting #S2-129-Bis, S2-1813377, Solution to Key Issue 14, Ericsson, Verizon, Nokia, Nokia Shanghai Bell, Nov. 26-30, 2018, West Palm Beach, Florida, USA, 9 pages.

S2-1810599, China Mobile, et al., "Solution for Key Issue 14: How to ensure that slice SLA is guaranteed," SA WG2 Meeting #129, China, Dongguan, Oct. 15-19, 2018, 5 pages.

* cited by examiner

RESOURCE SCHEDULING METHOD FOR NETWORK SLICE AND DEVICE

CROSS-REFERENCE TO RELATED APPLICATIONS

This application is a continuation of International Patent Application No. PCT/CN2019/124618, filed on Dec. 11, 2019, which claims priority to Chinese Patent Application No. 201910070695.3, filed on Jan. 23, 2019, which claims priority to Chinese Patent Application No. 201910017032.5, filed on Jan. 8, 2019. The disclosures of the aforementioned applications are hereby incorporated by reference in their entireties.

TECHNICAL FIELD

This application relates to the field of communications technologies, and in particular, to a resource scheduling method for a network slice and a device.

BACKGROUND

A concept of network slice (NS) is introduced in a 5th generation (5G) network, to satisfy different requirements of different communications services for network performance. To be specific, through a 5G network technology, resources and functions of an actual network are divided to form different network slices, to satisfy different requirements, thereby reducing network operation investment costs, and enriching network operation modes.

Currently, for network slices of different tenants, a network management network element determines service level agreement (SLA) templates of the different tenants based on service level requirements of the tenants, and deploys corresponding network slices based on the SLA templates. However, granularities of the SLA templates determined by the network management network element based only on the service level requirements of the tenants are quite coarse. Consequently, performance of the network slices can hardly be guaranteed. In addition, when allocating network resources to the network slices of the different tenants, the network management network element can determine only a rough resource deployment status based on the SLA templates. This may cause resource wastes or an insufficiency of deployed resources, reducing performance of the network slices.

SUMMARY

Embodiments of this application provide a resource scheduling method for a network slice, to resolve a problem in an existing technology that resources are wasted and performance of a network slice is poor when a network resource is allocated to the network slice. Embodiments of this application further provide a corresponding device.

A first aspect of this application provides a resource scheduling method for a network slice. The method may include: A slice management network element sends a request to a data analysis network element. The request includes service experience requirement information of a first network slice. The slice management network element receives a response sent by the data analysis network element. The response includes information about a first area and/or information about a first time that are/is of the first network slice and that correspond/corresponds to the service experience requirement information. The slice management network element sends information about a second area and/or information about a second time to the network device based on the information about the first area and/or the information about the first time. The information about the second area and/or the information about the second time are/is used by the network device to schedule a resource for the first network slice based on the information about the second area and/or the information about the second time.

The slice management network element is a network element that is capable of managing and controlling user access, resource deployment, and function execution of a network slice. The slice management network element may be located on a control plane of a carrier network. For example, the slice management network element is a network slice selection function (NSSF) network element. The slice management network element may alternatively be located on a management plane of the carrier network. For example, the slice management network element is an operation, administration, and maintenance (OAM) network element. The network device includes at least one of the following devices: an access network device, a core network device for allocating a user plane resource or a control plane resource, a transport network device, or a network management network element. When the slice management network element is an NSSF, the network management network element may be an OAM. The information about the second area may be the same as or different from the information about the first area, and the information about the second time may be the same as or different from the information about the first time. It can be learned from the first aspect that, according to this application, the network device can schedule the resource based on the information about the second area and/or the information about the second time. This improves accuracy of resource scheduling and network resource utilization, and also improves performance of the network slice.

In a possible implementation, with reference to the first aspect, in a first possible implementation of the first aspect, the response may further include first service experience information that is of the first network slice and that corresponds to the information about the first area and/or the information about the first time. Additionally, the method may include: The slice management network element determines the information about the second area and/or the information about the second time based on the first service experience information.

The information about the second area may indicate an area with poorest service experience in the first area, and the information about the second time may indicate a time with poorest service experience in the first time. In this case, an additional resource may be scheduled preferentially or significantly for a network slice in the area or time with poorest service experience, to further improve accuracy and utilization of resource scheduling. On the contrary, the information about the second area may alternatively indicate an area with best service experience in the first area, and the information about the second time may indicate a time with best service experience in the first time. In this case, resources scheduled for a network slice in the area or time with best service experience may be preferentially or significantly reduced, to further improve accuracy and utilization of resource scheduling.

In a possible implementation, with reference to the first aspect or the first possible implementation of the first aspect, in a second possible implementation of the first aspect, the method may further include: The slice management network element sends slice quality information corresponding to the information about the second area and/or the information about the second time to the network device. The slice quality information includes at least one of the following information: second service experience information that is of the first network slice and that corresponds to the information about the second area and/or the information about the second time, or satisfaction level information of the second service experience information relative to target service level agreement requirement information of the first network slice.

The second service experience information may be quality of experience (QoE) information, the satisfaction level information may be fulfilment information, and the target service level agreement requirement information may be SLA requirement information. It can be learned from the second possible implementation that the second service experience information and the satisfaction level information are further sent to the network device, such that the network device can perform more accurate resource scheduling.

In a possible implementation, with reference to the first aspect, or the first or the second possible implementation of the first aspect, in a third possible implementation of the first aspect, when the network device is an access network device, the information about the second area is used by the access network device to schedule an access network resource for the first network slice based on the information about the second area, and the information about the second time is used by the access network device to schedule an access network resource for the first network slice based on the information about the second time. It can be learned from the third possible implementation that the access network device may schedule the access network resource more accurately for the first network slice based on the information about the second area and/or the information about the second time.

In a possible implementation, with reference to the second possible implementation of the first aspect, in a fourth possible implementation of the first aspect, the satisfaction level information includes dissatisfaction, satisfaction, or over-satisfaction. The dissatisfaction means that the second service experience information does not satisfy the target service level agreement requirement information of the first network slice. The satisfaction means that the second service experience information satisfies a requirement of the target service level agreement requirement information of the first network slice. The over-satisfaction means that the second service experience information exceeds the target service level agreement requirement information of the first network slice. It can be learned from the fourth possible implementation that the satisfaction level information can make network resource scheduling more accurate.

In a possible implementation, with reference to any one of the first aspect, or the first to the fourth possible implementations of the first aspect, in a fifth possible implementation of the first aspect, when the request further includes information about a third area, the third area indicated by the information about the third area includes the first area indicated by the information about the first area, and the information about the third area is used to request, from the data analysis network element, the information that is about the first area in the third area and that corresponds to the service experience requirement information. It can be learned from the fifth possible implementation that the request includes the information about the third area, such that a range for determining the first area is narrowed. This improves efficiency of determining the first area, and also improves efficiency of resource scheduling.

In a possible implementation, with reference to any one of the first aspect, or the first to the fifth possible implementations of the first aspect, in a sixth possible implementation of the first aspect, when the request further includes information about a third time, the third time indicated by the information about the third time includes the first time indicated by the information about the first time, and the information about the third time is used to request, from the data analysis network element, the information that is about the first time in the third time and that corresponds to the service experience requirement information. It can be learned from the sixth possible implementation that the request includes the information about the third time, such that a range for determining the first time is narrowed. This improves efficiency of determining the first time, and also improves efficiency of resource scheduling.

In a possible implementation, with reference to any one of the first aspect, or the first to the sixth possible implementations of the first aspect, in a seventh possible implementation of the first aspect, before the slice management network element sends the request to the data analysis network element, the method may further include: The slice management network element obtains third service experience information of the first network slice. If the third service experience information does not correspond to the target service level agreement requirement information, the slice management network element determines the service experience requirement information of the first network slice. The service experience requirement information of the first network slice corresponds to the target service level agreement requirement. It can be learned from the seventh possible implementation that if the third service experience information does not correspond to the target service level agreement requirement information, it may be determined that the resource adjustment method in the first aspect needs to be performed, to improve accuracy of resource scheduling.

The third service experience information may be service experience information of the entire network slice, or may be service experience information corresponding to an area or a time (for example, a fourth area or a fourth time) of the network slice rather than service experience information of the entire network slice.

In a possible implementation, with reference to the seventh possible implementation of the first aspect, in an eighth possible implementation of the first aspect, the method may further include: The slice management network element compares the third service experience information with the target service level agreement requirement information. If the third service experience information over-satisfies or does not satisfy the target service level agreement requirement information, the slice management network element determines that the third service experience information does not correspond to the target service level agreement requirement information.

In a possible implementation, with reference to the eighth possible implementation of the first aspect, in a ninth possible implementation of the first aspect, that if the third service experience information does not correspond to the target service level agreement requirement information, the slice management network element determines the service experience requirement information of the first network slice may include: If the third service experience information does not satisfy the target service level agreement requirement information, the slice management network element determines service experience requirement information that is of the first network slice and that corresponds to the dissatisfaction; or if the third service experience information over-satisfies the target service level agreement requirement information, the slice management network element determines service experience requirement information that is of the first network slice and that corresponds to the over-satisfaction.

In a possible implementation, with reference to the eighth or the ninth possible implementation of the first aspect, in a tenth possible implementation of the first aspect, the method may further include: If the third service experience information does not satisfy the target service level agreement requirement information, the slice management network element reduces a quantity of users served by the first network slice; or if the third service experience information over-satisfies the target service level agreement requirement information, the slice management network element increases a quantity of users served by the first network slice. In this possible implementation, if the third service experience information does not satisfy the target service level agreement requirement information, it indicates that a quantity of users that can be served by the first network slice is smaller, and the quantity of users served by the first network slice needs to be reduced; or if the third service experience information over-satisfies the target service level agreement requirement information, it indicates that a quantity of users that can be served by the first network slice is larger, and the quantity of users served by the first network slice needs to be increased.

The third service experience information may be service experience information of the entire network slice, or may be service experience information corresponding to an area or a time (for example, a fourth area or a fourth time) of the network slice rather than service experience information of the entire network slice.

In a possible implementation, with reference to any one of the second to the tenth possible implementations of the first aspect, in an eleventh possible implementation of the first aspect, the method may further include: The slice management network element obtains initial service level agreement requirement information of the first network slice. The slice management network element determines at least one piece of service level agreement requirement information based on the initial service level agreement requirement information of the first network slice. The slice management network element determines one of the at least one piece of service level agreement requirement information as the target service level agreement requirement information. In this implementation, initial service level agreement requirement information provided by a tenant may include a requirement of a single grade or requirements of a plurality of grades. The slice management network element directly or indirectly determines requirements of a plurality of grades based on the initial service level agreement requirement information, and may select a requirement of one grade from the requirements as the target service level agreement requirement information. Actually, the target service level agreement requirement information may alternatively be the initial service level agreement requirement information.

In a possible implementation, with reference to any one of the first aspect, or the first to the eleventh possible implementations of the first aspect, in a twelfth possible implementation of the first aspect, the service experience requirement information of the first network slice includes at least one of the following information: a requirement on a quantity of users of the first network slice, a requirement on average user experience of a service, or a requirement on a user satisfaction percentage of a service. The user satisfaction percentage of the service is a percentage of a quantity of users whose user experience corresponding to the service is not less than a preset value to a total quantity of users of the service.

In a possible implementation, with reference to any one of the first aspect, or the first to the eleventh possible implementations of the first aspect, in another possible implementation of the first aspect, the first service experience information, the second service experience information, or the third service experience information of the first network slice may include at least one of the following information: user quantity information of the first network slice, user quantity information of a service, average user experience information of a service, or user satisfaction percentage information of a service. A user satisfaction percentage of the service is a percentage of a quantity of users whose user experience corresponding to the service is not less than a preset value to a total quantity of users of the service.

In a possible implementation, with reference to any one of the first aspect, or the first to the twelfth possible implementations of the first aspect, in a thirteenth possible implementation of the first aspect, the method may further include: The slice management network element sends a service experience information request to the data analysis network element. The service experience information request is used to request service experience information of a second network slice. The service experience information request includes slice identification information of the second network slice and/or information about the service area corresponding to the second network slice. The second network slice may be the same as or different from the first network slice. The service experience information request may be a subscribe request or a request.

In a possible implementation, with reference to any one of the first aspect, or the first to the thirteenth possible implementations of the first aspect, in a fourteenth possible implementation of the first aspect, the method may further include: The slice management network element learns, from the network management network element, that a network slice needs to be created or a network slice needs to be deleted.

In a possible implementation, with reference to any one of the first aspect, or the first to the fourteenth possible implementations of the first aspect, in a fifteenth possible implementation of the first aspect, the method may further include: The slice management network element determines that a problematic area and/or a problematic time are/is caused by a first network domain. The problematic area includes the first area or the second area, and the problematic time includes the first time or the second time. The slice management network element determines the network device based on the first network domain.

In the fifteenth possible implementation, the slice management network element may first precisely locate a network domain (for example, an access network domain) causing the problematic area and the problematic time, and then send information about the problematic area (namely, the second area) and/or information about the problematic time (namely, the second time) to a network device in the network domain. This method can avoid blindly adjusting a resource scheduling status of another normally working network domain, and improve accuracy of resource scheduling.

In a possible implementation, with reference to the fifteenth possible implementation, in a sixteenth possible implementation of the first aspect, that the slice management network element determines that a problematic area and/or a problematic time are/is caused by a first network domain includes: The slice management network element learns, from the network management network element, that the problematic area and/or the problematic time are/is caused by the first network domain.

It can be learned from the sixteenth possible implementation that, when the slice management network element is a slice management network element located on a control plane of a carrier network, the slice management network element may interact with a network management network element located on a management plane of the carrier network, to learn that the problematic area and/or time is caused by the first network domain.

In a possible implementation, with reference to the sixteenth possible implementation, in a seventeenth possible implementation of the first aspect, that the slice management network element determines the network device based on the first network domain may include: The slice management network element obtains first confidence level information from the network management network element. The first confidence level information is used to indicate a confidence level of the information that the problematic area and/or the problematic time are/is caused by the first network domain. The slice management network element determines the network device based on the first confidence level information.

In a possible implementation, with reference to any one of the seventh to the seventeenth possible implementations of the first aspect, in an eighteenth possible implementation of the first aspect, the method may further include: The slice management network element determines that the third service experience information does not correspond to the target service level agreement requirement information due to a second network domain, and the slice management network element determines the network device based on the second network domain.

In the eighteenth possible implementation, the slice management network element may first precisely locate a network domain (for example, an access network domain) due to which the third service experience of the first network slice does not satisfy the target service level agreement requirement information, and then send information about the problematic area (namely, the second area) and/or information about the problematic time (namely, the second time) to a network device in the network domain. This method can avoid blindly adjusting a resource scheduling status of another normally working network domain, and improve accuracy of resource scheduling.

In a possible implementation, with reference to the eighteenth possible implementation, in a nineteenth possible implementation of the first aspect, that the slice management network element determines that the third service experience information does not correspond to the target service level agreement requirement information due to a second network domain may include: The slice management network element learns, from the network management network element, that the third service experience information does not correspond to the target service level agreement requirement information due to the second network domain.

It can be learned from the nineteenth possible implementation that, when the slice management network element is a slice management network element located on a control plane of a carrier network, the slice management network element may interact with a network management network element located on a management plane of the carrier network, to learn that the third service experience information does not correspond to the target service level agreement requirement information due to the second network domain.

In a possible implementation, with reference to the nineteenth possible implementation, in a twentieth possible implementation of the first aspect, that the slice management network element determines the network device based on the second network domain may include: The slice management network element obtains second confidence level information from the network management network element. The second confidence level information is used to indicate a confidence level of the information that the third service experience information does not correspond to the target service level agreement requirement information due to the second network domain. The slice management network element determines the network device based on the second confidence level information.

In a possible implementation, with reference to any one of the fifteenth to the twentieth possible implementations of the first aspect, in a twenty-first possible implementation of the first aspect, the first network domain or the second network domain includes at least one of the following: an access network domain, a core network domain, or a transport network domain.

A second aspect of this application provides a resource scheduling method for a network slice. The method may include: A network device receives information about the second area and/or information about a second time that are/is of a first network slice and sent by a slice management network element. The network device schedules a resource for the first network slice based on the information about the second area and/or the information about the second time.

The slice management network element is a network element that is capable of managing and controlling user access, resource deployment, and function execution of a network slice. The slice management network element may be located on a control plane of a carrier network. For example, the slice management network element is a network slice selection function (NSSF) network element. The slice management network element may alternatively be located on a management plane of the carrier network. For example, the slice management network element is an operation, administration, and maintenance (OAM) network element. The network device includes at least one of the following devices: an access network device, a core network device for allocating a user plane resource or a control plane resource, a transport network device, or a network management network element. When the slice management network element is an NSSF, the network management network element may be an OAM. The information about the second area may be the same as or different from information about a first area, and the information about the second time may be the same as or different from information about a first time. It can be learned from the second aspect that, according to this application, the network device can schedule the resource based on the information about the second area and/or the information about the second time. This improves accuracy of resource scheduling and network resource utilization, and also improves performance of the network slice.

In a possible implementation, with reference to the second aspect, in a first possible implementation of the second aspect, the method may further include: The network device receives slice quality information that corresponds to the first network slice and that is sent by the slice management network element. The slice quality information includes:

service experience information of the first network slice, and/or satisfaction level information of the service experience information of the first network slice relative to a target service level agreement requirement. The network device adjusts, based on the slice quality information, the resource scheduled for the first network slice.

The service experience information may be quality of experience (QoE) information, the satisfaction level information may be fulfilment information, and the target service level agreement requirement information may be SLA requirement information. It can be learned from this possible implementation that the network device may more accurately adjust, based on the service experience information and/or the satisfaction level information, the resource scheduled for the first network slice, such that the network device can perform more accurate resource scheduling.

In a possible implementation, with reference to the first possible implementation of the second aspect, in a second possible implementation of the second aspect, the slice quality information corresponding to the first network slice includes: service experience information that is of the first network slice and that corresponds to the second area, and/or satisfaction level information of the service experience information corresponding to the second area relative to the target service level agreement requirement. The second area is an area indicated by the information about the second area.

In a possible implementation, with reference to the second possible implementation of the second aspect, in a third possible implementation of the second aspect, the second area is an area in which the target service level agreement requirement cannot be satisfied or is over-satisfied.

In a possible implementation, with reference to the first to the third possible implementations of the second aspect, in a fourth possible implementation of the second aspect, the slice quality information corresponding to the first network slice includes: service experience information that is of the first network slice and that corresponds to the second time, and/or satisfaction level information of the service experience information corresponding to the second time relative to the target service level agreement requirement. The second time is a time indicated by the information about the second time.

In a possible implementation, with reference to the fourth possible implementation of the second aspect, in a fifth possible implementation of the second aspect, the second time is a time in which the target service level agreement requirement cannot be satisfied or is over-satisfied.

In a possible implementation, with reference to the first to the third possible implementations of the second aspect, in a fifth possible implementation of the second aspect, the slice quality information corresponding to the first network slice includes: service experience information that is of the first network slice and that corresponds to the second area, service experience information that is of the first network slice and that corresponds to the second time, and/or satisfaction level information of the service experience information corresponding to the second area relative to the target service level agreement requirement and satisfaction level information of the service experience information corresponding to the second time relative to the target service level agreement requirement. The second area is an area indicated by the information about the second area, and the second time is a time indicated by the information about the second time.

In a possible implementation, with reference to any one of the first to the sixth possible implementations of the second aspect, in the sixth possible implementation of the second aspect, that the network device adjusts, based on the slice quality information, the resource scheduled for the first network slice may include: If the service experience information of the first network slice cannot satisfy the target service level agreement requirement, the network device schedules an additional resource for the first network slice; or if the service experience information of the first network slice over-satisfies the target service level agreement requirement, the network device reduces resources scheduled for the first network slice. It can be learned from this possible implementation that, if the service experience information of the first network slice cannot satisfy the target service level agreement requirement, it indicates that resources of the first network slice are insufficient, and an additional resource needs to be scheduled for the first network slice. If the service experience information of the first network slice over-satisfies the target service level agreement requirement, it indicates that resources of the first network slice are redundant, and the resources scheduled for the first network slice need to be reduced. In this way, resource utilization can be improved.

In a possible implementation, with reference to any one of the second aspect, or the first to the sixth possible implementations of the second aspect, in a seventh possible implementation of the second aspect, the network device includes at least one of the following devices: an access network device, a core network device for allocating a user plane resource or a control plane resource, a transport network device, or a network management network element.

In a possible implementation, with reference to the second aspect, or the first to the seventh possible implementations of the second aspect, in an eighth possible implementation of the second aspect, when the network device is an access network device, the access network device schedules an access network resource for the first network slice based on the information about the second area, or the access network device schedules an access network resource for the first network slice based on the information about the second time.

A third aspect of this application provides a resource scheduling method for a network slice. The method may include: A data analysis network element receives a request sent by a slice management network element. The request includes service experience requirement information of a first network slice. The data analysis network element determines information about a first area and/or information about a first time that correspond/corresponds to the service experience requirement information. The data analysis network element sends a response to the slice management network element. The response includes the information about the first area and/or the information about the first time that correspond/corresponds to the service experience requirement information.

The data analysis network element is a network element that is capable of analyzing carrier network data or service data, and may be located on a control plane of a carrier network. For example, the data analysis network element may be a network data analytics function (NWDAF) network element. The data analysis network element may alternatively be located on a management plane of the carrier network. For example, the data analysis network element may be a management data analytics system (MDAS) network element. The slice management network element is a network element that is capable of managing and controlling user access, resource deployment, and function execution of a network slice. The slice management network element may be located on the control plane of the carrier network. For example, the slice management network element is a network slice selection function network element NSSF. The slice management network element may alternatively be located on the management plane of the carrier network. For example, the slice management network element is an operation, administration, and maintenance network element OAM. It can be learned from the third aspect that the data analysis network element may determine the information about a first problematic area of the first network slice and/or the information about a first problematic time of the first network slice, to help the network device perform more accurate resource scheduling.

In a possible implementation, with reference to the third aspect, in the first possible implementation of the third aspect, the method may further include: The data analysis network element determines first service experience information that is of the first network slice and that corresponds to the information about the first area and/or the information about the first time. The response may further include the first service experience information that is of the first network slice and that corresponds to the information about the first area and/or the information about the first time.

In a possible implementation, with reference to the third aspect or the first possible implementation of the third aspect, in a second possible implementation of the third aspect, the service experience requirement information of the first network slice includes positive service experience requirement information and/or negative service experience requirement information. The positive service experience requirement information is filter information that first service level agreement requirement information is over-satisfied, and the negative service experience requirement information is filter information that second service level agreement requirement information is not satisfied.

In a possible implementation, with reference to the third aspect, or the first or the second possible implementation of the third aspect, in a third possible implementation of the third aspect, when the request further includes information about a third area, the third area indicated by the information about the third area includes the first area indicated by the information about the first area. Additionally, the method may further include: The data analysis network element obtains, based on the information about the third area, the information that is about the first area in the third area and that corresponds to the service experience requirement information. It can be learned from this possible implementation that the request carries the information about the third area, such that a searchable range is narrowed, helping the data analysis network element quickly determine the information about the first area.

In a possible implementation, with reference to any one of the third aspect or the first to the third possible implementations of the third aspect, in a fourth possible implementation of the third aspect, when the request further includes information about a third time, the third time indicated by the information about the third time includes the first time indicated by the information about the first time. Additionally, the method may further include: The data analysis network element obtains, based on the information about the third time, the information that is about the first time and that corresponds to the service experience requirement information from the information about the third time. It can be learned from this possible implementation that the request carries the information about the third time, such that a searchable range is narrowed, helping the data analysis network element quickly determine the information about the first time.

In a possible implementation, with reference to any one of the third aspect, or the first to the fourth possible implementations of the third aspect, in a fifth possible implementation of the third aspect, the service experience requirement information of the first network slice includes at least one of the following information: a requirement on a quantity of users of the first network slice, a requirement on average user experience of a service, or a requirement on a user satisfaction percentage of a service. The user satisfaction percentage of the service is a percentage of a quantity of users whose user experience corresponding to the service is not less than a preset value to a total quantity of users of the service.

In a possible implementation, with reference to any one of the third aspect, or the first to the fifth possible implementations of the third aspect, in a sixth possible implementation of the third aspect, the first service experience information of the first network slice includes at least one of the following information: user quantity information of the first network slice, user quantity information of a service, average user experience information of a service, or user satisfaction percentage information of a service. A user satisfaction percentage of the service is a percentage of a quantity of users whose user experience corresponding to the service is not less than a preset value to a total quantity of users of the service.

A fourth aspect of this application provides a resource scheduling method for a network slice. The method may include: A network device receives resource configuration information that is of a first network slice and sent by a network management network element. The resource configuration information includes maximum resource configuration information and/or guaranteed resource configuration information. The maximum resource configuration information is used to indicate maximum available resources of the first network slice. The guaranteed resource configuration information is used to indicate a guaranteed available resource of the first network slice. The network device schedules a resource for the first network slice based on the resource configuration information of the first network slice.

The network device includes at least one of the following devices: an access network device, a core network device for allocating a user plane resource or a control plane resource, or a transport network device. The network management network element is a device that is capable of deploying a network resource and capable of managing and maintaining operation of a network, for example, may be an OAM or an NSSF. It can be learned from the fourth aspect that a network resource does not need to be bound to a network slice. In other words, the network resource is not configured for a specified network slice. According to the network resource scheduling method provided in the fourth aspect, limited by a quantity of maximum available resources indicated by the network management network element, the network device may schedule a resource for a network slice preferentially based on a quantity of guaranteed available resources. According to the method, the network device flexibly schedules a resource for a network slice based on a quantity of resources that are actually required by the network slice, and promises to schedule a resource for the network slice when the network slice requires the resource, where a quantity of scheduled resources is more than or equal to the quantity of guaranteed available resources. In some emergency cases, the network slice may further be allowed to use a resource, where a quantity of used resources is less than or equal to the quantity of maximum available resources. This method not only guarantees that a network slice has an available resource, but also improves resource flexibility.

In a possible implementation, with reference to the fourth aspect, in a first possible implementation of the fourth aspect, a guaranteed available resource of the first network slice is allowed to be used by a second network slice. It can be learned from this possible implementation that the guaranteed available resource of the first network slice may alternatively be used by the second network slice. Especially when the first network slice does not need to use excessive resources, a remaining resource in the quantity of guaranteed available resources is allowed to be used by another network slice, provided that it can be guaranteed that a resource is scheduled for the first network slice when the first network slice requires the resource, where a quantity of scheduled resources is more than or equal to the quantity of guaranteed available resources. The method improves flexibility of resource utilization.

In a possible implementation, with reference to the fourth aspect or the first possible implementation of the fourth aspect, in a second possible implementation of the fourth aspect, when the network device is an access network device, the maximum resource configuration information is maximum air interface resource configuration information, and/or the guaranteed resource configuration information is guaranteed air interface resource configuration information.

In a possible implementation, with reference to the fourth aspect, or the first or the second possible implementation of the fourth aspect, in a third possible implementation of the fourth aspect, that the network device schedules a resource for the first network slice based on the resource configuration information of the first network slice may include: The network device preferentially schedules, within a quantity limited by the maximum resource configuration information, the guaranteed available resource for the first network slice based on the guaranteed resource configuration information.

In a possible implementation, with reference to any one of the fourth aspect, or the first to the third possible implementations of the fourth aspect, in a fourth possible implementation of the fourth aspect, the maximum resource configuration information and/or the guaranteed resource configuration information are/is maximum resource configuration information and/or guaranteed resource configuration information that correspond/corresponds to a first time. That the network device schedules a resource for the first network slice based on the resource configuration information of the first network slice may include: The network device schedules the resource for the first network slice in the first time based on the maximum resource configuration information and/or the guaranteed resource configuration information that correspond/corresponds to the first time.

The first time may be included in the maximum resource configuration information and/or the guaranteed resource configuration information, or may be pre-negotiated or included outside the maximum resource configuration information and/or the guaranteed resource configuration information, and does not need to be included in the maximum resource configuration information and/or the guaranteed resource configuration information.

In a possible implementation, with reference to any one of the fourth aspect, or the first to the third possible implementations of the fourth aspect, in a fifth possible implementation of the fourth aspect, the maximum resource configuration information and/or the guaranteed resource configuration information are/is maximum resource configuration information and/or guaranteed resource configuration information that correspond/corresponds to a first area. That the network device schedules a resource for the first network slice based on the resource configuration information of the first network slice may include: The network device schedules the resource for the first network slice in the first area based on the maximum resource configuration information and/or the guaranteed resource configuration information that correspond/corresponds to the first area. The first area may be included in the maximum resource configuration information and/or guaranteed resource configuration information, or may be pre-negotiated or included outside the maximum resource configuration information and/or guaranteed resource configuration information, and does not need to be included in the maximum resource configuration information and/or guaranteed resource configuration information.

In a possible implementation, with reference to any one of the fourth aspect, or the first to the fifth possible implementations of the fourth aspect, in a sixth possible implementation of the fourth aspect, the method may further include: The network device receives slice quality information that corresponds to the first network slice and that is sent by a slice management network element. The slice quality information includes: service experience information of the first network slice, and/or satisfaction level information of the service experience information of the first network slice relative to a target service level agreement requirement. The network device adjusts, based on the slice quality information, the resource scheduled for the first network slice.

In a possible implementation, with reference to the sixth possible implementation of the fourth aspect, in a seventh possible implementation of the fourth aspect, the slice quality information corresponding to the first network slice includes: service experience information that is of the first network slice and that corresponds to a second area, and/or satisfaction level information of the service experience information corresponding to the second area relative to the target service level agreement requirement.

In a possible implementation, with reference to the seventh possible implementation of the fourth aspect, in an eighth possible implementation of the fourth aspect, the second area is an area in which the target service level agreement requirement cannot be satisfied or is over-satisfied.

In a possible implementation, with reference to the seventh or eighth possible implementation of the fourth aspect, in a ninth possible implementation of the fourth aspect, the slice quality information corresponding to the first network slice includes: service experience information that is of the first network slice and that corresponds to a second time, and/or satisfaction level information of the service experience information corresponding to the second time relative to the target service level agreement requirement.

In a possible implementation, with reference to the ninth possible implementation of the fourth aspect, in a tenth possible implementation of the fourth aspect, the second time is a time in which the target service level agreement requirement cannot be satisfied or is over satisfied.

In a possible implementation, with reference to the ninth possible implementation of the fourth aspect, in an eleventh possible implementation of the fourth aspect, the slice quality information corresponding to the first network slice includes: service experience information corresponding to a second area of the first network slice, service experience information corresponding to a second time of the first network slice, and/or satisfaction level information of the service experience information corresponding to the second area relative to the target service level agreement requirement and satisfaction level information of the service experience information corresponding to the second time relative to the target service level agreement requirement.

In a possible implementation, with reference to any one of the sixth to the eleventh possible implementations of the fourth aspect, in a twelfth possible implementation of the fourth aspect, that the network device adjusts, based on the slice quality information, the resource scheduled for the first network slice may include: If the service experience information of the first network slice cannot satisfy the target service level agreement requirement, the network device schedules an additional resource for the first network slice; or if the service experience information of the first network slice over-satisfies the target service level agreement requirement, the network device reduces resources scheduled for the first network slice.

A fifth aspect of this application provides a resource scheduling method for a network slice. The method may include: A network management network element determines resource configuration information of a first network slice. The resource configuration information includes maximum resource configuration information and/or guaranteed resource configuration information. The maximum resource configuration information is used to indicate maximum available resources of the first network slice. The guaranteed resource configuration information is used to indicate a guaranteed available resource of the first network slice. The first network management network element sends the resource configuration information of the first network slice to a network device. The resource configuration information is used by the network device to schedule a resource for the first network slice based on the resource configuration information.

The network management network element is a device that is capable of deploying a network resource and capable of managing and maintaining operation of a network, for example, may be an OAM or an NSSF. It can be learned from the fifth aspect that a network resource does not need to be bound to a network slice. In other words, the network resource is not configured for a specified network slice. The network device includes at least one of the following devices: an access network device, a core network device for allocating a user plane resource or a control plane resource, or a transport network device. According to the network resource scheduling method provided in the fifth aspect, limited by a quantity of maximum available resources indicated by the network management network element, the network device may schedule a resource for a network slice preferentially based on a quantity of guaranteed available resources. According to the method, the network device flexibly schedules a resource for a network slice based on a quantity of resources that are actually required by the network slice, and promises to schedule a resource for the network slice when the network slice requires the resource, where a quantity of scheduled resources is more than or equal to the quantity of guaranteed available resources. In some emergency cases, the network slice may further be allowed to use a resource, where a quantity of used resources is less than or equal to the quantity of maximum available resources. This method not only guarantees that a network slice has an available resource, but also improves resource flexibility.

In a possible implementation, with reference to the fifth aspect, in a first possible implementation of the fifth aspect, when the network device is an access network device, the maximum resource configuration information is maximum air interface resource configuration information, and/or the guaranteed resource configuration information is guaranteed air interface resource configuration information.

In a possible implementation, with reference to the fifth aspect or the first possible implementation of the fifth aspect, in a second possible implementation of the fifth aspect, the maximum resource configuration information and/or the guaranteed resource configuration information are/is maximum resource configuration information and/or guaranteed resource configuration information that correspond/corresponds to a first time, or the maximum resource configuration information and/or the guaranteed resource configuration information are/is maximum resource configuration information and/or guaranteed resource configuration information that correspond/corresponds to a first area.

The first time may be included in the maximum resource configuration information and/or guaranteed resource configuration information, or may be pre-negotiated or included outside the maximum resource configuration information and/or guaranteed resource configuration information, and does not need to be included in the maximum resource configuration information and/or guaranteed resource configuration information.

In a possible implementation, with reference to the fifth aspect, or the first or the second possible implementation of the fifth aspect, in a third possible implementation of the fifth aspect, that a network management network element determines resource configuration information of a first network slice may include: The network management network element determines the resource configuration information of the first network slice based on target service level agreement requirement information of the first network slice.

In a possible implementation, with reference to any one of the fifth aspect, or the first to the third possible implementations of the fifth aspect, in a fourth possible implementation of the fifth aspect, the method may further include: The network management network element obtains information about the resource scheduled by the network device for the first network slice. The network management network element obtains slice quality information of the first network slice. The slice quality information includes: service experience information of the first network slice, and/or satisfaction level information of the service experience information of the first network slice relative to the target service level agreement requirement. The network management network element updates the resource configuration information of the first network slice based on the information about the resource scheduled by the network device for the first network slice and the slice quality information. The network management network element sends updated resource configuration information to the network device.

In a possible implementation, with reference to the fourth possible implementation of the fifth aspect, in a fifth possible implementation of the fifth aspect, the information about the resource includes information about a resource corresponding to a second area of the first network slice. The service experience information of the first network slice includes service experience information that is of the first network slice and that corresponds to the second area. That the network management network element updates the resource configuration information of the first network slice based on the slice quality information and the information about the resource scheduled by the network device for the first network slice may include: The network management network element updates the resource configuration information of the first network slice based on the information about the resource corresponding to the second area and the service experience information corresponding to the second area.

In a possible implementation, with reference to the fourth possible implementation of the fifth aspect, in a sixth possible implementation of the fifth aspect, the information about the resource includes information about a resource corresponding to a second time of the first network slice. The service experience information of the first network slice includes service experience information that is of the first network slice and that corresponds to the second time. That the network management network element updates the resource configuration information of the first network slice based on the slice quality information and the information about the resource scheduled by the network device for the first network slice may include: The network management network element updates the resource configuration information of the first network slice based on the information about the resource corresponding to the second time and the service experience information corresponding to the second time.

In a possible implementation, with reference to the fourth possible implementation of the fifth aspect, in a seventh possible implementation of the fifth aspect, the information about the resource includes information about a resource corresponding to a second area of the first network slice and information about a resource corresponding to a second time of the first network slice. The service experience information of the first network slice includes service experience information that is of the first network slice and that corresponds to the second area and service experience information that is of the first network slice and that corresponds to the second time. That the network management network element updates the resource configuration information of the first network slice based on the information about the resource scheduled by the network device for the first network slice and the slice quality information may include: The network management network element updates the resource configuration information of the first network slice based on the information about the resource corresponding to the second area, the information about the resource corresponding to the second time, the service experience information corresponding to the second area, and the service experience information corresponding to the second time.

In a possible implementation, with reference to any one of the fourth to the seventh possible implementations of the fifth aspect, in an eighth possible implementation of the fifth aspect, updating the resource configuration information of the first network slice may include: The network management network element updates the maximum resource configuration information and/or the guaranteed resource configuration information. As such, updated maximum resource configuration information is not less than the resource scheduled by the network device for the first network slice.

In a possible implementation, with reference to any one of the fourth to the eighth possible implementations of the fifth aspect, in a ninth possible implementation of the fifth aspect, that the network management network element obtains slice quality information of the first network slice may include: The network management network element obtains the slice quality information from the slice management network element or a data analysis device.

A sixth aspect of this application provides a user quantity control method for a network slice. The method may include: A slice management network element receives user quantity limit information of a target network slice and indication information that are sent by a network management network element. The indication information is used to indicate status information of the target network slice or a confidence level of the user quantity limit information. The slice management network element controls, based on the indication information and the user quantity limit information, a quantity of users served by the target network slice.

The slice management network element may be a network element that is capable of managing and controlling user access, resource deployment, and function execution of a network slice. The slice management network element may be located on a control plane of a carrier network. For example, the slice management network element is a network slice selection function (NSSF) network element. The network management network element may be a device that is capable of deploying a resource and capable of managing and maintaining operation of a network, for example, may be an OAM. It can be learned from the sixth aspect that the quantity of users served by the target network slice may be controlled based on the indication information and the user quantity limit information, such that accuracy of user quantity control can be improved.

In a possible implementation, with reference to the sixth aspect, in a first possible implementation of the sixth aspect, the indication information is used to indicate the status information of the target network slice, and that the slice management network element controls, based on the indication information and the user quantity limit information, a quantity of users served by the target network slice may include: The slice management network element controls, based on the user quantity limit information and in a control mode corresponding to the status information, the quantity of users served by the target network slice. In this possible implementation, different status information corresponds to different control modes. Therefore, user quantity control can be precisely performed based on the status information.

In a possible implementation, with reference to the first possible implementation of the sixth aspect, in a second possible implementation of the sixth aspect, the status information includes a test state or a stable state.

In a possible implementation, with reference to the second possible implementation of the sixth aspect, in a third possible implementation of the sixth aspect, when the status information is the test state, the control mode is a stepped control mode. To be more specific, the slice management network element may connect users to the target network slice in a stepped manner, where a quantity of the users is a quantity limited by the user quantity limit information, or remove, in a stepped manner, users that have been served by the target network slice.

In a possible implementation, with reference to the second possible implementation of the sixth aspect, in a fourth possible implementation of the sixth aspect, when the status information is the stable state, the control mode is a one-time control mode. To be more specific, based on the stable state of the target network slice, the slice management network element may connect users to the target network slice at one time, where a quantity of the users is a quantity limited by the user quantity limit information, or remove, at one time, users that have been served by the target network slice.

In a possible implementation, with reference to the sixth aspect, in a fifth possible implementation of the sixth aspect, the indication information is used to indicate the confidence level of the user quantity limit information, and that the slice management network element controls, based on the indication information and the user quantity limit information, a quantity of users served by the target network slice may include: The slice management network element controls, based on the user quantity limit information and in a control mode corresponding to the confidence level, the quantity of users served by the target network slice.

In a possible implementation, with reference to the fifth possible implementation of the sixth aspect, in a sixth possible implementation of the sixth aspect, when the confidence does not satisfy a confidence requirement, the control mode is a stepped control mode. To be more specific, the slice management network element connects users to the target network slice in a stepped manner, where a quantity of the users is a quantity limited by the user quantity limit information, or removes, in a stepped manner, users that have been served by the target network slice.

In a possible implementation, with reference to the fifth possible implementation of the sixth aspect, in a seventh possible implementation of the sixth aspect, when the confidence level satisfies a confidence level requirement, the control mode is a one-time control mode. To be more specific, the slice management network element connects users to the target network slice at one time, where a quantity of the users is a quantity limited by the user quantity limit information, or removes, at one time, users that have been served by the target network slice.

In a possible implementation, with reference to any one of the sixth aspect, or the first to the seventh possible implementations of the sixth aspect, in an eighth possible implementation of the sixth aspect, that the slice management network element receives the user quantity limit information that is of the target network slice and sent by the network management network element may include: The slice management network element receives service level agreement requirement information that is of the target network slice and sent by the network management network element. The service level agreement requirement information includes the user quantity limit information of the target network slice. Certainly, if the service level agreement requirement information that is of the target network slice and sent by the network management network element to the slice management network element does not include the user quantity limit information, the user quantity limit information may be sent separately, and may be sent together with the service level agreement requirement information of the target network slice.

In a possible implementation, with reference to any one of the sixth aspect, or the first to the eighth possible implementations of the sixth aspect, in a ninth possible implementation of the sixth aspect, that the slice management network element receives the user quantity limit information that is of the target network slice and sent by the network management network element may include: The slice management network element receives user quantity limit information that is sent by the network management network element and that corresponds to information about an area of the target network slice. That the slice management network element controls, based on the indication information and the user quantity limit information, a quantity of users served by the target network slice may include: The slice management network element controls, based on the indication information and the user quantity limit information corresponding to the information about the area, a quantity of users that are served by the target network slice and in the area indicated by the information about the area.

In a possible implementation, with reference to any one of the sixth aspect, or the first to the eighth possible implementations of the sixth aspect, in a tenth possible implementation of the sixth aspect, that the slice management network element receives the user quantity limit information that is of the target network slice and sent by the network management network element may include: The slice management network element receives user quantity limit information that is sent by the network management network element and that corresponds to information about a time. That the slice management network element controls, based on the indication information and the user quantity limit information, a quantity of users served by the target network slice may include: The slice management network element controls, based on the indication information and the user quantity limit information corresponding to the information about the time, a quantity of users that are served by the target network slice and in the time indicated by the information about the time.

In a possible implementation, with reference to any one of the sixth aspect, or the first to the eighth possible implementations of the sixth aspect, in an eleventh possible implementation of the sixth aspect, that the slice management network element receives the user quantity limit information that is of the target network slice and sent by the network management network element may include: The slice management network element receives user quantity limit information that is sent by the network management network element and that corresponds to information about an area of the target network slice and user quantity limit information that is sent by the network management network element and that corresponds to information about a time of the target network slice. That the slice management network element controls, based on the indication information and the user quantity limit information, a quantity of users served by the target network slice may include: The slice management network element controls, based on the indication information, the user quantity limit information corresponding to the information about the area, and the user quantity limit information corresponding to the information about the time, a quantity of users that are served by the target network slice and that are in the area indicated by the information about the area and in the time indicated by the information about the time.

In a possible implementation, with reference to any one of the sixth aspect, or the first to the eleventh possible implementations of the sixth aspect, in a twelfth possible implementation of the sixth aspect, the user quantity limit information includes online user quantity limit information and/or registered user quantity limit information.

A seventh aspect of this application provides a user quantity control method for a network slice. The method may include: A network management network element determines user quantity limit information of a target network slice and indication information. The indication information is used to indicate status information of the target network slice or a confidence level of the user quantity limit information. The network management network element sends the user quantity limit information of the target network slice and the indication information to a slice management network element. The indication information and the user quantity limit information are used by the slice management network element to control a quantity of users served by the target network slice.

The network management network element may be a device that is capable of deploying a resource and capable of managing and maintaining operation of a network, for example, may be an OAM. The slice management network element may be a network element that is capable of managing and controlling user access, resource deployment, and function execution of a network slice. The slice management network element may be located on a control plane of a carrier network. For example, the slice management network element is an NS SF. It can be learned from the seventh aspect that the quantity of users served by the target network slice may be controlled based on the indication information and the user quantity limit information, such that accuracy of user quantity control can be improved.

In a possible implementation, with reference to the seventh aspect, in a first possible implementation of the seventh aspect, that a network management network element determines user quantity limit information of a target network slice may include: The network management network element obtains service level agreement requirement information of the target network slice. The network management network element determines the user quantity limit information of the target network slice based on the service level agreement requirement information.

In a possible implementation, with reference to the seventh aspect or the first possible implementation of the seventh aspect, in a second possible implementation of the seventh aspect, that the network management network element sends the user quantity limit information of the target network slice to a slice management network element may include: The network management network element sends, to the slice management network element, information about an area of the target network slice and user quantity limit information corresponding to the information about the area. The information about the area and the user quantity limit information corresponding to the information about the area are used by the slice management network element to control a quantity of users that are served by the target network slice and in the area indicated by the information about the area, within a quantity indicated by the user quantity limit information corresponding to the information about the area.

In a possible implementation, with reference to the seventh aspect or the first possible implementation of the seventh aspect, in a third possible implementation of the seventh aspect, that the network management network element sends the user quantity limit information of the target network slice to a slice management network element may include: The network management network element sends, to the slice management network element, information about a time of the target network slice and user quantity limit information corresponding to the information about the time. The information about the time and the user quantity limit information corresponding to the information about the time are used to control a quantity of users that are served by the target network slice and in the time indicated by the information about the time, within a quantity indicated by the user quantity limit information corresponding to the information about the time.

In a possible implementation, with reference to the seventh aspect or the first possible implementation of the seventh aspect, in a fourth possible implementation of the seventh aspect, that the network management network element sends the user quantity limit information of the target network slice to a slice management network element may include: The network management network element sends, to the slice management network element, information about an area of the target network slice, user quantity limit information corresponding to the information about the area, information about a time of the target network slice, and user quantity limit information corresponding to the information about the time. The information about the area and the user quantity limit information corresponding to the information about the area are used by the slice management network element to control a quantity of users that are served by the target network slice and in the area indicated by the information about the area, within a quantity indicated by the user quantity limit information corresponding to the information about the area. The information about the time and the user quantity limit information corresponding to the information about the time are used to control a quantity of users that are served by the target network slice and in the time indicated by the information about the time, within a quantity indicated by the user quantity limit information corresponding to the information about the time.

In a possible implementation, with reference to any one of the seventh aspect, or the first to the fourth possible implementations of the seventh aspect, in a fifth possible implementation of the seventh aspect, the method may further include: The network management network element obtains slice quality information of the target network slice. The slice quality information includes: service experience information of the target network slice, and/or satisfaction level information of the service experience information of the target network slice relative to the service level agreement requirement information.

The network management network element updates the user quantity limit information of the target network slice or the indication information based on the slice quality information.

The network management network element sends updated user quantity limit information or indication information to the slice management network element.

In a possible implementation, with reference to the fifth possible implementation of the seventh aspect, in a sixth possible implementation of the seventh aspect, that the network management network element obtains slice quality information of the target network slice may include: The network management network element obtains the slice quality information from the slice management network element or a data analysis network element.

In a possible implementation, with reference to the fifth or the sixth possible implementation of the seventh aspect, in a seventh possible implementation of the seventh aspect, the service experience information of the target network slice includes service experience information that is of the target network slice and that corresponds to the area indicated by the information about the area, and that the network management network element updates the user quantity limit information of the target network slice or the indication information based on the slice quality information may include: The network management network element updates the user quantity limit information of the target network slice or the indication information based on the service experience information corresponding to the area indicated by the information about the area.

In a possible implementation, with reference to the fifth or the sixth possible implementation of the seventh aspect, in an eighth possible implementation of the seventh aspect, the service experience information of the target network slice includes service experience information that is of the target network slice and that corresponds to the time indicated by the information about the time, and that the network management network element updates the user quantity limit information of the target network slice or the indication information based on the slice quality information may include: The network management network element updates the user quantity limit information of the target network slice or the indication information based on the service experience information corresponding to the time indicated by the information about the time.

In a possible implementation, with reference to the fifth or the sixth possible implementation of the seventh aspect, in an eighth possible implementation of the seventh aspect, the service experience information of the target network slice includes service experience information that is of the target network slice and that corresponds to the area indicated by the information about the area and service experience information that is of the target network slice and that corresponds to the time indicated by the information about the time, and that the network management network element updates the user quantity limit information of the target network slice or the indication information based on the slice quality information may include: The network management network element updates the user quantity limit information of the target network slice or the indication information based on the service experience information corresponding to the area indicated by the information about the area and the service experience information corresponding to the time indicated by the information about the time.

An eighth aspect of this application provides a slice management network element. The slice management network element is configured to perform the resource scheduling method for a network slice according to any one of the first aspect or the possible implementations of the first aspect. The slice management network element may include units or modules configured to schedule a resource for a network slice according to any one of the first aspect or the possible implementations of the first aspect, for example, a receiving unit, a sending unit, and a processing unit.

A ninth aspect of this application provides a network device. The network device is configured to perform the resource scheduling method for a network slice according to any one of the second aspect or the possible implementations of the second aspect. The network device may include units or modules configured to schedule a resource for a network slice according to any one of the second aspect or the possible implementations of the second aspect, for example, a receiving unit, a sending unit, and a processing unit.

A tenth aspect of this application provides a data analysis network element. The data analysis network element is configured to perform the resource scheduling method for a network slice according to any one of the third aspect or the possible implementations of the third aspect. The data analysis network element may include units or modules configured to schedule a resource for a network slice according to any one of the third aspect or the possible implementations of the third aspect, for example, a receiving unit, a sending unit, and a processing unit.

An eleventh aspect of this application provides a network device. The network device is configured to perform the resource scheduling method for a network slice according to any one of the fourth aspect or the possible implementations of the fourth aspect. The network device may include units or modules configured to schedule a resource for a network slice according to any one of the fourth aspect or the possible implementations of the fourth aspect, for example, a receiving unit, a sending unit, and a processing unit.

A twelfth aspect of this application provides a network management network element. The network management network element is configured to perform the resource scheduling method for a network slice according to any one of the fifth aspect or the possible implementations of the fifth aspect. The network management network element may include units or modules configured to schedule a resource for a network slice according to any one of the fifth aspect or the possible implementations of the fifth aspect, for example, a receiving unit, a sending unit, and a processing unit.

A thirteenth aspect of this application provides a slice management network element. The slice management network element is configured to perform the resource scheduling method for a network slice according to any one of the sixth aspect or the possible implementations of the sixth aspect. The slice management network element may include units or modules configured to schedule a resource for a network slice according to any one of the sixth aspect or the possible implementations of the sixth aspect, for example, a receiving unit, a sending unit, and a processing unit.

A fourteenth aspect of this application provides a network management network element. The network management network element is configured to perform the resource scheduling method for a network slice according to any one of the seventh aspect or the possible implementations of the seventh aspect. The network management network element may include units or modules configured to schedule a resource for a network slice according to any one of the seventh aspect or the possible implementations of the seventh aspect, for example, a receiving unit, a sending unit, and a processing unit.

A fifteenth aspect of this application provides a slice management network element, including at least one processor, a memory, a transceiver, and a computer-executable instruction that is stored in the memory and that can run on the processor. When the computer-executable instruction is executed by the processor, the processor performs the method according to any one of the first aspect or the possible implementations of the first aspect.

A sixteenth aspect of this application provides a network device, including at least one processor, a memory, a transceiver, and a computer-executable instruction that is stored in the memory and that can run on the processor. When the computer-executable instruction is executed by the processor, the processor performs the method according to any one of the second aspect or the possible implementations of the second aspect.

A seventeenth aspect of this application provides a data analysis network element, including at least one processor, a memory, a transceiver, and a computer-executable instruction that is stored in the memory and that can run on the processor. When the computer-executable instruction is executed by the processor, the processor performs the method according to any one of the third aspect or the possible implementations of the third aspect.

An eighteenth aspect of this application provides a network device, including at least one processor, a memory, a transceiver, and a computer-executable instruction that is stored in the memory and that can run on the processor. When the computer-executable instruction is executed by the processor, the processor performs the method according to any one of the fourth aspect or the possible implementations of the fourth aspect.

A nineteenth aspect of this application provides a network management network element, including at least one processor, a memory, a transceiver, and a computer-executable instruction that is stored in the memory and that can run on the processor. When the computer-executable instruction is executed by the processor, the processor performs the method according to any one of the fifth aspect or the possible implementations of the fifth aspect.

A twentieth aspect of this application provides a slice management network element, including at least one processor, a memory, a transceiver, and a computer-executable instruction that is stored in the memory and that can run on the processor. When the computer-executable instruction is executed by the processor, the processor performs the method according to any one of the sixth aspect or the possible implementations of the sixth aspect.

A twenty-first aspect of this application provides a network management network element, including at least one processor, a memory, a transceiver, and a computer-executable instruction that is stored in the memory and that can run on the processor. When the computer-executable instruction is executed by the processor, the processor performs the method according to any one of the seventh aspect or the possible implementations of the seventh aspect.

A twenty-second aspect of this application provides a computer-readable storage medium storing one or more computer-executable instructions. When the computer-executable instructions are executed by a processor, the processor performs the method according to any one of the first aspect or the possible implementations of the first aspect.

A twenty-third aspect of this application provides a computer-readable storage medium storing one or more computer-executable instructions. When the computer-executable instructions are executed by a processor, the processor performs the method according to any one of the second aspect or the possible implementations of the second aspect.

A twenty-fourth aspect of this application provides a computer-readable storage medium storing one or more computer-executable instructions. When the computer-executable instructions are executed by a processor, the processor performs the method according to any one of the third aspect or the possible implementations of the third aspect.

A twenty-fifth aspect of this application provides a computer-readable storage medium storing one or more computer-executable instructions. When the computer-executable instructions are executed by a processor, the processor performs the method according to any one of the fourth aspect or the possible implementations of the fourth aspect.

A twenty-sixth aspect of this application provides a computer-readable storage medium storing one or more computer-executable instructions. When the computer-executable instructions are executed by a processor, the processor performs the method according to any one of the fifth aspect or the possible implementations of the fifth aspect.

A twenty-seventh aspect of this application provides a computer-readable storage medium storing one or more computer-executable instructions. When the computer-executable instructions are executed by a processor, the processor performs the method according to any one of the sixth aspect or the possible implementations of the sixth aspect.

A twenty-eighth aspect of this application provides a computer-readable storage medium storing one or more computer-executable instructions. When the computer-executable instructions are executed by a processor, the processor performs the method according to any one of the seventh aspect or the possible implementations of the seventh aspect.

A twenty-ninth aspect of this application provides a computer program product storing one or more computer-executable instructions. When the computer-executable instructions are executed by a processor, the processor performs the method according to any one of the first aspect or the possible implementations of the first aspect.

A thirtieth aspect of this application provides a computer program product storing one or more computer-executable instructions. When the computer-executable instructions are executed by a processor, the processor performs the method according to any one of the second aspect or the possible implementations of the second aspect.

A thirty-first aspect of this application provides a computer program product storing one or more computer-executable instructions. When the computer-executable instructions are executed by a processor, the processor performs the method according to any one of the third aspect or the possible implementations of the third aspect.

A thirty-second aspect of this application provides a computer program product storing one or more computer-executable instructions. When the computer-executable instructions are executed by a processor, the processor performs the method according to any one of the fourth aspect or the possible implementations of the fourth aspect.

A thirty-third aspect of this application provides a computer program product storing one or more computer-executable instructions. When the computer-executable instructions are executed by a processor, the processor performs the method according to any one of the fifth aspect or the possible implementations of the fifth aspect.

A thirty-fourth aspect of this application provides a computer program product storing one or more computer-executable instructions. When the computer-executable instructions are executed by a processor, the processor performs the method according to any one of the sixth aspect or the possible implementations of the sixth aspect.

A thirty-fifth aspect of this application provides a computer program product storing one or more computer-executable instructions. When the computer-executable instructions are executed by a processor, the processor performs the method according to any one of the seventh aspect or the possible implementations of the seventh aspect.

A thirty-sixth aspect of this application provides a chip system. The chip system includes a processor configured to support a slice management network element in implementing a function in any one of the first aspect or the possible implementations of the first aspect. In a possible implementation, the chip system may further include a memory. The memory is configured to store a program instruction and data that are necessary for the slice management network element. The chip system may include a chip, or may include a chip and another discrete device.

A thirty-seventh aspect of this application provides a chip system. The chip system includes a processor configured to support a network device in implementing a function in any one of the second aspect or the possible implementations of the second aspect. In a possible implementation, the chip system may further include a memory. The memory is configured to store a program instruction and data that are necessary for the network device. The chip system may include a chip, or may include a chip and another discrete device.

A thirty-eighth aspect of this application provides a chip system. The chip system includes a processor configured to support a data analysis network element in implementing a function in any one of the third aspect or the possible implementations of the third aspect. In a possible implementation, the chip system may further include a memory. The memory is configured to store a program instruction and data that are necessary for the data analysis network element. The chip system may include a chip, or may include a chip and another discrete device.

A thirty-ninth aspect of this application provides a chip system. The chip system includes a processor configured to support a network device in implementing a function in any one of the fourth aspect or the possible implementations of the fourth aspect. In a possible implementation, the chip system may further include a memory. The memory is configured to store a program instruction and data that are necessary for the network device. The chip system may include a chip, or may include a chip and another discrete device.

A fortieth aspect of this application provides a chip system. The chip system includes a processor configured to support a network management network element in implementing a function in any one of the fifth aspect or the possible implementations of the fifth aspect. In a possible implementation, the chip system may further include a memory. The memory is configured to store a program instruction and data that are necessary for the network management network element. The chip system may include a chip, or may include a chip and another discrete device.

A forty-first aspect of this application provides a chip system. The chip system includes a processor configured to support a slice management network element in implementing a function in any one of the sixth aspect or the possible implementations of the sixth aspect. In a possible implementation, the chip system may further include a memory. The memory is configured to store a program instruction and data that are necessary for the slice management network element. The chip system may include a chip, or may include a chip and another discrete device.

A forty-second aspect of this application provides a chip system. The chip system includes a processor configured to support a network management network element in implementing a function in any one of the seventh aspect or the possible implementations of the seventh aspect. In a possible implementation, the chip system may further include a memory. The memory is configured to store a program instruction and data that are necessary for the network management network element. The chip system may include a chip, or may include a chip and another discrete device.

For technical effects brought by any implementation in the eighth aspect, the fifteenth aspect, the twenty-second aspect, the twenty-ninth aspect, and the thirty-sixth aspect, refer to the technical effects brought by different implementations in the first aspect. Details are not described herein again.

For technical effects brought by any implementation in the ninth aspect, the sixteenth aspect, the twenty-third aspect, the thirtieth aspect, and the thirty-seventh aspect, refer to the technical effects brought by different implementations in the second aspect. Details are not described herein again.

For technical effects brought by any implementation in the tenth aspect, the seventeenth aspect, the twenty-fourth aspect, the thirty-first aspect, and the thirty-eighth aspect, refer to the technical effects brought by different implementations in the third aspect. Details are not described herein again.

For technical effects brought by any implementation in the eleventh aspect, the eighteenth aspect, the twenty-fifth aspect, the thirty-second aspect, and the thirty-ninth aspect, refer to the technical effects brought by different implementations in the fourth aspect. Details are not described herein again.

For technical effects brought by any implementation in the twelfth aspect, the nineteenth aspect, the twenty-sixth aspect, the thirty-third aspect, and the fortieth aspect, refer to the technical effects brought by different implementations in the fifth aspect. Details are not described herein again.

For technical effects brought by any implementation in the thirteenth aspect, the twentieth aspect, the twenty-seventh aspect, the thirty-fourth aspect, and the forty-first aspect, refer to the technical effects brought by different implementations in the sixth aspect. Details are not described herein again.

For technical effects brought by any implementation in the fourteenth aspect, the twenty-first aspect, the twenty-eighth aspect, the thirty-fifth aspect, and the forty-second aspect, refer to the technical effects brought by different implementations in the seventh aspect. Details are not described herein again.

A forty-third aspect of this application provides a communications system. The communications system includes: a slice management network element configured to perform the method according to any one of the first aspect or the possible implementations of the first aspect; a network device configured to perform method according to any one of the second aspect or the possible implementations of the second aspect; and a data analysis network element configured to perform the method according to any one of the third aspect or the possible implementations of the third aspect.

A forty-fourth aspect of this application provides a communications system. The communications system includes: a network device configured to perform method according to any one of the fourth aspect or the possible implementations of the fourth aspect; and a network management network element configured to perform the method according to any one of the fifth aspect or the possible implementations of the fifth aspect.

A forty-fifth aspect of this application provides a communications system. The communications system includes: a slice management network element configured to perform the method according to any one of the sixth aspect or the possible implementations of the sixth aspect; and a network management network element configured to perform the method according to any one of the seventh aspect or the possible implementations of the seventh aspect.

In the embodiments of this application, when a resource is scheduled for a network slice, the slice management network element sends, to the network device, information about an area and/or information about a time that need/needs to be referred to, such that the network device can schedule a resource for the network slice based on the information about the area and/or the information about the time. In this way, precise resource scheduling is implemented, network resource utilization is improved, and performance of the network slice is also improved.

A forty-sixth aspect of this application provides a resource scheduling method for a network slice. The method may include: A network device determines status information of a first network slice. The status information of the first network slice includes that the first network slice is in an unsigned service level agreement (SLA) state or in a signed SLA state. The network device schedules a resource for the first network slice based on the status information of the first network slice.

The unsigned SLA state includes a test state or a newly created state. The signed SLA state includes a stable state. The network device may include at least one of the following devices: an access network device, a core network device for allocating a user plane resource or a control plane resource, or a transport network device. It can be learned from the forty-sixth aspect that the network device may schedule the resource for the first network slice based on whether the first network slice is in the unsigned SLA state or in the signed SLA state, thereby improving scheduling accuracy.

In a possible implementation, with reference to the forty-sixth aspect, in a first possible implementation of the forty-sixth aspect, when the network device is an access network device, that the network device schedules a resource for the first network slice based on the status information of the first network slice may include: The network device schedules an air interface resource for the first network slice based on the status information of the first network slice.

In a possible implementation, with reference to the forty-sixth aspect or the first possible implementation of the forty-sixth aspect, in a second possible implementation of the forty-sixth aspect, the method may further include: The network device determines that status information of a second network slice is that the second network slice is in a signed SLA state. When the status information of the first network slice is that the first network slice is in the unsigned SLA state, that the network device schedules a resource for the first network slice based on the status information of the first network slice may include: The network device schedules a resource for the second network slice in preference to the first network slice.

It can be learned from the second possible implementation of the forty-sixth aspect that the network device preferentially schedules a resource for a network slice for which an SLA has been signed. In this way, a network slice for which no SLA has been signed can be prevented from affecting the network slice for which the SLA has been signed. Because the first network slice is in the unsigned SLA state, the network device may reduce a priority of resource scheduling for the first network slice. In other words, the network device preferentially schedules a resource for another network slice for which an SLA has been signed, and schedules a resource for the first network slice only when there is a remaining resource.

In a possible implementation, with reference to the forty-sixth aspect or the first possible implementation of the forty-sixth aspect, in a third possible implementation of the forty-sixth aspect, the method may further include: The network device determines that status information of a second network slice is that the second network slice is in an unsigned SLA state.

When the status information of the first network slice is that the first network slice is in the signed SLA state, that the network device schedules a resource for the first network slice based on the status information of the first network slice may include: The network device schedules the resource for the first network slice in preference to the second network slice.

It can be learned from the third possible implementation of the forty-sixth aspect that, if the network device learns that the first network slice is in the signed SLA state, or the first network slice enters the signed SLA state from the unsigned SLA state, the network device increases a priority of resource scheduling for the first network slice, to prevent another newly established network slice from preempting a resource of the first network slice.

In a possible implementation, with reference to any one of the forty-sixth aspect, or the first to the third possible implementations of the forty-sixth aspect, in a fourth possible implementation of the forty-sixth aspect, that a network device determines status information of a first network slice may include: The network device determines the status information of the first network slice based on status indication information that is of the first network slice and sent by a network management network element. The status indication information includes the status information of the first network slice.

In a possible implementation, with reference to any one of the forty-sixth aspect, or the first to the fourth possible implementations of the forty-sixth aspect, in a fifth possible implementation of the forty-sixth aspect, the method may further include: The network device receives resource configuration information that is of the first network slice and sent by the network management network element. The resource configuration information includes maximum resource configuration information and/or guaranteed resource configuration information. The maximum resource configuration information is used to indicate maximum available resources of the first network slice. The guaranteed resource configuration information is used to indicate a guaranteed available resource of the first network slice. The network device schedules a resource for the first network slice based on the resource configuration information of the first network slice and the status information of the first network slice. The resource configuration information may further include the status information of the first network slice.

In a possible implementation, with reference to the fifth possible implementation of the forty-sixth aspect, in a sixth possible implementation of the forty-sixth aspect, when the network device is an access network device, the maximum resource configuration information is maximum air interface resource configuration information, and/or the guaranteed resource configuration information is guaranteed air interface resource configuration information.

A forty-seventh aspect of this application provides a resource scheduling method for a network slice. The method may include: A network management network element determines status information of a first network slice. The status information of the first network slice includes that the first network slice is in an unsigned SLA state or in a signed SLA state. The network management network element sends the status information of the first network slice to a network device. The status information of the first network slice is used by the network device to schedule a resource for the first network slice.

The unsigned SLA state may include a test state or a newly created state. The signed SLA state includes a stable state. The network management network element is a device that is capable of deploying a network resource and capable of managing and maintaining operation of a network, for example, may be an OAM, an NSSF, or an NSMF. The network device may include at least one of the following devices: an access network device, a core network device for allocating a user plane resource or a control plane resource, or a transport network device. It can be learned from the forty-sixth aspect that the network management network element can notify the status information of the first network slice to the network device in time, such that the network device performs corresponding resource scheduling based on an SLA state of the first network slice.

In a possible implementation, with reference to the forty-seventh aspect, in a first possible implementation of the forty-seventh aspect, the method may further include: The network management network element determines resource configuration information of the first network slice. The resource configuration information includes maximum resource configuration information and/or guaranteed resource configuration information. The maximum resource configuration information is used to indicate maximum available resources of the first network slice. The guaranteed resource configuration information is used to indicate a guaranteed available resource of the first network slice. The network management network element sends the resource configuration information of the first network slice to a network device. The resource configuration information is used by the network device to schedule a resource for the first network slice based on the resource configuration information. The resource configuration information may further include the status information of the first network slice.

In a possible implementation, with reference to the forty-seventh aspect or the first possible implementation of the forty-seventh aspect, in a second possible implementation of the forty-seventh aspect, when the network device is an access network device, the maximum resource configuration information is maximum air interface resource configuration information, and/or the guaranteed resource configuration information is guaranteed air interface resource configuration information.

In a possible implementation, with reference to the first or second possible implementation of the forty-seventh aspect, in a third possible implementation of the forty-seventh aspect, the resource configuration information includes the status information of the first network slice.

A forty-eighth aspect of this application provides a resource scheduling method for a network slice. The method may include: A slice management network element determines that service experience information of a first network slice cannot satisfy or over-satisfies target service level agreement information of the first network slice due to a first network domain. The slice management network element sends slice quality information of the first network slice to a network device in the first network domain. The slice quality information is used by the network device to schedule a resource for the first network slice based on the slice quality information.

The slice quality information includes at least one of the following information: the service experience information of the first network slice or satisfaction level information of the service experience information of the first network slice relative to the target service level agreement requirement information.

It can be learned from the forty-eighth aspect that the slice management network element may first precisely locate a network domain (for example, an access network domain) due to which the service experience information of the first network slice cannot satisfy the target service level agreement requirement information, and then provide the slice quality information of the first network slice for a network device in the network domain, such that the network device in the network domain can adjust resource scheduling. This method can avoid blindly adjusting a resource scheduling status of another normally working network domain, and improve accuracy of resource scheduling.

In a possible implementation, with reference to the forty-eighth aspect, in a first possible implementation of the forty-eighth aspect, the method may further include: The slice management network element obtains the slice quality information of the first network slice from a data analysis network element or a network management network element.

In a possible implementation, with reference to the first possible implementation of the forty-eighth aspect, in a second possible implementation of the forty-eighth aspect, when the slice quality information of the first network slice is the service experience information of the first network slice, the method may further include: The slice management network element determines, based on the service experience information of the first network slice, the satisfaction level information of the service experience information of the first network slice relative to the target service level agreement requirement information.

In a possible implementation, with reference to the forty-eighth aspect, the first possible implementation or the second possible implementation of the forty-eighth aspect, in a third possible implementation of the forty-eighth aspect, the method may further include: The slice management network element determines that the service experience information of the first network slice cannot satisfy or over-satisfies the target service level agreement information of the first network slice.

In a possible implementation, with reference to any one of the forty-eighth aspect, or the first to the third possible implementations of the forty-eighth aspect, in a fourth possible implementation of the forty-eighth aspect, that a slice management network element determines that service experience information of a first network slice cannot satisfy or over-satisfies target service level agreement information of the first network slice due to a first network domain may include: The slice management network element obtains indication information from the network management network element. The indication information is used to indicate that the service experience information of the first network slice cannot satisfy or over-satisfies the target service level agreement information of the first network slice due to the first network domain.

The slice management network element determines, based on the indication information, that the service experience information of the first network slice cannot satisfy or over-satisfies the target service level agreement information of the first network slice due to the first network domain.

In a possible implementation, with reference to the fourth possible implementation of the forty-eighth aspect, in a fifth possible implementation of the forty-eighth aspect, that the slice management network element obtains indication information from the network management network element may include: The slice management network element sends a request message to the network management network element. The request message is used to request the network domain due to which the service experience information of the first network slice cannot satisfy or over-satisfies the target service level agreement information of the first network slice.

The slice management network element receives a response message sent by the network management network element. The response message includes the indication information.

In a possible implementation, with reference to the fourth or the fifth possible implementation of the forty-eighth aspect, in a sixth possible implementation of the forty-eighth aspect, before the slice management network element sends the slice quality information of the first network slice to the network device in the first network domain, the method may further include: The slice management network element obtains confidence level information from the network management network element. The confidence level information is used to indicate a confidence level of the indication information.

That the slice management network element sends slice quality information of the first network slice to a network device in the first network domain may include: The slice management network element sends the slice quality information of the first network slice to the network device in the first network domain based on the confidence level information.

In a possible implementation, with reference to any one of the forty-eighth aspect, or the first to the third possible implementations of the forty-eighth aspect, in a seventh possible implementation of the forty-eighth aspect, the service experience information includes service experience information that is of the first network slice and that corresponds to information about an area and/or information about a time. The information about the area may be information about a problematic area, and the information about the time may be information about a problematic time.

In a possible implementation, with reference to the forty-eighth aspect, or the first to the seventh possible implementations of the forty-eighth aspect, in an eighth possible implementation of the forty-eighth aspect, the satisfaction level information includes dissatisfaction, satisfaction, or over-satisfaction.

In a possible implementation, with reference to any one of the forty-eighth aspect, or the first to the eighth possible implementations of the forty-eighth aspect, in a ninth possible implementation of the forty-eighth aspect, the method may further include: The slice management network element obtains initial service level agreement requirement information of the first network slice. The slice management network element determines at least one piece of service level agreement requirement information based on the initial service level agreement requirement information of the first network slice. The slice management network element determines one of the at least one piece of service level agreement requirement information as the target service level agreement requirement information.

In a possible implementation, with reference to any one of the forty-eighth aspect, or the first to the ninth possible implementations of the forty-eighth aspect, in a tenth possible implementation of the forty-eighth aspect, the first network domain includes at least one of the following: an access network domain, a core network domain, and a transport network domain.

In a possible implementation, with reference to any one of the forty-eighth aspect, or the first to the tenth possible implementations of the forty-eighth aspect, in an eleventh possible implementation of the forty-eighth aspect, the network device includes at least one of the following devices: an access network device, a core network device for allocating a user plane resource or a control plane resource, or a transport network device.

In a possible implementation, with reference to any one of the forty-eighth aspect, or the first to the eleventh possible implementations of the forty-eighth aspect, in a twelfth possible implementation of the forty-eighth aspect, the service level agreement requirement information includes at least one of the following information: user quantity requirement information of the first network slice, average user experience requirement information of a service, or user satisfaction percentage requirement information of the service. A user satisfaction percentage of the service is a percentage of a quantity of users whose user experience corresponding to the service is not less than a preset value to a total quantity of users of the service.

A forty-ninth aspect of this application provides a resource scheduling method for a network slice. The method includes: A network management network element determines that service experience information of a first network slice cannot satisfy or over-satisfies target service level agreement information of the first network slice due to a first network domain. The network management network element sends indication information to a slice management network element. The indication information is used to indicate that the service experience information of the first network slice cannot satisfy or over-satisfies the target service level agreement information of the first network slice due to the first network domain.

It can be learned from the forty-ninth aspect that the slice management network element may be notified of the first network domain due to which the service experience information of the first network slice cannot satisfy or over-satisfies the target service level agreement information of the first network slice, for example, an access network domain. As such, resource scheduling of another normally working network domain can be prevented from being blindly adjusted, and accuracy of resource scheduling can be improved.

In a possible implementation, with reference to the forty-ninth aspect, in a first possible implementation of the forty-ninth aspect, the method further includes: The network management network element determines confidence level information. The confidence level information is used to indicate a confidence level of the indication information. The network management network element sends the confidence level information to the slice management network element.

In a possible implementation, with reference to the forty-ninth aspect or the first possible implementation of the forty-ninth aspect, in a second possible implementation of the forty-ninth aspect, the method may further include: The network management network element obtains slice quality information of the first network slice from a data analysis network element. The slice quality information includes at least one of the following information: service experience information of the first network slice, or satisfaction level information of the service experience information of the first network slice relative to the target service level agreement requirement information.

In a possible implementation, with reference to the second possible implementation of the forty-ninth aspect, in a third possible implementation of the forty-ninth aspect, when the slice quality information of the first network slice is the service experience information of the first network slice, the method further includes: The network management network element determines, based on the service experience information of the first network slice, the satisfaction level information of the service experience information of the first network slice relative to the target service level agreement requirement information.

In a possible implementation, with reference to any one of the forty-ninth aspect or the first to the third possible implementations of the forty-ninth aspect, in a fourth possible implementation of the forty-ninth aspect, before the network management network element determines that the service experience information of the first network slice cannot satisfy or over-satisfies the target service level agreement information of the first network slice due to the first network domain, the method may further include: The network management network element determines that the service experience information of the first network slice cannot satisfy or over-satisfies the target service level agreement information of the first network slice.

In a possible implementation, with reference to any one of the forty-ninth aspect, or the first to the fourth possible implementations of the forty-ninth aspect, in a fifth possible implementation of the forty-ninth aspect, the service experience information includes service experience information that is of the first network slice and that corresponds to information about an area and/or information about a time.

In a possible implementation, with reference to any one of the forty-ninth aspect, or the first to the fifth possible implementations of the forty-ninth aspect, in a sixth possible implementation of the forty-ninth aspect, before the network management network element sends the indication information to the slice management network element, the method further includes: The network management network element receives a request message sent by the slice management network element. The request message is used to request the network domain due to which the service experience information cannot satisfy or over-satisfies the target service level agreement information of the first network slice.

That the network management network element sends indication information to a slice management network element includes: The network management network element sends a response message to the slice management network element. The response message includes the indication information.

In a possible implementation, with reference to any one of the forty-ninth aspect, or the first to the sixth possible implementations of the forty-ninth aspect, in a seventh possible implementation of the forty-ninth aspect, the method may further include: The slice management network element obtains initial service level agreement requirement information of the first network slice.

The slice management network element determines at least one piece of service level agreement requirement information based on the initial service level agreement requirement information of the first network slice.

The slice management network element determines one of the at least one piece of service level agreement requirement information as the target service level agreement requirement information.

In a possible implementation, with reference to any one of the forty-ninth aspect, or the first to the seventh possible implementations of the forty-ninth aspect, in an eighth possible implementation of the forty-ninth aspect, the first network domain includes at least one of the following: an access network domain, a core network domain, or a transport network domain.

In a possible implementation, with reference to any one of the forty-ninth aspect, or the first to the eighth possible implementations of the forty-ninth aspect, in a ninth possible implementation of the forty-ninth aspect, the service level agreement requirement information includes at least one of the following information: user quantity requirement information of the first network slice, average user experience requirement information of a service, or user satisfaction percentage requirement information of the service. A user satisfaction percentage of the service is a percentage of a quantity of users whose user experience corresponding to the service is not less than a preset value to a total quantity of users of the service.

A fiftieth aspect of this application provides a network device. The network device is configured to perform the resource scheduling method for a network slice according to any one of the forty-sixth aspect or the possible implementations of the forty-sixth aspect. The network device may include units or modules configured to schedule a resource for a network slice according to any one of the forty-sixth aspect or the possible implementations of the forty-sixth aspect, for example, a receiving unit, a sending unit, and a processing unit.

A fifty-first aspect of this application provides a network management network element. The network management network element is configured to perform the resource scheduling method for a network slice according to any one of the forty-seventh aspect or the possible implementations of the forty-seventh aspect. The network management network element may include units or modules configured to schedule a resource for a network slice according to any one of the forty-seventh aspect or the possible implementations of the forty-seventh aspect, for example, a receiving unit, a sending unit, and a processing unit.

A fifty-second aspect of this application provides a slice management network element. The slice management network element is configured to perform the resource scheduling method for a network slice according to any one of the forty-eighth aspect or the possible implementations of the forty-eighth aspect. The slice management network element may include units or modules configured to schedule a resource for a network slice according to any one of the forty-eighth aspect or the possible implementations of the forty-eighth aspect, for example, a receiving unit, a sending unit, and a processing unit.

A fifty-third aspect of this application provides a network management network element. The network management network element is configured to perform the resource scheduling method for a network slice according to any one of the forty-ninth aspect or the possible implementations of the forty-ninth aspect. The network management network element may include units or modules configured to schedule a resource for a network slice according to any one of the forty-ninth aspect or the possible implementations of the forty-ninth aspect, for example, a receiving unit, a sending unit, and a processing unit.

A fifty-fourth aspect of this application provides a network device, including at least one processor, a memory, a transceiver, and a computer-executable instruction that is stored in the memory and that can run on the processor. When the computer-executable instruction is executed by the processor, the processor performs the method according to any one of the forty-sixth aspect or the possible implementations of the forty-sixth aspect.

A fifty-fifth aspect of this application provides a network management network element, including at least one processor, a memory, a transceiver, and a computer-executable instruction that is stored in the memory and that can run on the processor. When the computer-executable instruction is executed by the processor, the processor performs the method according to any one of the forty-seventh aspect or the possible implementations of the forty-seventh aspect.

A fifty-sixth aspect of this application provides a slice management network element, including at least one processor, a memory, a transceiver, and a computer-executable instruction that is stored in the memory and that can run on the processor. When the computer-executable instruction is executed by the processor, the processor performs the method according to any one of the forty-eighth aspect or the possible implementations of the forty-eighth aspect.

A fifty-seventh aspect of this application provides a network management network element, including at least one processor, a memory, a transceiver, and a computer-executable instruction that is stored in the memory and that can run on the processor. When the computer-executable instruction is executed by the processor, the processor performs the method according to any one of the forty-ninth aspect or the possible implementations of the forty-ninth aspect.

A fifty-eighth aspect of this application provides a computer-readable storage medium storing one or more computer-executable instructions. When the computer-executable instructions are executed by a processor, the processor performs the method according to any one of the forty-sixth aspect or the possible implementations of the forty-sixth aspect.

A fifty-ninth aspect of this application provides a computer-readable storage medium storing one or more computer-executable instructions. When the computer-executable instructions are executed by a processor, the processor performs the method according to any one of the forty-seventh aspect or the possible implementations of the forty-seventh aspect.

A sixtieth aspect of this application provides a computer-readable storage medium storing one or more computer-executable instructions. When the computer-executable instructions are executed by a processor, the processor performs the method according to any one of the forty-eighth aspect or the possible implementations of the forty-eighth aspect.

A sixth-first aspect of this application provides a computer-readable storage medium storing one or more computer-executable instructions. When the computer-executable instructions are executed by a processor, the processor performs the method according to any one of the forty-ninth aspect or the possible implementations of the forty-ninth aspect.

A sixty-second aspect of this application provides a computer program product storing one or more computer-executable instructions. When the computer-executable instructions are executed by a processor, the processor performs the method according to any one of the forty-sixth aspect or the possible implementations of the forty-sixth aspect.

A sixty-third aspect of this application provides a computer program product storing one or more computer-executable instructions. When the computer-executable instructions are executed by a processor, the processor performs the method according to any one of the forty-seventh aspect or the possible implementations of the forty-seventh aspect.

A sixty-fourth aspect of this application provides a computer program product storing one or more computer-executable instructions. When the computer-executable instructions are executed by a processor, the processor performs the method according to any one of the forty-eighth aspect or the possible implementations of the forty-eighth aspect.

A sixty-fifth aspect of this application provides a computer program product storing one or more computer-executable instructions. When the computer-executable instructions are executed by a processor, the processor performs the method according to any one of the forty-ninth aspect or the possible implementations of the forty-ninth aspect.

A sixty-sixth aspect of this application provides a chip system. The chip system includes a processor configured to support a network device in implementing a function in any one of the forty-sixth aspect or the possible implementations of the forty-sixth aspect. In a possible implementation, the chip system may further include a memory. The memory is configured to store a program instruction and data that are necessary for the network device. The chip system may include a chip, or may include a chip and another discrete device.

A sixth-seventh aspect of this application provides a chip system. The chip system includes a processor configured to support a network management network element in implementing a function in any one of the forty-seventh aspect or the possible implementations of the forty-seventh aspect. In a possible implementation, the chip system may further include a memory. The memory is configured to store a program instruction and data that are necessary for the network management network element. The chip system may include a chip, or may include a chip and another discrete device.

A sixth-eighth aspect of this application provides a chip system. The chip system includes a processor configured to support a slice management network element in implementing a function in any one of the forty-eighth aspect or the possible implementations of the forty-eighth aspect. In a possible implementation, the chip system may further include a memory. The memory is configured to store a program instruction and data that are necessary for the slice management network element. The chip system may include a chip, or may include a chip and another discrete device.

A sixty-ninth aspect of this application provides a chip system. The chip system includes a processor configured to support a network management network element in implementing a function in any one of the forty-ninth aspect or the possible implementations of the forty-ninth aspect. In a possible implementation, the chip system may further include a memory. The memory is configured to store a program instruction and data that are necessary for the network management network element. The chip system may include a chip, or may include a chip and another discrete device.

For technical effects brought by any implementation in the fiftieth aspect, the fifty-fourth aspect, the fifty-eighth aspect, the sixty-second aspect, and the sixty-sixth aspect, refer to the technical effects brought by different implementations in the forty-sixth aspect. Details are not described herein again.

For technical effects brought by any implementation in the fifty-first aspect, the fifty-fifth aspect, the fifty-ninth aspect, the sixty-third aspect, and the sixty-seventh aspect, refer to the technical effects brought by different implementations in the forty-seventh aspect. Details are not described herein again.

For technical effects brought by any implementation in the fifty-second aspect, the fifty-sixth aspect, the sixtieth aspect, the sixty-fourth aspect, and the sixty-eighth aspect, refer to the technical effects brought by different implementations in the forty-eighth aspect. Details are not described herein again.

For technical effects brought by any implementation in the fifty-third aspect, the fifty-seventh aspect, the sixty-first aspect, the sixty-fifth aspect, and the sixty-ninth aspect, refer to the technical effects brought by different implementations in the forty-ninth aspect. Details are not described herein again.

DESCRIPTION OF EMBODIMENTS

In the specification, claims, and accompanying drawings of this application, the terms such as "first", "second", "third", and "fourth" are intended to distinguish between similar objects but do not necessarily indicate a specific order or sequence. It should be understood that the terms used in such a way are interchangeable in proper circumstances, and this is merely a discrimination manner for describing objects having a same attribute in embodiments of this application. In addition, the terms "include", "have" and any other variants mean to cover the non-exclusive inclusion, such that a process, method, system, product, or device that includes a series of units is not necessarily limited to those units, but may include other units not expressly listed or inherent to such a process, method, product, or device.

Figure 1:
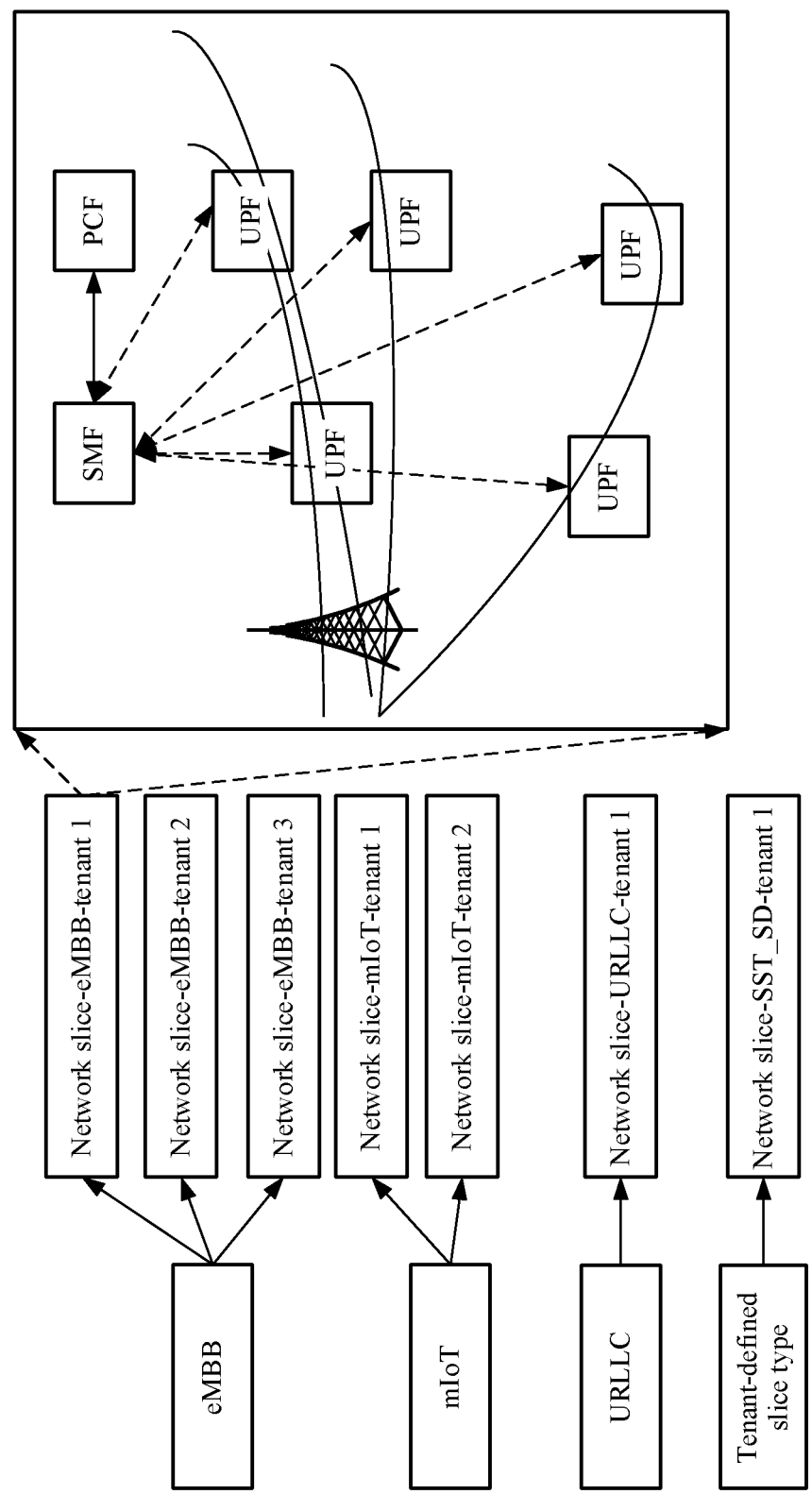
FIG. 1 is a schematic diagram of a scenario of a network slice.

A network slice form is used in a 5th generation (5G) network, such that network resources of proper features are allocated to services having different requirements. Requirements of different services are different, and types of network slices are also different. As shown in FIG. 1, several types of network slices and correspondences among the types of network slices, tenants, and network resources are described. Certainly, solutions provided in the embodiments of this application are not limited to the 5G network, and are applicable to all networks including network slices.

FIG. 1 is a schematic diagram of a scenario of a network slice according to an embodiment of this application.

As shown in FIG. 1, there are a plurality of different types of network slices, for example, enhanced mobile broadband (eMBB), ultra-reliable low-latency communication (URLLC), and massive internet of things (mIoT). Certainly, the network slice is not limited to the several types listed herein, and the network slice may further have a tenant-defined type.

Each type of network slice has its own characteristics and is applicable to a different field. Examples are as follows.

The eMBB is mainly used for applications such as ultra high-definition video, holographic technology, augmented reality, and virtual reality, and has high requirements on network bandwidth and a network speed.

The URLLC is mainly used in fields such as unmanned driving, internet of vehicles, automated factory, and telemedicine, and requires low latency and high reliability.

The mIoT is mainly used to deploy massive internet of things sensors in fields such as measurement, construction, agriculture, logistics, smart city, and home, and does not have high requirements on latency and mobility.

The tenants can rent different types of network slices based on their requirements. Most tenants are enterprises that provide various applications.

A network slice is actually a division of a radio access network resource, a core network resource, and a transmission resource. When different types of slices provide services for users, corresponding radio access network resources, core network resources, and transmission resources provide service support for the users.

The network slice in this application may also be referred to as a slice for short, and includes but is not limited to a slice, a slice instance, or a slice sub-instance. The slice may be uniquely identified using a single network slice selection assistance information (S-NSSAI) ID, the slice instance may be uniquely identified using a network slice information (NSI) ID, and the slice sub-instance may be uniquely identified using a network slice selection information (NSSI) ID.

Resources of the network slice are managed and controlled by a network management network element. The network management network element is a device that is capable of deploying a network resource and capable of managing and maintaining operation of a network. The network management network element may be located on a management plane of a carrier network. For example, the network management network element may be an operation, administration, and maintenance (OAM) network element. The network management network element may alternatively be located on a control plane of the carrier network. For example, the network management network element may alternatively be a network slice selection function (NSSF) network element. The network management network element may notify, based on an actual status of the network slice, a network device such as an access network device, a core network device, a transport network device, or another slice management network element, to adjust a corresponding resource of the network slice.

When managing and controlling resources of the network slice, the slice management network element may further obtain related information of the network slice, for example, information about an area corresponding to the network slice or information about a time corresponding to the network slice, from a data analysis network element, such that the network device may schedule a resource based on the information about the area corresponding to the network slice or information about the time corresponding to the network slice. This may improve accuracy and utilization of resource scheduling, and also improve performance of the network slice. The data analysis network element may be a network data analytics function (NWDAF) network element, and may also be located on the management plane of the carrier network. For example, the data analysis network element may be an MDAS.

Figure 2:
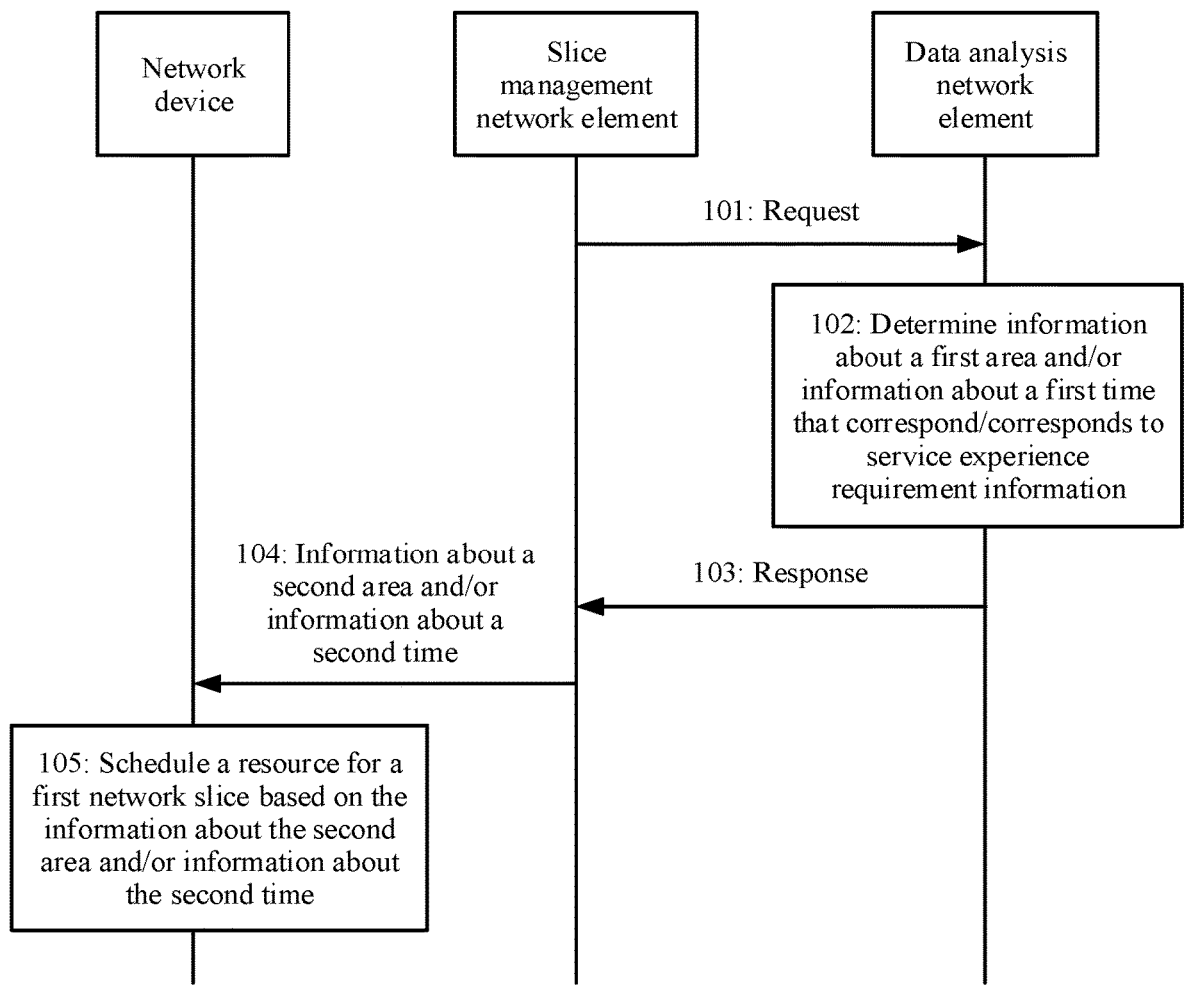
FIG. 2 is a schematic diagram of an embodiment of a resource scheduling method for a network slice according to an embodiment of this application.

FIG. 2 is a schematic diagram of an embodiment of a resource scheduling method for a network slice according to an embodiment of this application.

As shown in FIG. 2, the embodiment of the resource scheduling method for a network slice provided in this embodiment of this application may include the following steps.

101: A slice management network element sends a request to a data analysis network element. The request includes service experience requirement information of a first network slice.

The slice management network element is a network element that is capable of managing and controlling user access, resource deployment, and function execution of a network slice. The slice management network element may be located on a control plane of a carrier network. For example, the slice management network element is a network slice selection function (NSSF) network element. The slice management network element may alternatively be located on a management plane of the carrier network. For example, the slice management network element is an operation, administration, and maintenance (OAM) network element. The data analysis network element may be a network data analytics function (NWDAF) network element, and may also be located on the management plane of the carrier network. For example, the data analysis network element may be an MDAS.

The first network slice may be any network slice in the carrier network, may be a newly created network slice in a test state, or may be a network slice in a stable state.

The service experience requirement information of the first network slice may include at least one of the following information: a requirement on a quantity of users of the first network slice, a requirement on an average user experience of a service, or a requirement on a user satisfaction percentage of a service, where the user satisfaction percentage of the service is a percentage of a quantity of users whose user experience corresponding to the service is not less than a preset value to a total quantity of users of the service. The requirement on the quantity of users may be a filter requirement on the quantity of users, and the requirement on the quantity of users may include a requirement on a quantity of registered users and/or a requirement on a quantity of online users. The requirement on the average user experience of the service may be a filter requirement on the average user experience of the service, and the requirement on the average user experience of the service may include a filter requirement on a mean opinion score (MOS). The requirement on the user satisfaction percentage of the service may be a filter requirement on the user satisfaction percentage of the service.

The service experience requirement information of the first network slice means information corresponding to target service level agreement requirement information.

The target service level agreement requirement information includes a requirement on a quantity of users of the first network slice, a requirement on an average user experience of a service, or a requirement on a user satisfaction percentage of a service, where the user satisfaction percentage of the service is a percentage of a quantity of users whose user experience corresponding to the service is not less than a preset value to a total quantity of users of the service. The requirement on the quantity of users may include a requirement on a quantity of registered users and/or a requirement on a quantity of online users. The requirement on the average user experience of the service may be a requirement on the average user experience of the service, and the average user experience of the service may include a mean opinion score (MOS). The requirement on the user satisfaction percentage of the service may be a requirement on the user satisfaction percentage of the service.

The service experience requirement information is used to filter a problematic area and/or time of the first network slice.

The service experience requirement information of the first network slice may include positive service experience requirement information and/or negative service experience requirement information. The positive service experience requirement information is filter information that first service level agreement requirement information is over-satisfied, and the negative service experience requirement information is filter information that second service level agreement requirement information is not satisfied.

The first service level agreement requirement information and the second service level agreement requirement information may be the same as or different from the target service level agreement requirement information.

For example, the target service level agreement requirement is that a maximum quantity of registered users of the slice is equal to 1,000,000, an average MOS of the service is equal to 3, and a user satisfaction percentage of the service is equal to 90%.

In a possible design, when the first service level agreement requirement information and the second service level agreement requirement information are the same as the target service level agreement requirement information, the positive service experience requirement information is that the maximum quantity of registered users of the slice is greater than 1,000,000, the average MOS of the service is greater than 3, and the user satisfaction percentage of the service is greater than 90%; and the negative service experience requirement information is that the maximum quantity of registered users of the slice is less than 1,000,000, the average MOS of the service is less than 3, and the user satisfaction percentage is less than 90%.

In another possible design, when the first service level agreement requirement information or the second service level agreement requirement information is different from the target service level agreement requirement information, the positive service experience requirement information is that the maximum quantity of registered users of the slice is greater than 1,200,000, the average MOS of the service is greater than 4, and the user satisfaction percentage of the service is greater than 95%; and the negative service experience requirement information is that the maximum quantity of registered users of the slice is less than 800,000, the average MOS of the service is less than 2.5, and the user satisfaction percentage is less than 85%.

In a possible implementation, the target service level agreement requirement information may be determined in the following manner.

The slice management network element obtains initial service level agreement requirement information of the first network slice.

The slice management network element determines at least one piece of service level agreement requirement information based on the initial service level agreement requirement information of the first network slice.

The slice management network element determines one of the at least one piece of service level agreement requirement information as the target service level agreement requirement information.

The slice management network element may obtain the initial service level agreement requirement information of the first network slice from a tenant, a network management network element, or carrier configuration information.

In a possible design, the initial service level agreement requirement information has a plurality of grades. Examples are as follows.

1: The maximum quantity of registered users is equal to 1,050,000, the average MOS of the service is equal to 3, and the user satisfaction percentage of the service is equal to 95%.

2: The maximum quantity of registered users is equal to 1,000,000, the average MOS of the service is equal to 3, and the user satisfaction percentage of the service is equal to 90%.

3: The maximum quantity of registered users is equal to 950,000, the average MOS of the service is equal to 3, and the user satisfaction percentage of the service is equal to 85%.

4: The maximum quantity of registered users is equal to 900,000, the average MOS of the service is equal to 3, and the user satisfaction percentage of the service is equal to 80%.

In this case, the slice management network element may directly determine service level agreement requirement information of one grade in the initial service level agreement requirement information as the target service level agreement requirement information. For example, the slice management network element determines that the target service level agreement requirement information is that the maximum quantity of registered users is equal to 950,000, the average MOS of the service is equal to 3, and the user satisfaction percentage of the service is 85%.

In another possible implementation, the initial service level agreement requirement information has only one grade. For example, the maximum quantity of registered users is 1,000,000, the average MOS of the service is 3, and the user satisfaction percentage of the service is 90%. In this case, the slice management network element may determine service level agreement requirement information of a plurality of grades based on the initial service level agreement requirement information. Examples are as follows.

1: The maximum quantity of registered users is equal to 1,050,000, the average MOS of the service is equal to 3, and the user satisfaction percentage of the service is equal to 95%.

2: The maximum quantity of registered users is equal to 1,000,000, the average MOS of the service is equal to 3, and the user satisfaction percentage of the service is equal to 90%.

3: The maximum quantity of registered users is equal to 950,000, the average MOS of the service is equal to 3, and the user satisfaction percentage of the service is equal to 85%.

4: The maximum quantity of registered users is equal to 900,000, the average MOS of the service is equal to 3, and the user satisfaction percentage of the service is equal to 80%.

Then, the slice management network element determines service level agreement requirement information of one grade in the service level agreement requirement information of the plurality of grades as the target service level agreement requirement information. For example, the target service level agreement requirement information is that the maximum quantity of registered users is equal to 1,000,000, the average MOS of the service is equal to 3, and the user satisfaction percentage of the service is equal to 90%.

102: After receiving the request sent by the slice management network element, the data analysis network element determines information about a first area and/or information about a first time that correspond/corresponds to the service experience requirement information.

The information about the first area usually refers to an area in which the positive service experience requirement information or the negative service experience requirement information is satisfied. The information about the first time usually refers to a time in which the positive service experience requirement information or the negative service experience requirement information is satisfied.

The network slice usually has a correspondence with an area and a time. A radio access network resource, core network resource, or transport network resource corresponding to a network slice may vary as an area or a time of the network slice varies. Therefore, the network slice may satisfy the target service level agreement requirement information in some areas and/or some times, cannot satisfy the target service level agreement requirement information in some areas or/and some times, and over-satisfies the target service level agreement requirement information in some areas or/and some times.

In this embodiment of this application, the data analysis network element may determine, based on the service experience requirement information, an area or a time in which the target service level agreement requirement cannot be satisfied, or an area or a time in which the target service level agreement requirement is over-satisfied. For example, the data analysis network element may determine, based on the negative service experience requirement information, an area or a time in which the target service level agreement requirement cannot be satisfied. Alternatively the data analysis network element may determine, based on the positive service experience requirement information, an area or time in which the target service level agreement requirement is over-satisfied.

Information about an area may be information that is about an area and defined in a 3rd generation partnership project (3GPP) communications network, which may be referred to as information about a communications network area for short, for example, a serving cell A or a registration area B. The information about the area may alternatively be information that is about an area and defined in a non-3GPP communications network. For example, the location information is a specific geographical location range, for example, longitude and latitude or global positioning system (GPS) location information, which may be referred to as information about a geographical area for short. This is not limited in this embodiment of this application.

Information about a time may be an absolute time, for example, from 00:00 on Jan. 1, 2017 to 24:00 on Jan. 30, 2017, or from Monday to Friday every week. Alternatively, information about a time may be information about a relative time, for example, within one month before the request is received. A granularity of the information about the time may be an hour, a minute, or a day. This is not limited in this embodiment of this application.

103: The data analysis network element sends a response to the slice management network element. The response includes the information about the first area and/or the information about the first time that correspond/corresponds to the service experience requirement information.

In a possible implementation, the data analysis network element determines first service experience information that is of the first network slice and that corresponds to the information about the first area and/or the information about the first time. The response further includes the first service experience information that is of the first network slice and that corresponds to the information about the first area and/or the information about the first time.

The first service experience information corresponds to the information about the first area and/or the information about the first time.

In a possible implementation, the first service experience information of the first network slice includes at least one of the following information: user quantity information of the first network slice, user quantity information of a service, average service experience information of a service, and user satisfaction percentage information of a service. A user satisfaction percentage of the service is a percentage of a quantity of users whose user experience corresponding to the service is not less than a preset value to a total quantity of users of the service. The user quantity information of the first network slice may include registered user quantity information and/or online user quantity information that are/is of the first network slice. The user quantity information of the service may include registered user quantity information and/or online user quantity information that are/is of the service. The average service experience information of the service may include a mean opinion score MOS of the service. The user satisfaction percentage information of the service may be: For example, service user satisfaction of a service A refers to that a percentage of users whose MOSs of the service A are greater than 3 is 90%.

104: After receiving the response sent by the data analysis network element, the slice management network element sends information about a second area and/or information about a second time to the network device based on the information about the first area and/or the information about the first time.

The information about the second area may be the same as the information about the first area, and the information about the second time may also be the same the information about the first time.

Alternatively, the information about the second area may be different from the information about the first area, and the information about the second time may be different from the information about the first time.

The slice management network element may determine the information about the second area based on the information about the first area, and a format of the information about the second area may be different from a format of the information about the first area.

The slice management network element may determine the information about the second time based on the information about the first time. A format of the information about the second time may be different from a format of the information about the first time. Alternatively, a time indicated by the information about the second time may be included in a time indicated by the information about the first area.

In a possible implementation, the response may further include the first service experience information that is of the first network slice and that corresponds to the information about the first area and/or the information about the first time. In this case, the slice management network element may determine the information about the second area and/or the information about the second time based on the first service experience information.

An area indicated by the information about the first area is the first area, and an area indicated by the information about the second area is the second area. The second area is included in the first area. It may also be understood that the second area is an area that is in the first area and in which a resource problem is more serious, for example, an area in which there are fewer resources or an area in which there are more redundant resources.

In a possible implementation, the slice management network element may further send, to the network device, slice quality information corresponding to the information about the second area and/or the information about the second time. The slice quality information includes at least one of the following information: second service experience information that is of the first network slice and that corresponds to the information about the second area and/or the information about the second time, and satisfaction level information of the second service experience information relative to target service level agreement requirement information of the first network slice.

The second service experience information corresponds to the information about the second area and/or the information about the second time.

The satisfaction level information includes dissatisfaction, satisfaction, and over-satisfaction.

The dissatisfaction, satisfaction, and over-satisfaction may be understood as follows:

For example, the service level agreement requirement (slice SLA requirement) of the network slice is that an average MOS of a service is 3 and a user satisfaction percentage of the service is 90%. The following cases are described.

1: An average MOS of an actual service is 4, and a user satisfaction percentage of the actual service is 95%. This belongs to the over-satisfaction.

2: An average MOS of an actual service is 3, and a user satisfaction percentage of the actual service is 90%. This belongs to the satisfaction.

3: An average MOS of an actual service is 2, and a user satisfaction percentage of the actual service is 85%. This belongs to the dissatisfaction.

In addition to the foregoing representation forms of the dissatisfaction, satisfaction, and over-satisfaction, the satisfaction level information may also have another representation form. For example, the satisfaction level information may be represented as a percentage value. For example, the service experience information is 80% of the target service level agreement requirement information, or the service experience information is 120% of the target service level agreement requirement information. This is not specifically limited herein.

105: The network device may schedule a resource for the first network slice based on the information about the second area and/or the information about the second time.

The network device may include at least one of the following devices: an access network device, a core network device, a transport network device, and a network management network element.

The access network device may be a radio access network (RAN) device, for example, a 5G base station such as a gNodeB (gNB).

The core network device may include at least one of the following devices: a user plane function (UPF) network element, a policy control function (PCF) network element, a session management function (SMF) network element, or an access and mobility management function (AMF) network element.

The transport network device may include a backhaul link between a radio access network and a core network, for example, a router.

When the slice management network element is an NSSF, the network management network element may be an OAM.

When the network device is the access network device, the access network device schedules an access network resource for the first network slice based on the information about the second area, and schedules an access network resource for the first network slice based on the information about the second time.

When the network device is the core network device, the core network device schedules a core network resource for the first network slice based on the information about the second area, and schedules a core network resource for the first network slice based on the information about the second time.

When the network device is the transport network device, the transport network device schedules a transport network resource for the first network slice based on the information about the second area, and schedules a transport network resource for the first network slice based on the information about the second time.

When the network device is the network management network element, the network management network element controls the access network device, the core network device, or the transport network device to adjust a quantity of resources that are scheduled for the first network slice and that correspond to the second area and/or the second time.

In this embodiment of this application, when scheduling a resource for the first network slice, the network device may schedule the resource based on the information about the second area and/or the information about the second time. This may improve accuracy and utilization of resource scheduling, and also improve performance of the first network slice.

In a possible implementation, in step 101, when the slice management network element sends the request, the request may further include information about a third area and/or information about a third time.

The request in this embodiment of this application may be a subscription request message or a direct request message. The direct request message requires the NWDAF to immediately return the response message, and the subscription request message requires the NWDAF to return the response message after a subscription report condition is satisfied.

The third area indicated by the information about the third area includes the first area indicated by the information about the first area, and the information about the third area is used to request, from the data analysis network element, the information that is about the first area in the third area and that corresponds to the service experience requirement information.

The third time indicated by the information about the third time includes the first time indicated by the information about the first time, and the information about the third time is used to request, from the data analysis network element, the information that is about the first time in the third time and that corresponds to the service experience requirement information.

In this embodiment of this application, the third area includes the first area, and the first area includes the second area. The third time includes the first time, and the first time includes the second time.

In a possible implementation, before step 101 in which the slice management network element sends the request to the data analysis network element, the method may further include: The slice management network element obtains third service experience information of the first network slice.

If the third service experience information does not correspond to the target service level agreement requirement information, the slice management network element determines the service experience requirement information of the first network slice. The service experience requirement information of the first network slice corresponds to the target service level agreement requirement.

In a possible design of this embodiment of this application, the third service experience information corresponds to information about a fourth area and/or information about a fourth time that are/is of the first network slice. In other words, the third service experience information is service experience information that is of the first network slice and that corresponds to the fourth information about the area and/or the fourth information about the time. A fourth area may be a service area of the entire network slice, or may be a part of a service area of the entire network slice. A fourth time may be all service times of the entire network slice, or may be some service times of the entire network slice. The first service experience information corresponds to the information about the first area and/or the information about the first time that correspond/corresponds to first network slice, and the second service experience information corresponds to the information about the second area and/or the information about the second time that correspond/corresponds to first network slice. The fourth area includes the first area, and the first area includes the second area. The fourth time includes the first time, and the first time includes the second time.

In a possible implementation, whether the third service experience information corresponds to the target service level agreement requirement information may be determined in the following manner: The slice management network element compares the third service experience information with the target service level agreement requirement information.

If the third service experience information does not satisfy or over-satisfies the target service level agreement requirement information, the slice management network element determines that the third service experience information does not correspond to the target service level agreement requirement information.

In a possible implementation, after it is determined that the third service experience information does not correspond to the target service level agreement requirement information, that the slice management network element determines the service experience requirement information of the first network slice may include: If the third service experience information does not satisfy the target service level agreement requirement information, the slice management network element determines the service experience requirement information that is of the first network slice and that corresponds to the dissatisfaction case, namely, the foregoing negative service experience requirement information.

If the third service experience information over-satisfies the target service level agreement requirement information, the slice management network element determines the service experience requirement information that is of the first network slice and that corresponds to the over-satisfaction case, namely, the foregoing positive service experience requirement information.

When the third service experience information does not satisfy or over-satisfies the target service level agreement requirement information, a quantity of users served by the first network slice may further be adjusted in the following manner: If the third service experience information does not satisfy the target service level agreement requirement information, the slice management network element reduces the quantity of users served by the first network slice.

If the third service experience information over-satisfies the target service level agreement requirement information, the slice management network element increases the quantity of users served by the first network slice.

Actually, in the embodiment corresponding to FIG. 2, both the first area and the second area may be regarded as problematic areas, and both the information about the first time and the information about the second time may be regarded as problematic times.

In the foregoing embodiment, a network domain causing the problematic area and/or the problematic time may be first determined, and then a network device is determined. Therefore, the resource scheduling method for the network slice may further include the following two possible implementations.

In a possible implementation, the resource scheduling method for the network slice may further include: The slice management network element determines that the problematic area and/or the problematic time are/is caused by a first network domain. The slice management network element determines the network device based on the first network domain.

The first network domain may be an access network domain, a core network domain, or a transport network domain.

The problematic area includes the first area or the second area, and the problematic time includes the first time or the second time.

In a possible design, the slice management network element may learn, from the network management network element, that the problematic area and/or the problematic time are/is caused by the first network domain.

When the slice management network element is a slice management network element (for example, the NS SF) located on the control plane of the carrier network, the slice management network element may interact with the network management network element (for example, the OAM) located on the management plane of the carrier network, to learn that the problematic area and/or the problematic time is caused by the first network domain. When the slice management network element is a slice management network element (for example, an NSMF) located on the management plane of the carrier network, the slice management network element may interact with a network management network element (for example, an MDAS) located on the management plane of the carrier network, to learn that the problematic area and/or the problematic time is caused by the first network domain.

In another possible design, the slice management network element may alternatively determine that the problematic area and/or the problematic time are/is caused by the first network domain in which the network device is located.

After learning, in any one of the designs, that the problematic area and/or the problematic time are/is caused by the first network domain in which the network device is located, the slice management network element determines the network device in the first network domain, and sends the problematic area and/or the problematic time in the embodiment in FIG. 2 to the network device. The network device may refer to all network devices in the first network domain, or some network devices in the first network domain, for example, only network devices that are in the first network domain and that are related to the problematic area/problematic time.

In the foregoing first design, if the slice management network element learns, from the network management network element, that the problematic area and/or the problematic time are/is caused by the first network domain, the slice management network element may further obtain first confidence level information from the network management network element. The first confidence level information is used to indicate a confidence level of the information that the problematic area and/or the problematic time are/is caused by the first network domain. The slice management network element determines the network device based on the first confidence level information. For details of a representation form of the first confidence level information, refer to a representation form of a confidence level of user quantity limit information in the embodiment in FIG. 5. Details are not described herein.

A method for determining, by the slice management network element, the network device based on the first confidence level information is: When the first confidence level information is higher than a preset confidence value (for example, a value of the first confidence level information is greater than 90%), the slice management network element determines the network device in the first network domain. On the contrary, when the first confidence level information is lower than the preset confidence value (for example, the value of the first confidence level information is less than 60%), the slice management network element does not determine the network device in the first network domain. In other words, a network device to which the slice management network element subsequently sends the problematic area and/or the problematic time is not in the first network domain.

In the other possible implementation, the resource scheduling method for the network slice may further include: The slice management network element determines that the third service experience information does not correspond to the target service level agreement requirement information due to a second network domain, and the slice management network element determines the network device based on the second network domain.

In a possible design, that the slice management network element determines that the third service experience information does not correspond to the target service level agreement requirement information due to a second network domain may include: The slice management network element learns, from the network management network element, that the third service experience information does not correspond to the target service level agreement requirement information due to the second network domain.

When the slice management network element is a slice management network element (for example, the NS SF) located on the control plane of the carrier network, the slice management network element may interact with the network management network element (for example, the OAM) located on the management plane of the carrier network, to learn that the third service experience information does not correspond to the target service level agreement requirement information due to the second network domain. When the slice management network element is a slice management network element (for example, an NSMF) located on the management plane of the carrier network, the slice management network element may interact with a network management network element (for example, an MDAS) located on the management plane of the carrier network, to learn that the third service experience information does not correspond to the target service level agreement requirement information due to the second network domain.

In another possible design, the slice management network element may alternatively determine that the third service experience information does not correspond to the target service level agreement requirement information due to the second network domain.

After learning, in any one of the foregoing designs, that the third service experience information does not correspond to the target service level agreement requirement information due to the second network domain, the slice management network element determines the network device in the second network domain, and sends the problematic area/problematic time in the embodiment in FIG. 2 to the network device. The network device may refer to all network devices in the second network domain, or some network devices in the second network domain, for example, only network devices that are in the second network domain and that are related to the problematic area/problematic time.

In the foregoing first design, if the slice management network element learns, from the network management network element, that the third service experience information does not correspond to the target service level agreement requirement information due to the second network domain, the slice management network element may further obtain second confidence level information from the network management network element. The second confidence level information is used to indicate a confidence level of the information that the third service experience information does not correspond to the target service level agreement requirement information due to the second network domain. The slice management network element determines the network device based on the second confidence level information. For details of a representation form of the second confidence level information, refer to a representation form of a confidence level of user quantity limit information in the embodiment in FIG. 5. Details are not described herein.

A method for determining, by the slice management network element, the network device based on the second confidence level information is: When the second confidence level information is higher than a preset confidence value (for example, a value of the second confidence level information is greater than 90%), the slice management network element determines the network device in the second network domain. On the contrary, when the second confidence level information is lower than the preset confidence value (for example, the value of the second confidence level information is less than 60%), the slice management network element does not determine the network device in the second network domain. In other words, a network device to which the slice management network element subsequently sends the problematic area and/or the problematic time is not in the second network domain.

The foregoing describes the resource scheduling solution for a network slice in this embodiment of this application from perspectives of the slice management network element, the network device, and the data analysis network element. The following describes, with reference to FIG. 3, another resource scheduling method for a network slice according to an embodiment of this application.

Figure 3:
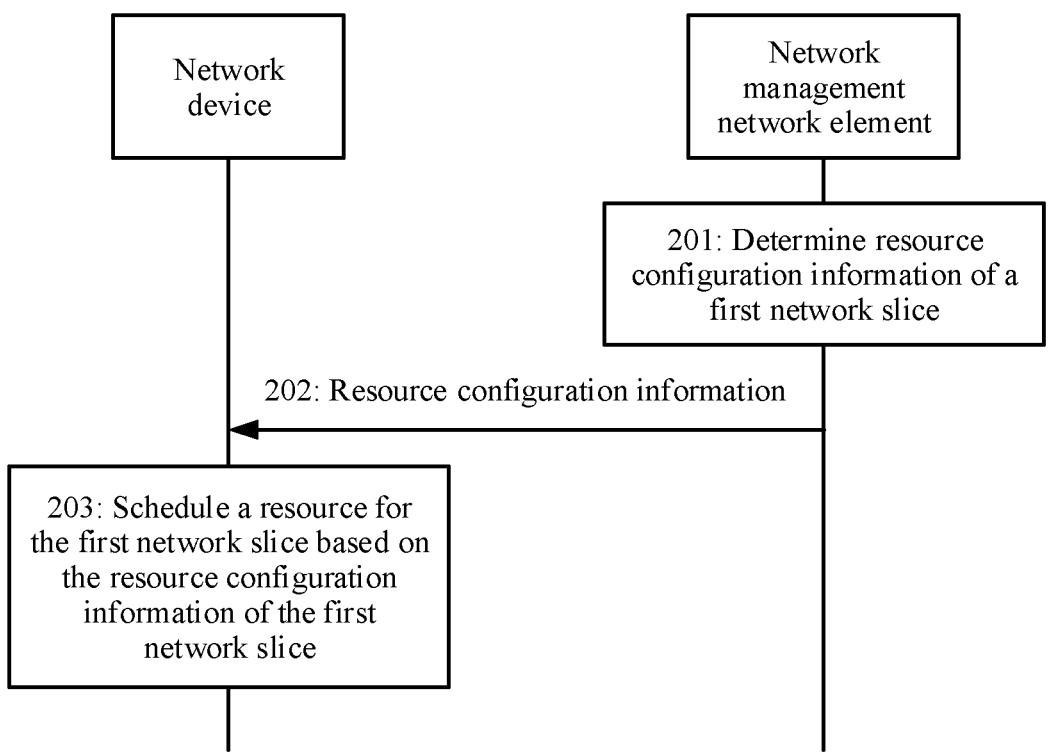
FIG. 3 is a schematic diagram of another embodiment of a resource scheduling method for a network slice according to an embodiment of this application.

As shown in FIG. 3, another embodiment of the resource scheduling method for a network slice provided in this embodiment of this application may include the following steps.

201: A network management network element determines resource configuration information of a first network slice. The resource configuration information includes maximum resource configuration information and/or guaranteed resource configuration information.

The maximum resource configuration information is used to indicate maximum available resources of the first network slice, and the guaranteed resource configuration information is used to indicate a guaranteed available resource of the first network slice.

The network management network element is a device that is capable of deploying a network resource and capable of managing and maintaining operation of a network. For example, the network management network element may be an OAM or an NSSF.

In a possible implementation, in this embodiment of this application, the resource configuration information of the first network slice may be determined based on target service level agreement requirement information of the first network slice.

The target service level agreement requirement information may be the same as the target service level agreement requirement information described in the embodiment corresponding to FIG. 2. Details are not described herein again.

202: The network management network element sends the resource configuration information of the first network slice to a network device.

The network device may include at least one of the following devices: an access network device, a core network device, or a transport network device. For meanings of the access network device, the core network device, and the transport network device, refer to step 105. Details are not described herein again. When the network device is the access network device, the maximum resource configuration information is maximum air interface resource configuration information, and/or the guaranteed resource configuration information is guaranteed air interface resource configuration information.

In a possible implementation, to implement more fine-grained resource scheduling, the resource configuration information may not correspond to the entire first network slice, may be resource configuration information corresponding to one or more areas of the first network slice, or may be resource configuration information corresponding to one or more periods of time.

In this case, the maximum resource configuration information and/or the guaranteed resource configuration information are/is maximum resource configuration information and/or guaranteed resource configuration information that correspond/corresponds to a first time; or the maximum resource configuration information and/or the guaranteed resource configuration information are/is maximum resource configuration information and/or guaranteed resource configuration information that correspond/corresponds to a first area.

203: After receiving the resource configuration information of the first network slice sent by the network management network element, the network device schedules a resource for the first network slice based on the resource configuration information of the first network slice.

When scheduling the resource for the first network slice, the network device first considers a quantity of required resources. If the quantity of required resources does not exceed a quantity of guaranteed available resources of the first network slice that are indicated by the guaranteed resource configuration information, the network device schedules the quantity of required resources for the first network slice. The network device schedules a resource for the first network slice provided that a quantity of resources scheduled for the first network slice is within the quantity of guaranteed available resources of the first network slice. If the quantity of required resources exceeds the quantity of guaranteed available resources of the first network slice but does not exceed a quantity of maximum available resources of the first network slice that are indicated by the maximum resource configuration information, at least the quantity of guaranteed available resources are scheduled for the first network slice based on an actual situation.

For example, a maximum of 20 units of resources are available to the first network slice, and 11 units of resources are guaranteed to be available to the first network slice. If eight units of resources are required, the network device schedules eight units of resources for the first network slice. If 15 units of resources are required, 15 units of resources are scheduled for the first network slice when resources are sufficient, or at least 11 units of resources are scheduled for the first network slice when resources are insufficient.

In this embodiment of this application, limited by the quantity of maximum available resources indicated by the network management network element, the network device may schedule a resource for a network slice preferentially based on the quantity of guaranteed available resources. According to the method, the network device flexibly schedules a resource for a network slice based on a quantity of resources that are actually required by the network slice, and promises to schedule a resource for the network slice when the network slice requires the resource, where a quantity of scheduled resources is more than or equal to the quantity of guaranteed available resources. In some emergency cases, the network slice may further be allowed to use a resource, where a quantity of used resources is less than or equal to the quantity of maximum available resources. This method not only guarantees that a network slice has an available resource, but also improves resource flexibility.

In a possible implementation, a guaranteed available resource of the first network slice is allowed to be used by a second network slice. Especially when the first network slice does not need to use excessive resources, a remaining resource in the quantity of guaranteed available resources is allowed to be used by another network slice, provided that it can be guaranteed that a resource is scheduled for the first network slice when the first network slice requires the resource, where a quantity of scheduled resources is more than or equal to the quantity of guaranteed available resources. The method improves flexibility of resource utilization.

When the maximum resource configuration information and/or the guaranteed resource configuration information are/is the maximum resource configuration information and/or the guaranteed resource configuration information that correspond/corresponds to the first time, the network device may schedule a resource for the first network slice in the first time based on the maximum resource configuration information and/or the guaranteed resource configuration information that correspond/corresponds to the first time. The first time may be included in the maximum resource configuration information and/or the guaranteed resource configuration information, or may be pre-negotiated or included outside the maximum resource configuration information and/or the guaranteed resource configuration information, and does not need to be included in the maximum resource configuration information and/or the guaranteed resource configuration information.

When the maximum resource configuration information and/or the guaranteed resource configuration information are/is the maximum resource configuration information and/or the guaranteed resource configuration information that correspond/corresponds to the first area, the network device may schedule a resource for the first network slice in the first area based on the maximum resource configuration information and/or the guaranteed resource configuration information that correspond/corresponds to the first area. The first area may be included in the maximum resource configuration information and/or the guaranteed resource configuration information, or may be pre-negotiated or included outside the maximum resource configuration information and/or the guaranteed resource configuration information, and does not need to be included in the maximum resource configuration information and/or the guaranteed resource configuration information.

In this embodiment of this application, limited by the quantity of maximum available resources indicated by the network management network element, a resource may be scheduled for a network slice preferentially based on the quantity of guaranteed available resources. According to the method, the network device flexibly schedules a resource for a network slice based on a quantity of resources that are actually required by the network slice, and promises to schedule a resource for the network slice when the network slice requires the resource, where a quantity of scheduled resources is more than or equal to the quantity of guaranteed available resources. In some emergency cases, the network slice may further be allowed to use a resource, where a quantity of used resources is less than or equal to the quantity of maximum available resources. This method not only guarantees that a network slice has an available resource, but also improves resource flexibility.

Figure 4:
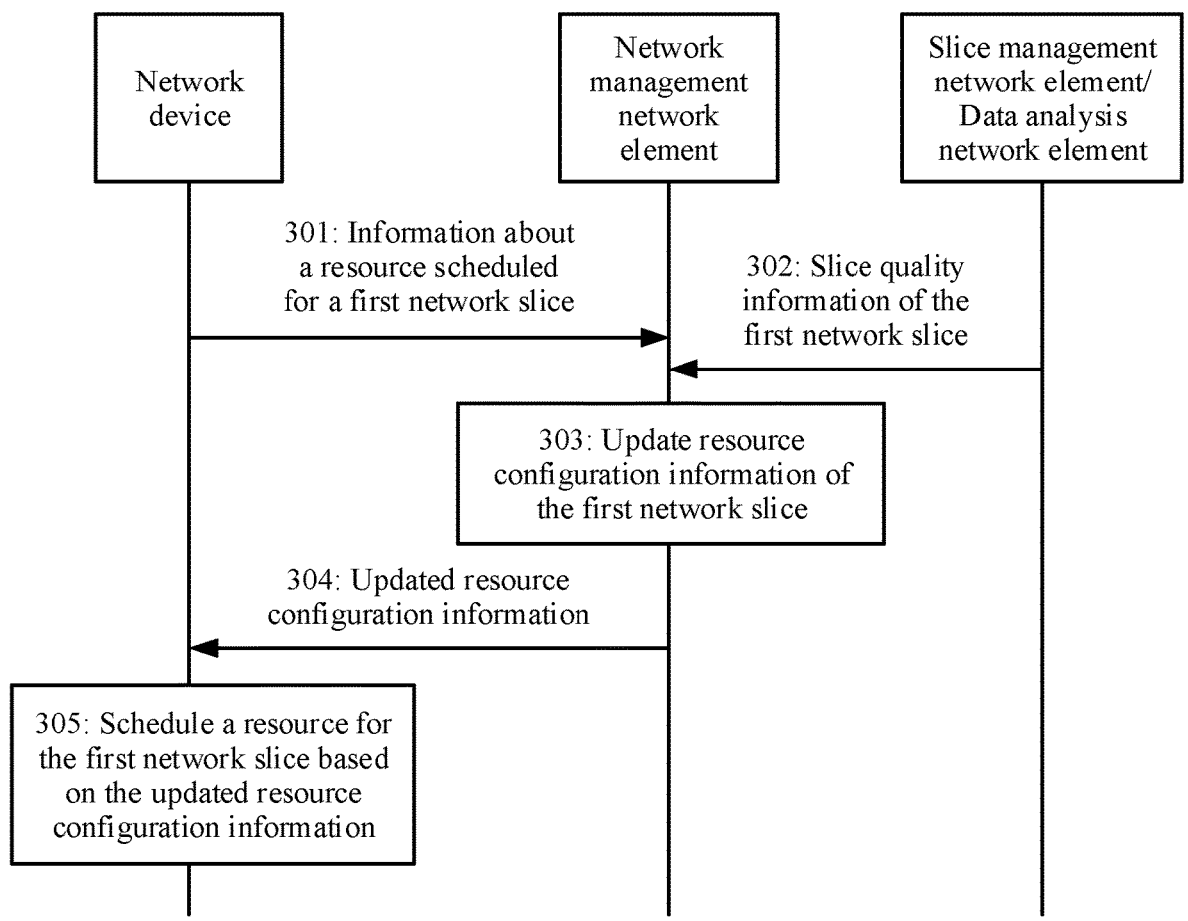
FIG. 4 is a schematic diagram of another embodiment of a resource scheduling method for a network slice according to an embodiment of this application.

The foregoing describes a case in which the resource configuration information needs to be referred to when a resource is scheduled for the first network slice. Actually, the resource configuration information may change after the resource configuration information is configured. The network management network element updates the resource configuration information of the first network slice based on an actual situation, and then notifies the network device of the resource configuration information in time. For understanding of an update process of resource configuration information, refer to FIG. 4. As shown in FIG. 4, on the basis of the embodiment corresponding to FIG. 3, another embodiment of a resource scheduling method for a network slice according to an embodiment of this application may include the following steps.

301: A network management network element obtains information about a resource scheduled by a network device for a first network slice.

If more fine-grained scheduling is considered, the information about the resource may include information about a resource in a corresponding area or in a corresponding time.

To be more specific, the information about the resource may include information about a resource corresponding to a second area of the first network slice, and/or the information about the resource may include information about a resource corresponding to a second time of the first network slice. A first area may be the same as or different from the second area, and the second time may be the same as or different from a first time.

302: The network management network element obtains slice quality information of the first network slice from a slice management network element or a data analysis device.

The slice quality information includes: service experience information of the first network slice, and/or satisfaction level information of the service experience information of the first network slice relative to a target service level agreement requirement.

The service experience information of the first network slice may be the same as the first service experience information, the second service experience information, or the third service experience information described in the embodiment corresponding to FIG. 2. Details are not described herein again.

The satisfaction level information may include dissatisfaction, satisfaction, over-satisfaction, or another representation form, and is also the same as the satisfaction level information described in the embodiment corresponding to FIG. 2. Details are not described herein again.

If the information about the resource in step 301 is the information about the resource corresponding to the second area, the slice quality information corresponding to the first network slice may include service experience information that is of the first network slice and that corresponds to the second area and/or satisfaction level information of the service experience information corresponding to the second area relative to the target service level agreement requirement.

The second area is an area in which the target service level agreement requirement cannot be satisfied or is over-satisfied.

If the information about the resource is the information about the resource corresponding to the second time, the slice quality information corresponding to the first network slice includes: service experience information that is of the first network slice and that corresponds to the second time, and/or satisfaction level information of the service experience information corresponding to the second time relative to the target service level agreement requirement.

The second time is a time in which the target service level agreement requirement cannot be satisfied or is over-satisfied.

303: The network management network element updates resource configuration information of the first network slice based on the information about the resource scheduled by the network device for the first network slice and the slice quality information.

If the information about the resource is the information about the resource corresponding to the second area, the network management network element updates the resource configuration information of the first network slice based on the information about the resource corresponding to the second area and the service experience information corresponding to the second area.

If the information about the resource is the information about the resource corresponding to the second time, the network management network element updates the resource configuration information of the first network slice based on the information about the resource corresponding to the second time and the service experience information corresponding to the second time.

If the information about the resource is the information about the resource corresponding to the second area and the information about the resource corresponding to the second time, the network management network element updates the resource configuration information of the first network slice based on the information about the resource corresponding to the second area, the service experience information corresponding to the second area, the information about the resource corresponding to the second time, and the service experience information corresponding to the second time.

Because the resource configuration information includes maximum resource configuration information and/or guaranteed resource configuration information, during updating, the network management network element updates the maximum resource configuration information and/or the guaranteed resource configuration information, such that updated maximum resource configuration information is not less than the resource scheduled by the network device for the first network slice.

304: The network management network element sends updated resource configuration information to the network device.

The updated resource configuration information includes the updated maximum resource configuration information and/or updated guaranteed resource configuration information.

305: The network device schedules a resource for the first network slice based on the updated resource configuration information.

Limited by an updated quantity of maximum available resources that is indicated by the network management network element, the network device may schedule a resource for the first network slice preferentially based on an updated guaranteed quantity of available resources. This improves resource flexibility.

In this embodiment of this application, the network management network element may update the resource configuration information of the first network slice in time, such that the network device can adjust, in time, the resource scheduled for the first network slice, thereby improving accuracy of resource scheduling and performance of the first network slice.

Actually, if the network management network element does not update the resource configuration information, the network device may also adjust, in the following case, the resource scheduled for the first network slice:

The network device receives the slice quality information that corresponds to the first network slice and that is sent by the slice management network element. The slice quality information includes: the service experience information of the first network slice, and/or the satisfaction level information of the service experience information of the first network slice relative to the target service level agreement requirement.

The network device adjusts, based on the slice quality information, the resource scheduled for the first network slice.

The slice quality information corresponding to the first network slice may include the service experience information that is of the first network slice and that corresponds to the second area and/or the satisfaction level information of the service experience information corresponding to the second area relative to the target service level agreement requirement.

The slice quality information corresponding to the first network slice may include: the service experience information that is of the first network slice and that corresponds to the second time, and/or the satisfaction level information of the service experience information corresponding to the second time relative to the target service level agreement requirement.

The slice quality information corresponding to the first network slice may include the service experience information corresponding to the second area of the first network slice, the service experience information corresponding to the second time, and/or the satisfaction level information of the service experience information corresponding to the second area relative to the target service level agreement requirement and the satisfaction level information of the service experience information corresponding to the second time relative to the target service level agreement requirement.

The second area is an area in which the target service level agreement requirement cannot be satisfied or is over-satisfied.

The second time is a time in which the target service level agreement requirement cannot be satisfied or is over-satisfied.

That the network device adjusts, based on the slice quality information, the resource scheduled for the first network slice may include: If the service experience information of the first network slice cannot satisfy the target service level agreement requirement, the network device schedules an additional resource for the first network slice; or if the service experience information of the first network slice over-satisfies the target service level agreement requirement, the network device reduces resources scheduled for the first network slice.

According to both the solution in which the network management network element updates the resource configuration information of the first network slice in time and the solution in which the network device adjusts, based on the slice quality information corresponding to the first network slice, the resource scheduled for the first network slice, both accuracy of resource scheduling and performance of the first network slice can be improved. The two solutions are compared. The former solution may be more accurate because the network management network element obtains the updated resource configuration information after analyzing a larger amount of data in more dimensions, and accuracy is higher. The latter solution is more timely because the network device may consider to adjust, based on the slice quality information corresponding to the first network slice, the resource scheduled for the first network slice. If the two solutions are used together, a better effect can be achieved.

Figure 5:
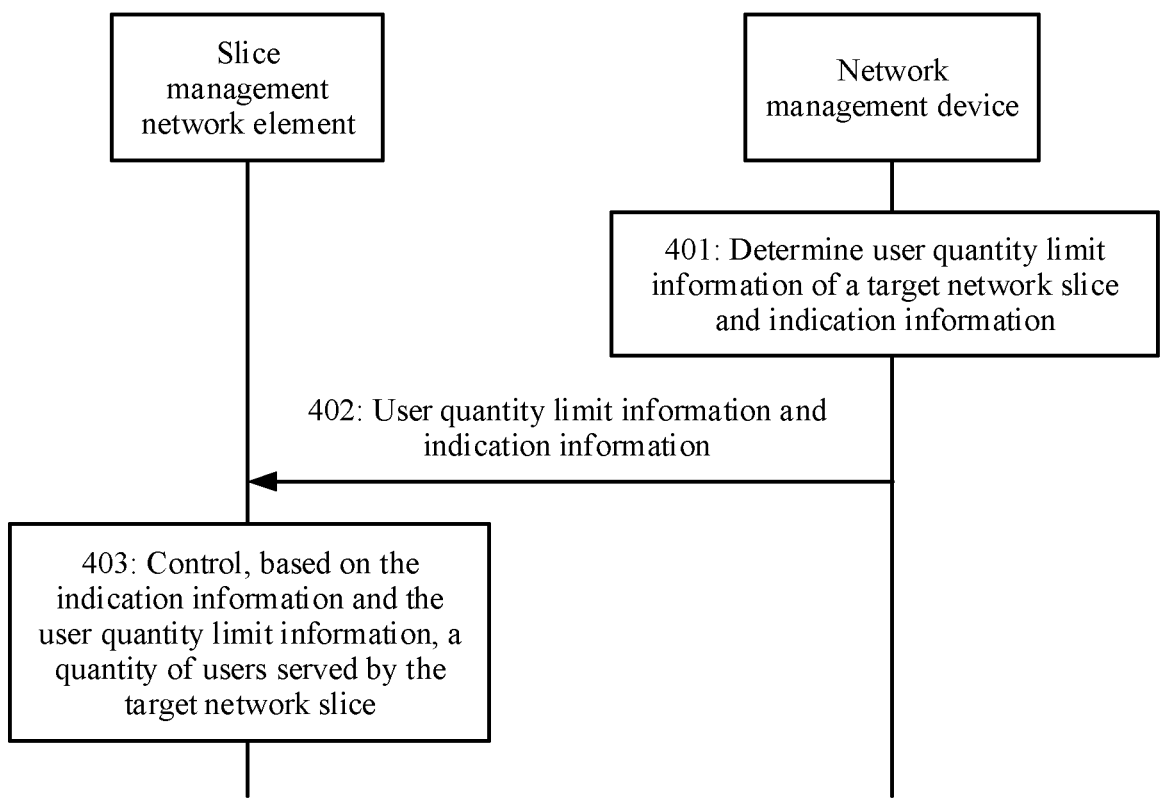
FIG. 5 is a schematic diagram of an embodiment of user quantity control for a network slice according to an embodiment of this application.

In the foregoing solutions in FIG. 3 and FIG. 4, a resource scheduling solution for a network slice under an indication of the maximum resource configuration information and/or the guaranteed resource configuration information is described. Actually, content related to the resource scheduling for a network slice further includes user quantity control. The following describes a user quantity control method in an embodiment of this application with reference to FIG. 5. As shown in FIG. 5, an embodiment of the user quantity control method provided in this embodiment of this application may include the following steps.

401: A network management network element determines user quantity limit information of a target network slice and indication information.

The user quantity limit information of the target network slice refers to a limitation on a quantity of access users, and may include online user quantity information or registered user quantity information. The user quantity limit information is usually maximum user quantity information, namely, user capacity information.

The indication information is used to indicate status information of the target network slice or a confidence level of the user quantity limit information.

The status information includes a test state or a stable state. The test state means that the target network slice is a newly created slice or is in a test phase. In other words, a carrier and a tenant have not formally signed a service level agreement on the target network slice. The stable state means that the target network slice is in a stable phase. In other words, a carrier and a tenant have formally signed a service level agreement on the target network slice.

A specific representation form indicating the test state or the stable state is not limited in this embodiment of this application. For example, the representation form may be a binary enumerated value, where 0 indicates the test state, and 1 indicates the stable state. Alternatively, F is used to indicate the test state, and T is used to indicate the stable state. Certainly, the test state or the stable state may alternatively be indicated in another form.

The confidence level refers to a reliability level. A specific form of the confidence level is not limited in this embodiment of this application. For example, the confidence level may be a floating-point number in an interval of [0, 1], and a larger floating-point value indicates a higher reliability level. For another example, the confidence level may be a percentage value ranging from 0% to 100%, and a higher percentage indicates a higher reliability level. For another example, the confidence level information may alternatively be an enumerated value in a predefined set (for example, {A, B, C, D}), where different enumerated values correspond to different reliability levels (for example, A>B>C>D).

The network management network element is a device that is capable of deploying a network resource and capable of managing and maintaining operation of a network, for example, may be an OAM.

In a possible implementation, a manner in which the network management network element determines the user quantity limit information of the target network slice is not limited in this embodiment of this application, and one of the manners may be as follows: The network management network element obtains service level agreement requirement information of the target network slice.

The network management network element determines the user quantity limit information of the target network slice based on the service level agreement requirement information.

The network management network element may obtain the service level agreement requirement information of the target network slice from the tenant. A meaning of the service level agreement requirement information is basically the same as that of the service level agreement requirement information described in the foregoing embodiments. Details are not described herein again.

402: The network management network element sends the user quantity limit information of the target network slice and the indication information to a slice management network element.

The slice management network element is a network element that is capable of managing and controlling user access, resource deployment, and function execution of a network slice. For example, the slice management network element is a network slice selection function (NSSF) network element. To implement more fine-grained control over the quantity of users, the network management network element sends, to the slice management network element, information about an area of the target network slice and user quantity limit information corresponding to the information about the area.

The information about the area and the user quantity limit information corresponding to the information about the area are used by the slice management network element to control a quantity of users that are served by the target network slice and in the area indicated by the information about the area, within a quantity indicated by the user quantity limit information corresponding to the information about the area.

Alternatively, the network management network element sends, to the slice management network element, information about a time of the target network slice and user quantity limit information corresponding to the information about the time.

The information about the time and the user quantity limit information corresponding to the information about the time are used to control a quantity of users that are served by the target network slice and in the time indicated by the information about the time, within a quantity indicated by the user quantity limit information corresponding to the information about the time.

For understanding of meanings of the information about the area and the information about the time in this embodiment, refer to the foregoing descriptions in step 102. Details are not described herein again.

403: After receiving the user quantity limit information of the target network slice and the indication information that are sent by the network management network element, the slice management network element controls, based on the indication information and the user quantity limit information, a quantity of users served by the target network slice.

When the indication information is used to indicate the status information of the target network slice, the slice management network element controls, based on the user quantity limit information and in a control mode corresponding to the status information, the quantity of users served by the target network slice.

When the status information is the test state, the control mode is a stepped control mode. To be more specific, the slice management network element may connect users to the target network slice in a stepped manner, where a quantity of the users is a quantity limited by the user quantity limit information, or remove, in a stepped manner, users that have been served by the target network slice.

When the status information is the stable state, the control mode is a one-time control mode. To be more specific, based on the stable state of the target network slice, the slice management network element may connect users to the target network slice at one time, where a quantity of the users is a quantity limited by the user quantity limit information, or remove, at one time, users that have been served by the target network slice.

When the indication information is used to indicate the confidence level of the user quantity limit information, the slice management network element controls, based on the user quantity limit information and in a control mode corresponding to the confidence level, the quantity of users served by the target network slice.

When the confidence level does not satisfy a confidence level requirement, the control mode is a stepped control mode. To be more specific, the slice management network element connects users to the target network slice in a stepped manner, where a quantity of the users is a quantity limited by the user quantity limit information, or removes, in a stepped manner, users that have been served by the target network slice.

When the confidence level satisfies the confidence level requirement, the control mode is a one-time control mode. To be more specific, the slice management network element connects users to the target network slice at one time, where a quantity of the users is a quantity limited by the user quantity limit information, or removes, at one time, users that have been served by the target network slice.

For understanding of whether the confidence level satisfies the confidence level requirement, refer to the representation forms of the confidence level in step 401. If the confidence level is a specific value, whether the confidence level is greater than a confidence level threshold may be determined in a manner of setting the confidence level threshold. If the confidence level is an enumerated value in a predefined set, whether the confidence level requirement is satisfied may be determined in a manner of determining whether the confidence level is a corresponding enumerated value. In addition, control modes corresponding to different confidence levels are different, and are not limited to the foregoing stepped mode or one-time mode. There may be another corresponding control mode.

In this embodiment of this application, the user quantity limit information of the target network slice may be service level agreement requirement information that is of the target network slice, that is received by the slice management network element, and that is sent by the network management network element. The service level agreement requirement information includes the user quantity limit information of the target network slice. Certainly, if the service level agreement requirement information that is of the target network slice and sent by the network management network element to the slice management network element does not include the user quantity limit information, the user quantity limit information may be sent separately, and may be sent together with the service level agreement requirement information of the target network slice.

When the user quantity limit information is user quantity limit information corresponding to an area, the slice management network element controls, based on the indication information and the user quantity limit information corresponding to the information about the area, a quantity of users that are served by the target network slice and in the area indicated by the information about the area.

When the user quantity limit information is user quantity limit information corresponding to a time, the slice management network element controls, based on the indication information and the user quantity limit information corresponding to the information about the time, a quantity of users that are served by the target network slice and in the time indicated by the information about the time.

Figure 6:
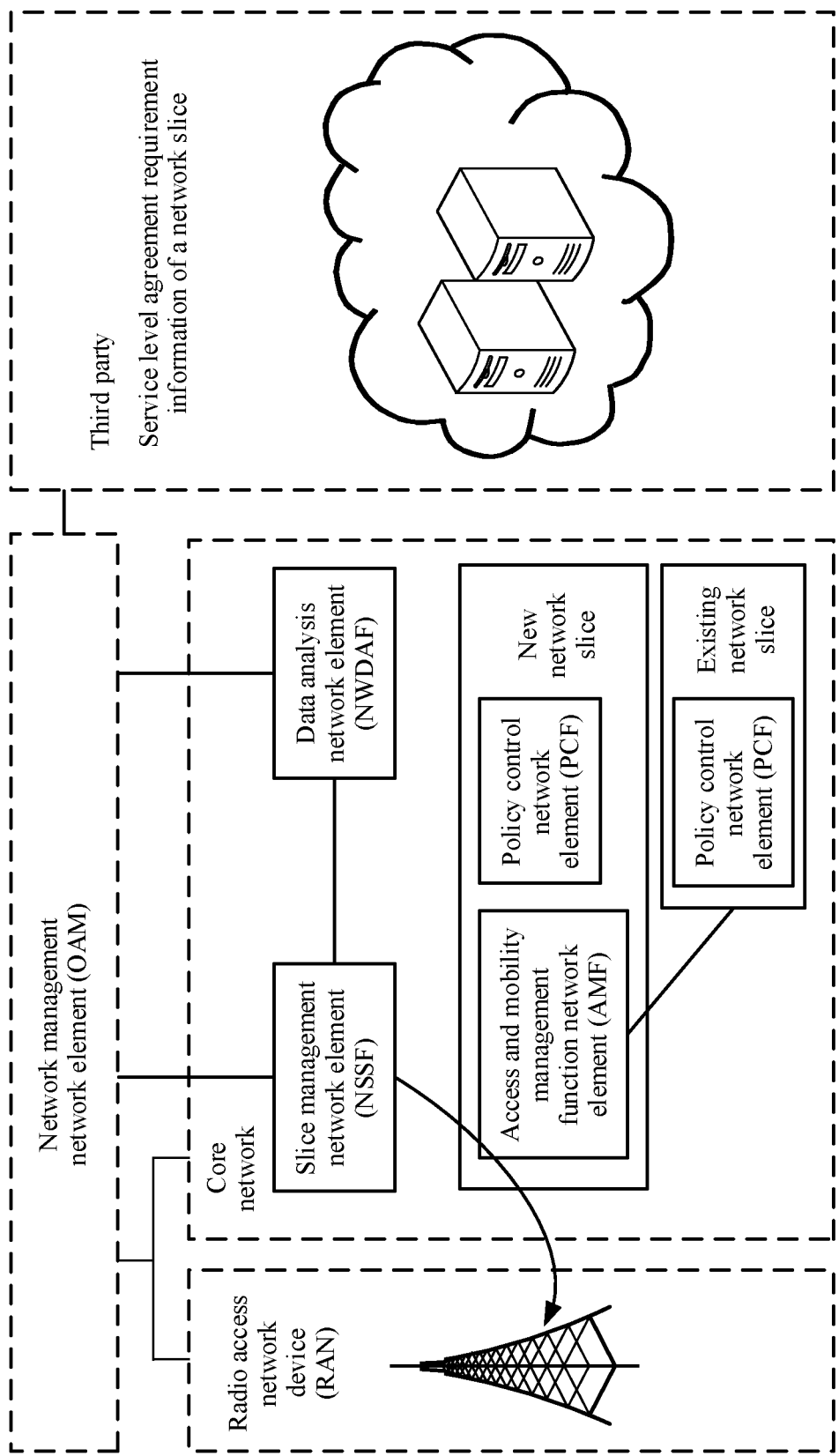
FIG. 6 is a schematic diagram of an embodiment of a network structure.

The embodiments corresponding to FIG. 2 to FIG. 5 are separately described above. Actually, these embodiments are not independent of each other, but may be associated with each other. Both resource scheduling and user quantity control for a network slice are related to a service level agreement requirement proposed by a tenant of the network slice and service experience information of the network slice. FIG. 6 is a schematic diagram of an embodiment of a network architecture in a network slice scenario. As shown in FIG. 6, network elements related to the foregoing embodiment include a third-party network element such as an application function (AF) network element, an access network device, a core network device (for example, an AMF or a PCF) for allocating a control plane resource or a user plane resource, a slice management network element (for example, an NSSF), a data analysis network element (for example, an NWDAF), and a network management network element (for example, an OAM). The slice management network element (for example, the NSSF) and the data analysis network element (for example, the NWDAF) actually belong to the core network device.

Figure 7A:
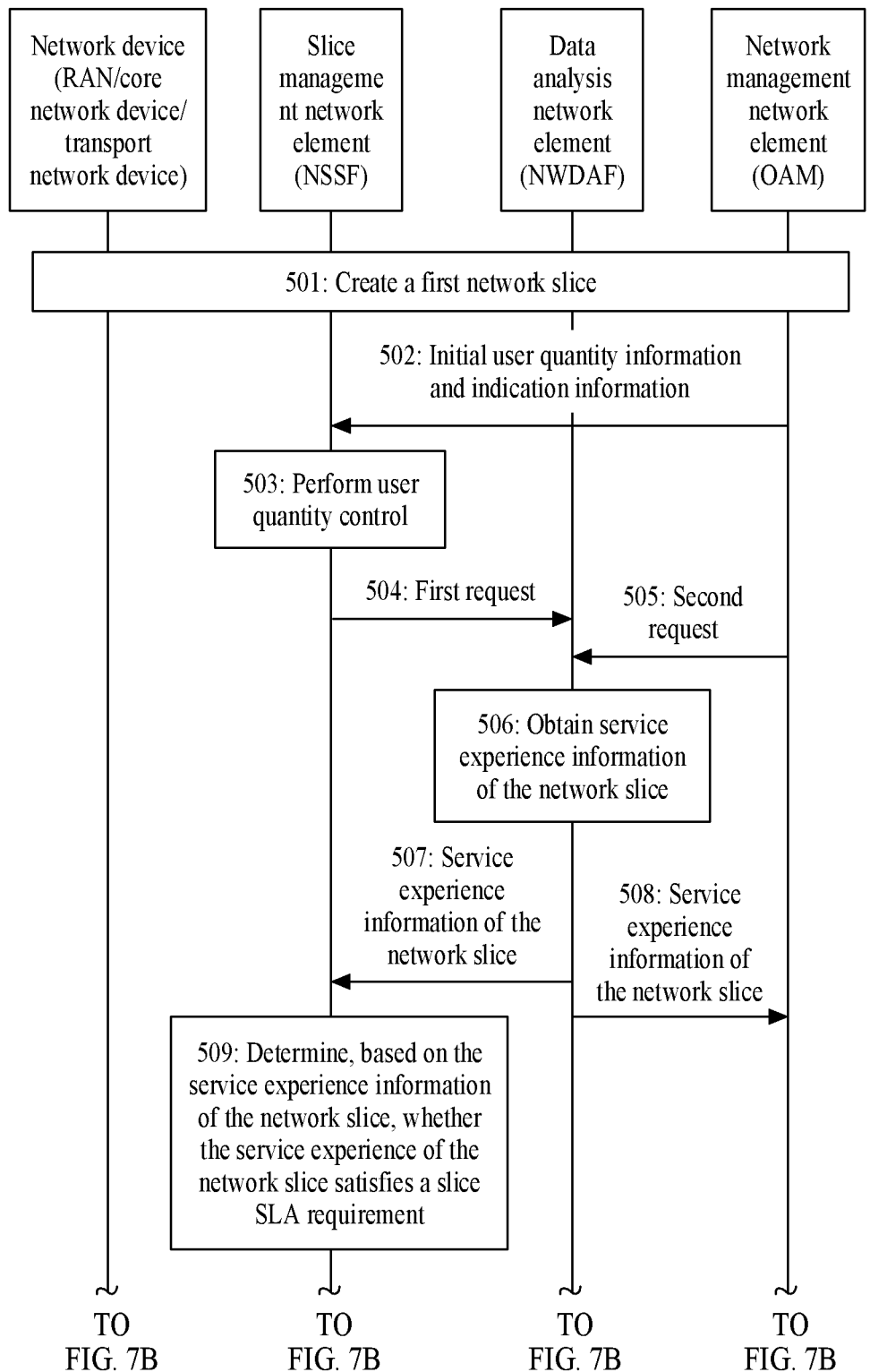
FIG. 7A and FIG. 7B are a schematic diagram of an embodiment of resource scheduling and user quantity control for a network slice according to an embodiment of this application.
Figure 7B:
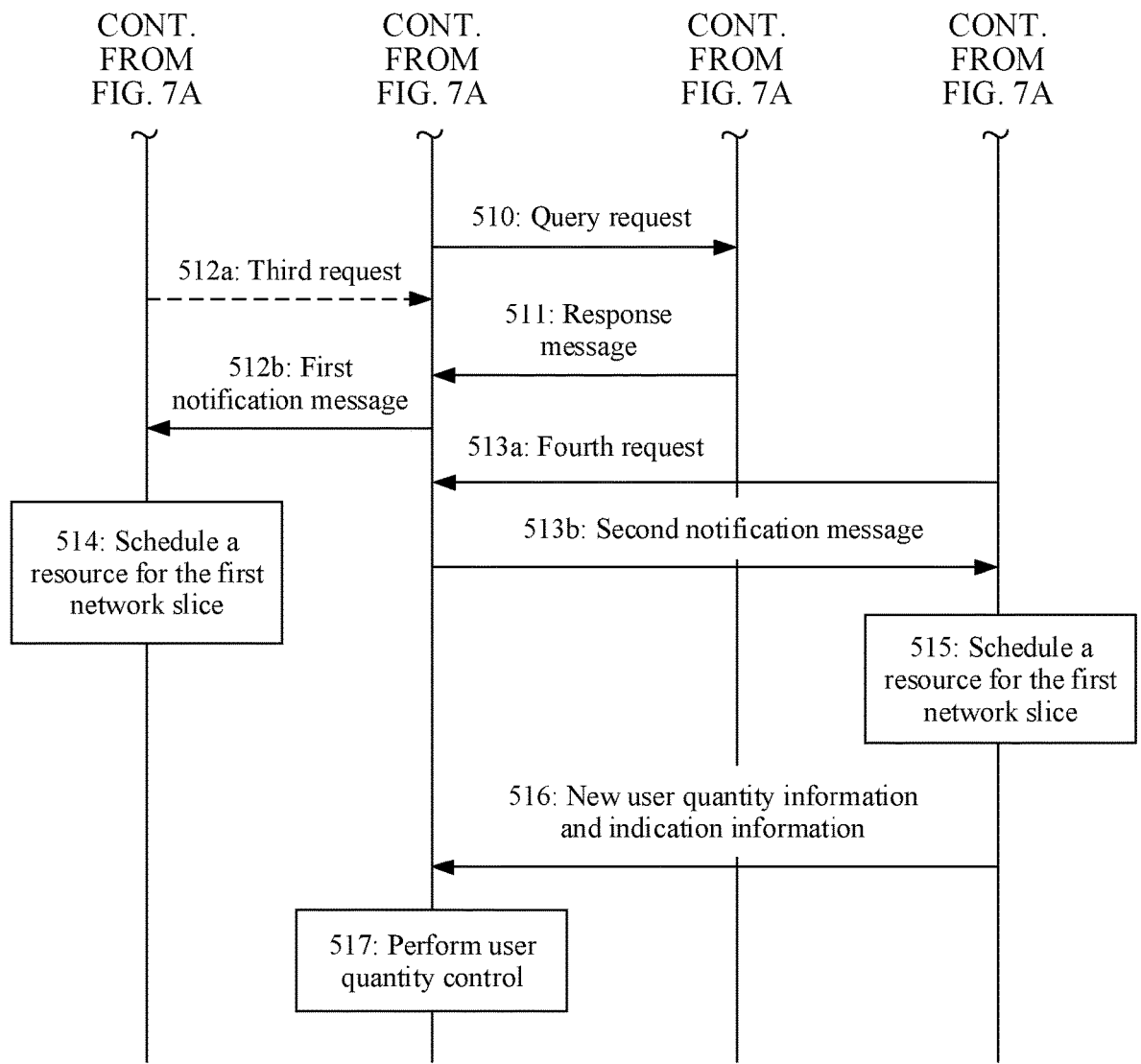

In the architecture corresponding to FIG. 6, the following describes a process of resource scheduling and user quantity control related to a network slice in an embodiment of this application with reference to FIG. 7A and FIG. 7B.

501: A network management network element creates a network slice.

The network management network element obtains service level agreement (SLA) requirement information of the network slice from a tenant. For content and a meaning of the SLA requirement information, refer to the content and the meaning of the target service level agreement requirement information in FIG. 2. The network management network element creates the network slice based on the SLA requirement information. Herein, the creating a network slice means that the network management network element sets resource configuration information for the network slice.

Actually, the network slice is not limited to the newly created network slice, and may alternatively be an existing network slice. If the network slice is an existing network slice, resource configuration information does not need to be set.

The resource configuration information may be the maximum resource configuration information and/or the guaranteed resource configuration information that are/is described in the embodiment corresponding to FIG. 3.

The resource configuration information is used to indicate a network resource that can be scheduled for the network slice. The network resource may include an access network resource or a core network resource, or may include a transport network resource.

In a possible design, an access network resource corresponding to one network slice may include a guaranteed air interface resource corresponding to the network slice or maximum air interface resources corresponding to the network slice. In other words, that the network management network element configures an access network resource for the network slice means that the network management network element configures the guaranteed air interface resource or the maximum air interface resources for the network slice. The air interface resource herein may be an actual physical resource, such as a physical resource block (PRB), a processor resource of an access network device, or a storage resource. That is, the network management network element indicates the scheduled physical resource to the access network device. The air interface resource may alternatively be a parameter reflecting air interface performance, such as an uplink/downlink data packet loss rate of the access network device, a maximum/average quantity of radio resource control (RRC) connections, and an average delay of a data unit (DU). That is, the network management network element indicates the scheduled physical resource to the access network device using these performance parameters.

In a possible design, a core network resource corresponding to one network slice may include a guaranteed core network resource corresponding to the network slice or maximum core network resources corresponding to the network slice. In other words, that the network management network element configures a core network resource for the network slice means that the network management network element configures the guaranteed core network resource or the maximum core network resources for the network slice. An explanation of the core network resource is the same as that of the access network resource above. The core network resource may be a physical resource of a core network, for example, a storage resource of a UPF or a CPU resource of an AMF, or may be a parameter reflecting core network performance, for example, a throughput of a General Packet Radio Service (GPRS) Tunneling Protocol (GTP) data packet on an N3 interface, usage of an output link of an N6 interface, or an average/maximum quantity of registered users on the AMF.

In a possible design, that the network management network element configures an access network resource for the network slice means that the network management network element sends access network resource configuration information corresponding to the network slice to the access network device. In this case, the access network device schedules a corresponding access network resource for the network slice based on the access network resource configuration information. The access network resource configuration information includes guaranteed air interface resource configuration information or maximum air interface resource configuration information, and the access network device may be a base station or an access network domain management device. In addition, that the network management network element configures a core network resource means that the network management network element sends core network resource configuration information to a core network device, and the core network device schedules a corresponding core network resource based on the core network resource configuration information. The core network resource configuration information includes guaranteed core network resource configuration information or maximum core network resource configuration information, and the core network device may be a core network device (such as an AMF, an SMF, or a UPF) for allocating a user plane resource or a control plane resources or a core network domain management device.

A specific representation form of a quantity that is of configured resources and delivered in the resource configuration information is not limited. The quantity may be a percentage of total resources, where for example, 30% of total air interface resources are configured for a slice or 40% of total core network resources are configured for a slice, or may be a specific resource value, for example, a PRB value or the size of a UPF storage space.

In addition to the foregoing design manner, the network management network element may alternatively configure a network resource for the network slice based on information about an area. For example, the network management network element configures different access network resources, core network resources, or transport network resources for different areas of the network slice, for example, different tracking areas (TAs), a TA list, different cells, or a cell list. A definition and a form of the information about the area are not limited in this application. The information about the area herein is equivalent to the information about the first area in step 202 in the embodiment in FIG. 3. In a possible design, initially, the network management network element may evenly configure network resources for different areas of the network slice. This is because in an initial state, network management does not have or has little service experience information of the network slice, and does not know how to configure different network resources for the different areas.

In addition to the foregoing design manner, the network management network element may alternatively configure a network resource for the network slice based on information about a time. For example, based on different information about times, such as daytime/night, idle/busy hours, 02:00 to 04:00, and Monday to Friday, the network management network element configures different access network resources or core network resources for the network slice. A definition and a form of the information about the time are not limited in this application. The information about the time herein is equivalent to the information about the first time in step 202 in the embodiment in FIG. 3. In a possible design, initially, the network management network element may evenly configure network resources for different times of the network slice. This is because in an initial state, network management does not have or has little service experience information of the network slice, and does not know how to configure different network resources for the different times.

Certainly, one or more of the foregoing manners may be used in combination.

502: The network management network element sends initial user quantity information and indication information that correspond to the network slice to a slice management network element.

The initial user quantity information of the network slice is equivalent to the user quantity limit information in step 401 in the embodiment in FIG. 5, and may include initial registered user quantity information of the network slice or initial online user quantity information of the network slice. The user quantity information is used to instruct the slice management network element to perform access user quantity control on the network slice. For example, the slice management network element allows or rejects, based on the registered user quantity information sent by the network management network element, a request of a user for accessing the network slice through registration, or removes a registered user from the network slice, to control a quantity of registered users of the network slice. For another example, the slice management network element allows or rejects, based on the online user quantity information sent by the network management network element, a request of a user for entering an online state, or changes an online user to an offline or idle state, to control a quantity of online users of the network slice. It should be noted that the user quantity information is usually maximum user quantity information, namely, user capacity information. For example, the initial user quantity information may include initial maximum registered user quantity information of the network slice or initial maximum online user quantity information of the network slice.

In a possible implementation, the network management network element may further notify the slice management network element of the SLA requirement information corresponding to the network slice. The SLA requirement information herein may be SLA requirement information in a trial running phase, namely, in a test state. After a test ends, SLA requirement information in a stable state may be further determined. An SLA requirement may include but is not limited to two levels of requirements: a service experience requirement at a network slice granularity or a service experience requirement at a service granularity. The service experience requirement at the network slice granularity means overall service experience requirements on a network slice, for example, a requirement on a quantity of registered users of the network slice (for example, <1,000,000), a requirement on a quantity of online users (for example, <800,000), a requirement on an end-to-end delay of the network slice (for example, <2 ms), and a load requirement of the network slice. The service experience requirement at the service granularity means service experience requirements on a service in the network slice, for example, a requirement on a quantity of users of a service A in a network (for example, <500,000), a requirement on average experience of the service A (for example, a mean opinion score MOS>3), and a requirement on a percentage of a quantity of users whose mean opinion score of the service A is greater than 3 to a total quantity of users of the service A (for example, >95%) It should be noted that the network management network element may include the user quantity information in the SLA requirement information and send the SLA requirement information to the slice management network element, or may not use the user quantity information as a part of the SLA requirement information, but separately send the user quantity information and the SLA requirement information to the slice management network element.

In a possible implementation, the network management network element may further send the user quantity information or the SLA requirement to the slice management network element based on an area. In other words, the network management network element notifies the slice management network element of different user quantity information or SLA requirements corresponding to different areas. For example, a TA 1 corresponds to a maximum of 1,000,000 registered users and an SLA requirement 1, and a TA 2 corresponds to a maximum of 2,000,000 registered users and an SLA requirement 2. The areas herein are equivalent to the information about the area in step 402.

All information about an area in this embodiment of this application may be information that is about an area and defined in a 3GPP communications network, which may be referred to as information about a communications network area for short, for example, a serving cell A or a registration area B. The information about the area may alternatively be information that is about an area and defined in a non-3GPP communications network. For example, the location information is a specific geographical location range (where for example, longitude and latitude or global positioning system (GPS) location information, which may be referred to as information about a geographical area for short)

In a possible implementation, the user quantity information or the SLA requirement may alternatively be sent based on a time. In other words, the network management network element notifies the slice management network element of different user quantity information or SLA requirements corresponding to different times. For example, a time period 1 corresponds to a maximum of 1,000,000 registered users and an SLA requirement 1, and a time period 2 corresponds to a maximum of 2,000,000 registered users and an SLA requirement 2. The time domain herein is equivalent to the information about the time in step 402.

All information about a time in this embodiment may be an absolute time, for example, from 00:00 on Jan. 1, 2017 to 24:00 on Jan. 30, 2017, or from Monday to Friday every week; or may be information about a relative time, for example, within one month after the user quantity information or the SLA requirement information is sent. A granularity of the information about the time may be an hour, a minute, or a day. This is not limited in this embodiment of this application.

In a possible implementation, the indication information may be first indication information, and the first indication information is used to indicate confidence level information of the user quantity information or the SLA requirement information sent by the network management network element. The confidence level information refers to a certainty/confidence level that is of the user quantity information or the SLA requirement information and that is of the network management network element, and is information for measuring a reliability level of the user quantity information or the SLA requirement information. A specific form of the confidence level information is not limited in this application, provided that the confidence level information can reflect the reliability level of the user quantity information or the SLA requirement information. For example, the confidence level information may be a floating-point number in an interval of [0, 1], and a larger floating-point value indicates a higher reliability level. For another example, the confidence level information may be a percentage value ranging from 0% to 100%, and a higher percentage indicates a higher reliability level. For another example, the confidence level information may alternatively be an enumerated value in a predefined set (for example, {A, B, C, D}), where different enumerated values correspond to different reliability levels (for example, A>B>C>D).

Generally, compared with a network slice in a stable state, for a newly created network slice or a network slice in a test state, a confidence value that corresponds to the state and that is set by the network management network element is relatively low. For example, the confidence value is 60%. This is because the network management network element does not have or has little service experience information of the network slice. In other words, in this case, the network management network element generates the user quantity information or the SLA requirement based on the little information. Therefore, a confidence level is relatively low in this case.

In a possible implementation, the indication information may alternatively be second indication information, and the second indication information is used to indicate that the network slice is a newly created network slice, or the network slice is in a test state or in a stable state. For the newly created network slice or the network slice in the test state, a carrier and a network tenant have not formally signed an SLA and adjustments are continuously performed in a network. For the network slice in the stable state, a carrier and a network tenant have formally signed an SLA, a network is in a relatively stable state, and resources are not frequently adjusted. A specific representation form indicating the test state or the stable state is not limited in this application. For example, the representation form may be a binary enumerated value, where 0 indicates the test state, and 1 indicates the stable state. Alternatively, F indicates the test state, and T indicates the stable state. Certainly, the test state or the stable state may alternatively be indicated in another form.

503: The slice management network element performs user quantity control on the network slice based on the initial user quantity information and the indication information that are sent by the network management network element.

The access user quantity control means control over the quantity of registered users of the network slice or the quantity of online users of the network slice. For details, refer to step 502.

When the slice management network element learns, based on the first indication information, that a reliability level corresponding to the user quantity information or the SLA requirement information sent by the network management network element is relatively low, for example, 60%, the slice management network element may allow users to access the network slice step by step or in phases. For example, if the network management network element notifies the slice management network element that a maximum quantity of registered users of the network slice is 10,000,000, the slice management network element may allow only 1,000,000 users to access the network slice each time. The users are allowed to access the network slice step by step or in phases, to prevent a large quantity of users from accessing the network slice at a time. If a large quantity of users access the network slice at a time, service experience of the network slice deteriorates significantly, and even service experience of another network slice that has been in a stable phase is affected. Similarly, when a quantity of users of the network needs to be reduced, if the slice management network element determines that the reliability corresponding to the user quantity information or the SLA requirement information is relatively low, the slice management network element may also remove users or transfer users to another network slice, step by step or in phases. The quantity of users of the network slice is reduced step by step or in phases, to avoid affecting service experience of a large quantity of users of the network slice at the same time, in order to avoid affecting service experience of the network slice. That the quantity of users of the network slice is increased or reduced step by step or in phases corresponds to the stepped control mode in the embodiment in FIG. 5.

When the slice management network element learns, based on the second indication information, that the network slice is in a test phase or is a newly created network slice, the slice management network element may allow users to access the network slice step by step or in phases. For example, if the network management network element initially notifies the slice management network element that the maximum quantity of registered users of the network slice is 10,000,000, the slice management network element may allow only 1,000,000 users to access the network slice each time. That the quantity of users of the network slice is increased or reduced step by step or in phases corresponds to the stepped control mode in the embodiment in FIG. 5.

If the slice management network element further receives information about an area from the network management network element, the slice management network element may further perform access user quantity control on the network slice based on the information about the area. For example, if the network management network element notifies the slice management network element that a maximum quantity of registered users corresponding to the TA 1 of the network slice is 1,000,000, and a maximum quantity of registered users corresponding to the TA 2 of the network slice is 2,000,000, the slice management network element allows a maximum of 1,000,000 users to register with the TA 1 of the network slice and a maximum of 2,000,000 users to register with the TA 2.

If the slice management network element further receives information about a time from the network management network element, the slice management network element may further perform access user quantity control on the network slice based on the information about the time. For example, if the network management network element notifies the slice management network element that a maximum quantity of registered users corresponding to a time period 1 (for example, a weekend) is 1,000,000, and a maximum quantity of registered users corresponding to a time period 2 (for example, a working day) is 2,000,000, the slice management network element allows a maximum of 1,000,000 users to register with the network slice in the time period 1 and a maximum of 2,000,000 users to register with the network slice in the time period 2.

504: The slice management network element sends a first request to the data analysis network element. The first request is used to request service experience information corresponding to the network slice.

Actually, service experience information corresponding to the newly created network slice in 501 or service experience information of another network slice may be requested herein. The other network slice may be a network slice that has been in a stable state. Alternatively, service experience information of a plurality of network slices may be requested at the same time. When service experience information of several network slices is requested, a subsequent processing process of a problematic network slice is always the same.

Service experience information corresponding to each network slice includes experience information at a network slice granularity and experience information at a service granularity of the network slice.

The experience information at the network slice granularity is information that can reflect overall service experience of a network slice, and may include: user quantity information of the network slice (for example, a quantity of registered users or online users of the network slice), end-to-end delay information of the network slice, load information of the network slice, and the like.

The experience information at the service granularity is information that can reflect service experience of a service in a network slice, and includes quality information at a service granularity of the service (namely, information reflecting overall service experience of the service), and quality information at a user granularity of the service (namely, service experience information reflecting each user performing the service). The quality information at the service granularity includes: user quantity information of the service (a quantity of registered users or online users of the service), an average user experience value of the service (where for example, an average MOS of the service A is equal to 3), user experience value distribution information of the service (where for example, a percentage of users whose MOS values are in an interval of [3, 4] is 60%, and a percentage of users whose MOS values are in an interval of [4, 5] is 30%), and the like.

The first request includes network slice identification information of the requested network slice. The network slice identification information is used to uniquely identify the network slice. The network slice identification information may be one or more of network slice selection support information (NSSAI), S-NSSAI, NSI, and NSSI.

The first request may further include service identifier information. To be more specific, the first request is used to request service experience information corresponding to a network slice corresponding to the service identifier information. In other words, the requested service experience information corresponding to the network slice includes quality information of the service.

The foregoing service experience information corresponding to the network slice may be presented in a form of a table, as shown in Table 1. Certainly, Table 1 reflects only a representation form of a data structure, and may be another data structure.

In addition, some information elements, such as information about an area, are optional but not necessary. When there is no information about an area, it indicates that slice experience information is network-wide experience information, and is not limited to an area. A network slice 1 in Table 1 may be the newly created network slice in 501, or may be any existing network slice.

TABLE 1

| Information element | Meaning | Example |
| --- | --- | --- |
| Information about a time | Reflect a time corresponding to the slice experience information | For example, from January 1, 2019 to January 30, 2019, or from 10:00 on Monday to 17:00 on Monday |
| Information about an area | Reflect a spatial location corresponding to the slice experience information | For example, Pudong District in Shanghai or a 4G network cell list 1 of China Mobile in Shanghai |
| Service experience information of the network slice 1 | / | / |
| >Identifier of the network slice 1 | Uniquely identify the network slice 1 | For example, NSSAI 1, S-NSSAI 1, NSI 1 and NSSI 1 |
| >Experience information at a slice granularity of the network slice 1 | Reflect overall service experience of the slice 1 | / |
| >> Quantity of registered users of the network slice 1 | Quantity of users registered with the slice 1 | For example, 1,000,000 |
| >> Quantity of online users of the network slice 1 | Quantity of active users of the network slice 1 | For example, 800,000 |
| >> End-to-end delay of the network slice 1 | Data transmission time in the network slice 1 | For example, 10 ms |
| >>Load of the network slice 1 | Network load of the network slice 1 | For example, light load, heavy load, or normal |
| >Experience information at a service granularity of the network slice 1 | Reflect service experience of a single service of the network slice 1 | / |

TABLE 1-continued

| Information element | Meaning | Example |
|---|---|---|
| >> Identifier of a service A | Uniquely identify the service A | For example, application ID A |
| >>Quality information at a service granularity of the service A | Reflect overall service experience of the service A | / |
| >>>Quantity of users of the service A | >>>Quantity of users performing the service A | For example, 300,000 |
| >>>Average user experience of the service A | Average user experience value of the service A | For example, an average MOS value is equal to 3.8 |
| >>>User experience distribution of the service A | Reflect user experience of the service A in a distributed manner | / |
| >>>>Percentage of the service A having an MOS within an interval of [1, 2] | Percentage of a quantity of users whose MOS values of the service A are in the interval of [1, 2] to a total quantity of users of the service A | For example, 5% |
| >>>> Percentage of the service A having an MOS within an interval of [3, 4] | Percentage of a quantity of users whose MOS values of the service A are in the interval of [3,4] to a total quantity of users of the service A | For example, 80% |
| >> Quality information at a user granularity of the service A | Reflect service experience of a single user performing the service A | / |
| Experience information of the service A of user equipment (UE)_1 | User experience of a user 1 performing the service A | For example, an MOS of UE 1 is equal to 3 |
| Experience information of the service A of UE_2 | User experience of a user 2 performing the service A | For example, an MOS of UE 2 is equal to 4 |
| >> Identifier of a service B | . . . | . . . |

In a possible implementation, the first request includes information about an area. To be more specific, the first request is used to request service experience information that is of a network slice and that corresponds to the information about the area.

In a possible implementation, the first request includes information about a time. To be more specific, the first request is used to request service experience information that is of a network slice and that corresponds to the information about the time.

The service experience information that is of the network slice and that is requested in this step is equivalent to the third service experience information in step 105 in the embodiment in FIG. 2.

505: The network management network element sends a second request to the data analysis network element.

The second request is used to request the service experience information corresponding to the network slice.

Step 505 may be understood based on step 504, but an execution body is changed from the slice management network element to the network management network element.

506: The data analysis network element obtains the service experience information of the network slice.

The data analysis network element may obtain the service experience information of the network slice based on the request of the slice management network element or of the network management network element, or may autonomously obtain the service experience information of the network slice. The network slice herein may be a first network slice, a second network slice, a third network slice, or another network slice, or may be a plurality of network slices. Alternatively, step 506 may be described as: The data analysis network element obtains service experience information of an $N^{th}$ network slice, where N is a specific value or may be a set of a plurality of values.

The data analysis network element obtains the service experience information of the network slice in the following manners.

The data analysis network element directly obtains service experience information related to the network slice from an AF corresponding to the network slice.

This manner may be based on a premise that information provided by the AF is reliable. In this case, the AF can provide service experience information of the network slice, for example, a quantity of users of the network slice, an end-to-end delay, an average MOS of a service, MOS distribution, and a single-user MOS. The data analysis network element collects the experience data, and performs simple statistical calculation to obtain the experience information that is of the network slice and that is requested by the slice management network element or the network management network element. For example, the AF can provide the data analysis network element with user experience data of a single user performing the service A, for example, a MOS of the service A performed by the single user, and a delay of the service A performed by the single user. In this case, the data analysis network element can obtain, based on user experience of all single users, an average MOS value of the service A, an average end-to-end delay of the service A, user experience distribution of the service, and the like. The data is sent to the slice management network element or the network management network element as the service experience information.

The data analysis network element obtains experience information related to the network slice by performing model training on a service in the network slice.

For example, this manner may include the following several steps.

Step A: The data analysis network element may collect historical service data of a service from an AF network element, and obtain historical network data at a quality of service (QoS) flow level from a network element (for example, a RAN, an AMF network element, an SMF network element, or a UPF network element).

For example, the service data in this application may be data of parameters such as bandwidth, a delay, a packet loss rate, a jitter buffer, a Transmission Control Protocol (TCP) congestion window, a TCP receive window, a media encoding type, and a media encoding rate.

The network data at the QoS flow level in this application may be data of any one of the following parameters: bandwidth, a delay, a packet loss rate, reference signal received power (RSRP), reference signal received quality (RSRQ), a block error rate (BLER), a channel quality indicator (CQI), network slice identification information, or a data network name (DNN).

For example, as shown in Table 2, the data analysis network element obtains, via the AF network element, historical service data corresponding to one or more services such as a video service, a payment service, a self-driving service, or a vertical service. As shown in Table 3, the data analysis network element may obtain historical network data from a 5G NF.

For example, Table 2 shows examples of data content of service experience data of a tenant, and Table 3 shows examples of content of the network data of the 5G NF. For details, refer to Table 2 and Table 3.

TABLE 2

| Information | Parameter value | Source | Description |
| --- | --- | --- | --- |
| Correlation identifier | M | AF network element | |
| Application ID | M | | Service identifier |
| Geographical area identifier | M | | Identify a geographical area |
| Service MOS | M | | |

TABLE 3

| Information | Description |
| --- | --- |
| Correlation identifier | Identifier used to associate two types of data |
| Application ID | Service identifier |
| Quality of service (QoS) flow identifier (QFI) | Identifier of a quality of service flow |
| Cell ID | Used to identify a cell providing a service |
| QoS flow bit rate | Parameter of the quality of service flow, for example, guaranteed flow bit rate (GFBR) |
| QoS flow Packet Delay Budget (PDB) | Parameter of the quality of service flow, for example, PDB |
| QoS flow Packet Error Rate (PER) | Parameter of the quality of service flow, for example, PER |
| Network data X4 | Network data X4 |
| Network data X5 | Network data X5 |

Step B: The data analysis network element analyzes the historical network data and the historical service data to obtain a service experience model of each service in the network slice.

The service experience model refers to a variation relationship between the service data and the network data. For example, a service experience model is shown in the following formula:

$$H(x) = W0X0 + W1X1 + W2X2 + W3X3 + W4X4 + W5X5 + \ldots + WnXn \qquad (1),$$

where the variable X represents each piece of network data, for example, X1 may be the GFBR, X2 may be the PDB, X3 is the PER, X4 is the network data X4, and X5 is the network data X5; and Wn represents a weight of an $n^{th}$ variable, n represents a quantity of variables, Xn represents the $n^{th}$ variable, n is an integer greater than or equal to 1, and a value of H(x) indicates a value of the service data.

Step C: Based on the model relationship and current or predicted network data X, the data analysis network element can calculate a value of current or predicted H(X), namely, a value of current or predicted service data. The calculated value of the service data is continuously collected and stored, and is sent to the slice management network element or the network management network element as the service experience information.

507: The data analysis network element sends the service experience information of the network slice to the slice management network element.

Step 507 may be initiated based on step 504, or may be actively triggered by the data analysis network element. In other words, the data analysis network element may send the service experience information to the slice management network element based on the request of the slice management network element, or may actively send the service experience information to the slice management network element. The service experience information of the network slice in this step may be the service experience information of the newly created network slice in step 501, or may include service experience information of another existing network slice.

In a possible implementation, service experience information corresponding to information about a time of the network slice, for example, service experience information corresponding to information about a first time, is sent.

In a possible implementation, service experience information corresponding to information about an area of the network slice, for example, service experience information corresponding to information about a first area, is sent.

For the service experience information, refer to the descriptions of the service experience information in step 504.

In a possible implementation, the data analysis network element may further send third indication information to the slice management network element. The third indication information is used to indicate confidence level information that corresponds to the service experience information of the network slice and that is sent by the data analysis network element, or the third indication information is used to indicate that the experience information of the newly created network slice has been collected.

508: The data analysis network element sends the service experience information of the network slice to the network management network element.

Step 508 may be performed with reference to step 507, but an object to which the service experience information is sent is changed from the slice management network element to the network management network element.

509: The slice management network element determines, based on the service experience information of the network slice sent by the data analysis network element, whether service experience of the network slice satisfies an SLA requirement.

In this step, the network slice may include the newly created network slice in step 501, or may include another existing network slice. For each network slice, a manner in which the slice management network element determines whether service experience of the network slice satisfies a corresponding SLA requirement and a subsequent processing operation are the same.

In this step, the slice management network element directly or indirectly compares the service experience information sent by the data analysis network element with the SLA requirement of the tenant, to determine whether the SLA requirement is satisfied. If the service experience information and the SLA requirement are information of same type, the service experience information can be directly compared with the SLA requirement. When the service experience information cannot be directly compared with the SLA requirement, the slice management network element needs to first process the service experience information received from the NWDAF, convert the service experience information into information whose type is the same as that of the SLA requirement information, and then compare the information with the SLA requirement information.

For example, whether the service experience of the network slice satisfies an SLA requirement of a time may be determined based on the corresponding time, and whether the service experience of the network slice satisfies an SLA requirement of an area may be determined based on the corresponding area.

510: If determining that service experience of the first network slice cannot satisfy a corresponding SLA requirement, the slice management network element sends a query request to the data analysis network element. The query request is used to query, from the data analysis network element, information about an area/a time in which the first network slice cannot satisfy a specified requirement.

The first network slice may be the newly created network slice in step 501, or may be any existing network slice, and may be used as the first network slice provided that it is determined that the service experience of the first network slice cannot satisfy the corresponding SLA requirement. Therefore, the first network slice may be a plurality of network slices whose corresponding SLA requirements cannot be satisfied. In other words, the query request may be used to query information about areas/times in which the plurality of network slices cannot satisfy the corresponding requirements.

The specified requirement includes a service experience requirement at a specified network slice granularity or a service experience requirement at a specified service granularity. The specified requirement is the same as the service experience information in the foregoing embodiments. For example, the specified requirement is that a quantity of users of the network slice is less than or equal to 1,000,000, an end-to-end delay is less than or equal to 2 milliseconds (ms), an average MOS is greater than or equal to 3, and a user satisfaction percentage (a percentage of users whose MOSs are greater than 3) is greater than or equal to 90%. The specified requirement is obtained based on the SLA requirement of the first network slice. A value of the specified requirement is usually the same as a value of the SLA requirement.

There may be a case in which service experience of one or more network slices cannot satisfy corresponding SLA requirements, information about an area/a time in which each network slice cannot satisfy a corresponding specified requirement is requested. For example, if the network slice 1 cannot satisfy an SLA requirement 1 and a network slice 2 cannot satisfy an SLA requirement 2, the query request actually requests an area/a time in which the network slice 1 cannot satisfy a specified requirement 1, and an area/a time in which the network slice 2 cannot satisfy a specified requirement 2. The specified requirement 1 may be equal to the SLA requirement 1, and the specified requirement 2 may be equal to the SLA requirement 2.

For example, the query request may include at least one filter condition, each filter condition corresponds to one network slice, and the network slice is a network slice that cannot satisfy a corresponding SLA requirement. Each filter condition is used to indicate a filter of queried content to the data analysis network element, and is generated based on the foregoing specified requirements. For example, a filter condition corresponding to the network slice 1 is that a quantity of users of the network slice is less than 1,000,000, an end-to-end delay is greater than 2 ms, an average MOS is less than 3, and user satisfaction is less than 80%. It should be noted that, if the slice management network element has determined, in step 509, that service experience of a network slice cannot satisfy a corresponding SLA requirement based on an area, in other words, if the slice management network element has determined that the service experience of the corresponding network slice in the area cannot satisfy the SLA requirement, in step 510, the query request queries information about a sub-area/sub-time in which the specified requirement cannot be satisfied. In this case, a filter condition that corresponds to the network slice and that is in the query request should include information about the area, and the information about the area in the filter condition corresponds to the information about the third area in the embodiment in FIG. 2.

In addition, if the slice management network element has determined, in step 509, that service experience of a network slice cannot satisfy a corresponding SLA requirement based on a time, in other words, if the slice management network element has determined that the service experience of the corresponding network slice in the time cannot satisfy the SLA requirement, in step 510, the query request queries information about a sub-area/sub-time in which the specified requirement cannot be satisfied. In this case, a filter condition that corresponds to the network slice and that is in the query request should include information about the time, and the information about the time in the filter condition corresponds to the information about the third time in the embodiment in FIG. 2.

The foregoing manners may alternatively be used in combination. To be more specific, a filter condition that corresponds to the network slice and that is in the query request may include both the information about the time and the information about the area. In other words, in step 510, the query request queries information about a sub-time that is in the time and in which the specified requirement cannot be satisfied or information about a sub-area that is in the area and in which the specified requirement cannot be satisfied.

For a network slice such as the first network slice, there may be a plurality of filter conditions. The filter condition herein has a same meaning as that of the service experience requirement information in the embodiment in FIG. 2. Details are not described herein again.

The specified requirement and the at least one filter criterion in this step have a same function meaning as that of the service experience requirement information in the embodiment in FIG. 2. Details are not described herein again.

It should be noted that this step is described using an example in which the query request is used to query, from the data analysis network element, the information about the area/time in which the first network slice cannot satisfy the specified requirement. In another possible design, there is another scenario in which a query request is used to query, from the data analysis network element, information about an area/a time in which the first network slice over-satisfies a specified requirement. For example, when the slice management network element determines that the first network slice over-satisfies a corresponding SLA requirement, the query request is used to query, from the data analysis network element, information about an area/a time in which the first network slice over-satisfies the specified requirement. This method is similar to the foregoing method for querying the information about the area/time in which the specified requirement cannot be satisfied. The specified requirement in this query request may be different from the specified requirement in the foregoing query request. Details are not described herein again.

In another possible design, a query request may be used to: query, from the data analysis network element, information about an area/a time in which the first network slice cannot satisfy a first specified requirement, and query information about an area/a time in which the first network slice over-satisfies a second specified requirement. The first specified requirement may be the same as or different from the second specified requirement.

511: The data analysis network element sends a response message to the slice management network element based on the query request.

The response message includes the information about the time/area in which the first network slice cannot satisfy the corresponding specified requirement. When the first network slice in step 510 is a plurality of network slices, the response message herein may include information about areas/times in which the plurality of network slices cannot satisfy corresponding specified requirements.

In this step, the information that is about the time/area in which the corresponding specified requirement cannot be satisfied and that is included in the response message is equivalent to the information about the first area/the information about the first time in the embodiment in FIG. 2.

In a possible implementation, the response message further includes first service experience information that is of the first network slice and that corresponds to the information about the area/the information about the time. The first service experience information herein has a same meaning as that of the first service experience information in the embodiment in FIG. 2.

After steps 509 and 510 are performed, when determining that service experience of a network slice cannot satisfy a corresponding SLA requirement, the slice management network element may query, from the data analysis network element, specific areas/times in which the network slice cannot satisfy the SLA requirement; and may further obtain specific service experience information corresponding to the problematic areas/times from the data analysis network, such that network resources are subsequently accurately adjusted for a network in only the areas, avoiding blind network resource adjustment on the entire network. This avoids heavy workload and a waste of network resources.

It is noted that in another possible design, if the query request is used to query, from the data analysis network element, information about an area/a time in which the first network slice over-satisfies a specified requirement, the response message includes the information about the area/time in which the first network slice over-satisfies the specified requirement. This method is similar to the foregoing method in which the response message includes the information about the time/area in which the first network slice cannot satisfy the corresponding specified requirement. Details are not described herein.

In another possible design, if the query request is used to query, from the data analysis network element, the information about the area/time in which the first network slice cannot satisfy the first specified requirement, and query the information about the area/time in which the first network slice over-satisfies the second specified requirement, the response message includes the information about the area/time in which the first network slice cannot satisfy the first specified requirement and the information about the area/time in which the first network slice over-satisfies the second specified requirement.

512b: The slice management network element sends a first notification message to a network device. The first notification message is used to notify the network device of slice quality information of the first network slice.

The first notification message includes the network slice identification information corresponding to the first network slice.

The slice quality information of the first network slice includes: service experience information of the first network slice, and/or satisfaction level information of the service experience information of the first network slice relative to the SLA requirement of the first network slice. For a meaning of the slice quality information, refer to the meaning of the slice quality information in the embodiment in FIG. 2.

In a possible implementation, the first notification message further includes information about an area. The information about the area is the information that is obtained by the slice management network element from the data analysis network element via the query request/response message and that is about the area in which the first network slice cannot satisfy or over-satisfies the specified requirement. The information about the area herein corresponds to the information about the second area in the embodiment in FIG. 2, and it is considered that the information about the second area is equivalent to the information about the first area. The information about the area included in the first notification message is used to notify specific areas in which the network slice cannot satisfy or over-satisfies the SLA requirement, such that the access network device performs resource adjustment only for the specific areas, and performs a fine-grained network resource adjustment procedure, thereby avoiding blind attempts. This optimizes network resource allocation.

In a possible implementation, the first notification message further includes information about a time. The information about the time in the first notification message is information that is obtained by the slice management network element from the data analysis network element via a first request/response message and that is about a time in which each network slice cannot satisfy or over-satisfies a specified requirement. The information about the time herein corresponds to the information about the second time in the embodiment in FIG. 2, and it is considered that the information about the second time is equivalent to the information about the first time.

In a possible implementation, before step 512b, step 512a may further exist.

512a: The access network device sends a third request to the slice management network element.

The third request is used to request the slice quality information of the first network slice.

513b: The slice management network element may further send a second notification message to the network management network element. The second notification message is used to notify the slice quality information of the first network slice to the network management network element.

An operation manner of this step is similar to that of step 512b, and only an object to which the second notification message is sent needs to be changed from the access network device to the slice management network element.

In a possible implementation, similar to step 512a, step 513a may further exist before step 513b.

513a: The network management network element sends a fourth request to the slice management network element.

The fourth request is used to request the slice quality information of the first network slice.

For details of this step, refer to 512a.

514: The network device schedules a resource for the first network slice based on the slice quality information of the first network slice that is obtained from the slice management network element in step 512b.

For example, if the slice quality information shows that the network slice 1 satisfies only 60% of the SLA requirement 1, the access network device schedules an additional air interface resource for the network slice 1 or preferentially schedules an air interface resource for the network slice 1, to ensure that a satisfaction level of the network slice 1 relative to the SLA requirement 1 is increased (for example, increased to 100%), and finally, quality of the network slice 1 can satisfy the SLA requirement 1. It should be noted that the access network device schedules an additional air interface resource, where a quantity of scheduled air interface resources is within a quantity (for example, 30%) that is of maximum air interface resources and sent by the network management network element. That is, the quantity of scheduled additional air interface resources cannot exceed the quantity that is of maximum air interface resource and delivered by the network management network element. In addition, the access network device further needs to schedule an additional air interface resource with reference to a quantity (for example, 20%) that is of guaranteed air interface resources and sent by the network management network element. For example, an additional air interface resource is scheduled, where a quantity of scheduled additional air interface resources is near the quantity (for example, 20%) of guaranteed air interface resources.

For another example, if the slice quality information shows that the network slice 1 satisfies 120% of the SLA requirement 1, the access network device reduces air interface resources scheduled for the network slice 1 or reduces a scheduling priority of air interface resources, to ensure that a satisfaction level of the network slice 1 relative to the SLA requirement 1 is reduced (for example, reduced to 100%), and finally, quality of the network slice 1 can satisfy the SLA requirement 1. It should be noted that the access network device reduces air interface resources, where a quantity of scheduled air interface resources is within a quantity (for example, 30%) that is of maximum air interface resources and sent by the network management network element. That is, the quantity of scheduled air interface resources cannot exceed the quantity that is of maximum air interface resource and delivered by the network management network element. In addition, the access network device further needs to reduce air interface resources with reference to a quantity (for example, 20%) that is of guaranteed air interface resources and sent by the network management network element. For example, air interface resources are reduced, where a quantity of scheduled air interface resources is near the quantity (for example, 20%) of guaranteed air interface resources.

The SLA requirement 1 may be a target SLA requirement that is of the network slice 1 and of a grade. For details of a method for obtaining the target SLA requirement of this grade, refer to the instance in FIG. 2.

In a possible implementation, if the slice quality information obtained by the network device in step 512b is slice quality information corresponding to information about a time of the first network slice, the network device may alternatively schedule a resource for the first network slice based on the information about the time. That is, the network device adjusts resource scheduling for the first network slice based on only the information about the time.

In a possible implementation, if the slice quality information obtained by the network device in step 512b is slice quality information corresponding to information about an area of the first network slice, the network device may alternatively schedule a resource for the first network slice based on the information about the area. That is, the network device adjusts resource scheduling for the first network slice based on only the information about the area.

After step 514, the network device may be an access network device, a core network device, or a transport network device. For example, the network device is the access network device. The access network device continuously generates air interface resource scheduling data, for example, data such as a quantity of air interface resources (for example, a type and quantity of air-interface physical resource blocks) scheduled by a base station for each network slice at a time (for example, a time period or a time point) or in an area (for example, a cell or a cell list), or a scheduling priority. The data is continuously measured and collected as air interface resource scheduling data, and is reported to the network management network element. The data is subsequently used by the network management network element to detect and adjust air interface resources.

A representation form of the quantity of air interface resources is not limited to a type and quantity of air-interface physical resource blocks specifically invoked by the access network device for each network slice, for example, a quantity of CPUs, a quantity of memories, and a quantity of channels, or may be a percentage of air interface resources invoked by the access network device for each network slice to total air interface resources of the access network device. For example, the network slice 1 occupies 20% resources, and the network slice 2 occupies 30% resources.

515: The network management network element adjusts network resource configuration information of the first network slice based on the obtained service experience information of the first network slice, such that the first network slice can satisfy the corresponding SLA requirement.

The service experience information of the first network slice obtained by the network management network element may include the service experience information of the first network slice obtained from the data analysis network element according to step 508 or the slice quality information of the first network slice obtained from the slice management network element according to step 513b. For example, when the network management network element determines that a network slice cannot satisfy a corresponding SLA requirement, the network management network element increases a configuration of access network resources, core network resources, or transport network resources. For details, refer to the descriptions in step 501.

On the contrary, when the network management network element determines that a network slice over-satisfies a corresponding SLA requirement, the network management network element reduces a configuration of access network resources, core network resources, or transport network resources. For details, refer to the descriptions in step 501. If the network management network element determines that service experience of a network slice just satisfies a corresponding SLA requirement, a configuration of access network resources, core network resources, or transport network resources do not need to be adjusted. In a possible implementation, if the service experience information of the first network slice obtained by the network management network element is service experience information that is of the first network slice and that corresponds to a time or an area, the network management network element may adjust a configuration of network resources of the first network slice based on the time or the area.

In a possible implementation, when adjusting network resources of the first network slice, the network management network element further needs to consider air interface resource scheduling data obtained from the access network device. The air interface resource scheduling data is generated in a process of scheduling air interface resources by the access network device for the first network slice.

For example, initial air interface resource configuration information set by the network management network element for the network slice 1 includes that a maximum air interface resource configuration is 30%, and a guaranteed air interface resource configuration is 20%. If the network management network element obtains that a quantity of air interface resources scheduled by an access network device for the network slice 1 is 20%, and obtains, according to step 508 or step 513*b*, that the network slice 1 satisfies only 80% of the SLA requirement 1 when the quantity of air interface resources is 20%, the network management network element may adjust a configuration of air interface resources: a configuration of maximum air interface resources is 30%, and a configuration of guaranteed air interface resources is 23%, such that the access network device increases a quantity of air interface resources for the network slice (for example, to 23%). Finally, the network slice 1 satisfies 100% of the SLA requirement 1.

For another example, initial air interface resource configuration information set by the network management network element for the network slice 2 includes that a maximum air interface resource configuration is 30%, and a guaranteed air interface resource configuration is 25%. If the network management network element obtains that a quantity of air interface resources scheduled by an access network device for the network slice 2 is 25%, and obtains, according to step 508 or step 513*b*, that the network slice 2 satisfies only 120% of the SLA requirement 2 when the quantity of air interface resources is 25%, the network management network element may adjust a configuration of access network resources, such that the access network device reduces a quantity of air interface resources for the network slice (for example, to 20%). Finally, the network slice 2 satisfies 100% of the SLA requirement 2.

Certainly, for understanding of adjustment of the core network resource configuration information, refer to the adjustment of the access network resource configuration information, and only types of the adjusted resources are different. For understanding of the core network resource configuration information, refer to step 501.

For a newly created network slice or a network slice in a test phase, after steps 502 to 515 are performed repeatedly, the network management network element can continuously adjust resource configuration information of the network slice and of another related network slice based on service experience data of the network slice obtained from the data analysis network element and the slice management network element, to enable the network slice to satisfy an SLA requirement proposed by a tenant on the network slice as much as possible. If the SLA requirement cannot be satisfied, a new SLA requirement that can be satisfied needs to be negotiated with the tenant, provided that quality of another existing network slice in a stable phase is not affected.

516: After the newly created network slice enters a stable phase, the network management network element determines a new SLA requirement that can be satisfied by the newly created network slice, and sends new user quantity information to the slice management network element based on the new SLA requirement.

A meaning of the new user quantity information may be determined based on the meaning of the initial user quantity information in step 502.

The new SLA requirement may be the same as or different from the SLA requirement in step 101. In a possible implementation, the network management network element may further notify the slice management network element of the new SLA requirement corresponding to the newly created network slice network.

The network management network element may further notify the slice management network element of fourth indication information. The fourth indication information is used to notify the slice management network element of confidence level information of the new user quantity information or new SLA requirement information sent by the network management network element. Generally, compared with a network slice in a test phase, when the network slice is in a stable state, a confidence value that corresponds to the state and that is set by the network management network element is higher (for example, the confidence value is 99%).

In a possible implementation, in another possible design, the network management network element may further notify the slice management network element of fifth indication information. The fifth indication information is used to indicate that the network slice is in the stable state. In this state, the network is relatively stable, and resources cannot be frequently adjusted. In addition, the network management network element needs to negotiate with the tenant and use the new SLA requirement as a final signed SLA requirement.

517: The slice management network element performs access user quantity control on the network slice based on the new user quantity information sent by the network management network element.

The access user quantity control means control over the quantity of registered users of the network slice or the quantity of online users of the network slice. For details, refer to step 502.

In a possible implementation, if the slice management network element further receives the fourth indication information from the network management network element, the slice management network element may further perform user quantity control on the network slice based on the fourth indication information. For example, when the slice management network element learns, based on the fourth indication information, that a confidence level corresponding to the new user quantity information or new SLA requirement information sent by the network management network element is relatively high (for example, 99%), the slice management network element may allow a large quantity of users to access the network slice at the same time. For example, if the network management network element newly notifies the slice management network element that a quantity of registered users of the network slice does not exceed 10,000,000, the slice management network element may allow 10,000,000 users to access the network slice, and does not need to remove users or allow users to access the network slice step by step or in phases.

In a possible implementation, if the slice management network element further receives the fifth indication information from the network management network element, the slice management network element may further perform user quantity control on the network slice based on the fifth indication information. For example, when the slice management network element learns, based on the fifth indication information, that the network slice is in the stable phase, the slice management network element may allow a large quantity of users to access the network slice at the same time. For example, if the network management network element initially notifies the slice management network element that the quantity of registered users of the network slice does not exceed 10,000,000, the slice management network element may allow 10,000,000 users to access the network slice.

Certainly, the slice management network element may alternatively receive the fourth indication information and the fifth indication information from the network management network element. In this case, the slice management network element needs to control the quantity of users only in the foregoing manners.

In a possible implementation, the new user quantity information or the new SLA requirement may also be sent based on an area. This is the same as step 501.

In this embodiment of this application, the slice management network element can perform different control on the quantity of access users of the network slice based on different states of the network slice and different status information or confidence levels of the network slice sent by the network management network element. This improves accuracy and fineness of user quantity control. In addition, when determining that quality of a network slice cannot satisfy a corresponding SLA requirement, the slice management network element may query, from the data analysis network element, specific areas and/or times in which the network slice cannot satisfy the SLA requirement, such that network resources are subsequently accurately adjusted for a network in only the areas, avoiding blind network resource adjustment on the entire network. This avoids heavy workload and a waste of network resources.

Figure 7C:
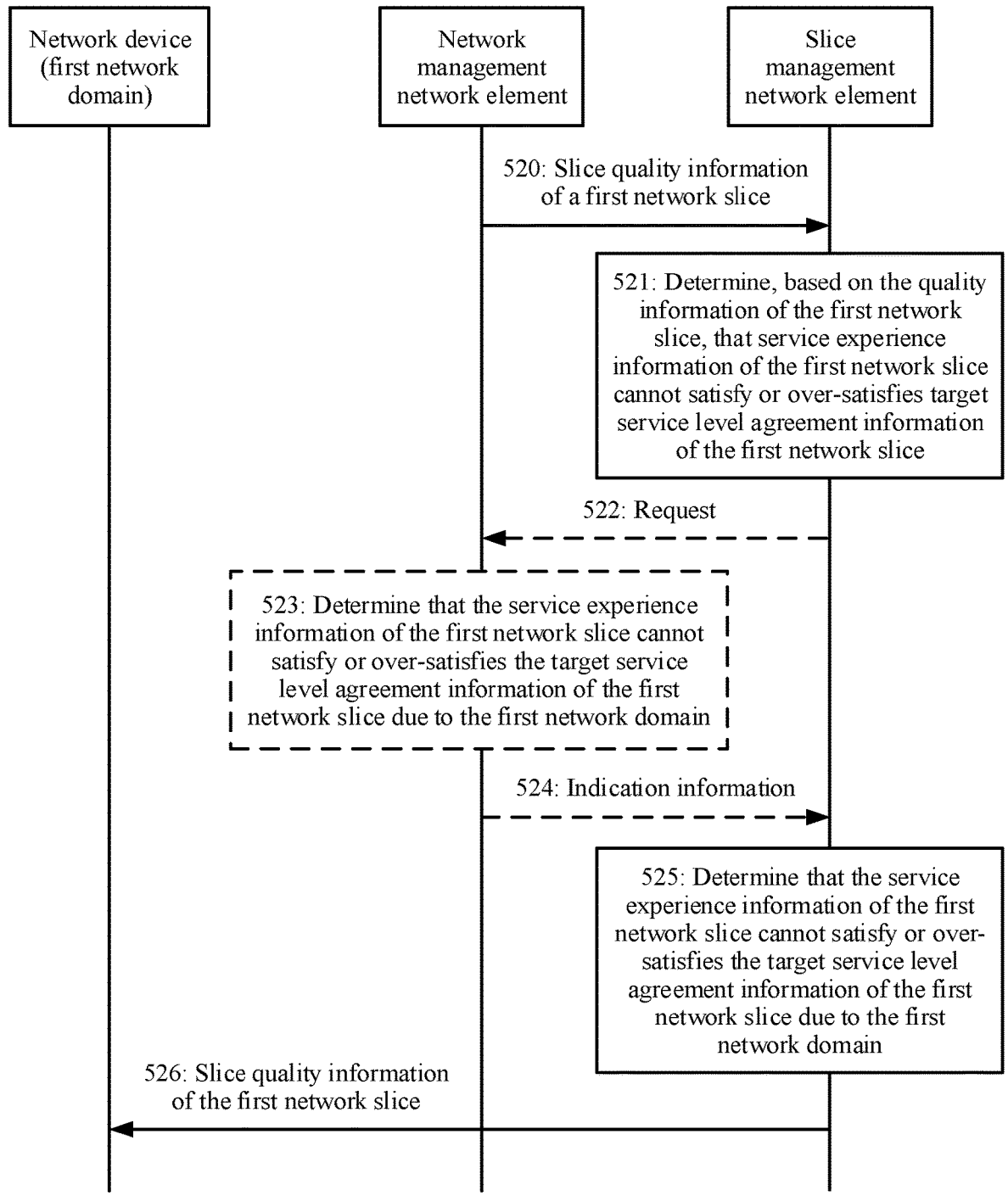
FIG. 7C is a schematic diagram of another embodiment of a resource scheduling method for a network slice according to an embodiment of this application.

FIG. 7C is a schematic diagram of another embodiment of a resource scheduling method for a network slice according to an embodiment of this application.

As shown in FIG. 7C, with reference to the embodiment in FIG. 2, the other embodiment of the resource scheduling method for a network slice provided in this embodiment of this application may include one or more of the following steps.

520: A slice management network element obtains slice quality information of a first network slice from a data analysis network element or a network management network element.

The slice quality information includes at least one of the following information: service experience information of the first network slice or satisfaction level information of the service experience information of the first network slice relative to target service level agreement requirement information.

For understanding of details of the service experience information of the first network slice herein, refer to the meaning and content of the service experience information (for example, the third service experience information) in the embodiment in FIG. 2.

In a possible implementation, the service experience information of the first network slice herein may be service experience information corresponding to an entire network range or entire time range of the first network slice.

In another possible implementation, the service experience information of the first network slice herein may alternatively be service experience information that is of the first network slice and that corresponds to information about an area of the first network slice or information about a time of the first network slice.

The satisfaction level information may include dissatisfaction, satisfaction, and over-satisfaction. For a meaning and an expression form of the satisfaction level information, refer to the satisfaction level information in the embodiment in FIG. 2.

For understanding of details of the slice quality information of the first network slice that is obtained by the slice management network element from the data analysis network element or the network management network element, refer to the descriptions of the service experience information corresponding to the network slice that is obtained by the slice management network element from the data analysis network element in steps 504 and 507 in the embodiment in FIG. 7A. Details are not described herein again.

In a possible implementation, if the slice quality information of the first network slice includes only the service experience information of the first network slice, this embodiment may further include: The slice management network element determines, based on the service experience information of the first network slice, the satisfaction level information of the service experience information of the first network slice relative to the target service level agreement requirement information of the first network slice. The satisfaction level information includes dissatisfaction, satisfaction, and over-satisfaction. For a meaning and an expression form of the satisfaction level information, refer to the satisfaction level information in the embodiment in FIG. 2. For details of the target service level agreement requirement information of the first network slice, refer to the target service level agreement requirement information in the embodiment in FIG. 2.

521: The slice management network element determines, based on the quality information of the first network slice, that the service experience information of the first network slice cannot satisfy or over-satisfies the target service level agreement information of the first network slice.

When the quality information of the first network slice includes the satisfaction level information of the service experience information of the first network slice relative to the target service level agreement requirement information, the slice management network element may directly determine, based on the satisfaction level information, that the service experience information of the first network slice cannot satisfy or over-satisfies the target service level agreement information of the first network slice.

For details of a manner in which when the quality information of the first network slice includes only the service experience information of the first network slice, the slice management network element determines, based on the service experience information, that the service experience information of the first network slice cannot satisfy or over-satisfies the target service level agreement information of the first network slice, refer to step 509.

522: The slice management network element sends a request to the network management network element.

The request is used to request, from the network management network element, a network domain due to which the service experience information of the first network slice cannot satisfy or over-satisfies the target service level agreement information of the first network slice.

The network domain usually includes but is not limited to the following domains: an access network domain (e.g., RAN domain), a core network (CN) domain, or a transport network (TN) domain.

523: The network management network element determines that the service experience information of the first network slice cannot satisfy or over-satisfies the target service level agreement information of the first network slice due to a first network domain.

In a possible implementation, before step 523, one or more of the following steps may further be included.

Step A: The network management network element obtains the slice quality information of the first network slice from the data analysis network element.

For a method of this step, refer to the method for obtaining the slice quality information of the first network slice by the slice management network element from the data analysis network element in step 520, or refer to the method for obtaining the service experience information of the network slice by the network management network element from the data analysis network element in steps 505 and 508 in the embodiment corresponding to FIG. 7A.

Step B: The network management network element determines, based on the slice quality information of the first network slice, that the service experience information of the first network slice cannot satisfy or over-satisfies the target service level agreement information of the first network slice.

For a method of this step, refer to step 521 or step 509 in the embodiment corresponding to step 7A.

In this implementation, the determining result that the service experience information of the first network slice cannot satisfy or over-satisfies the target service level agreement information of the first network slice is a precondition for performing step 523.

In other words, if the network management network element determines, based on the slice quality information of the first network slice, that the service experience information of the first network slice satisfies the target service level agreement information of the first network slice, step 523 and a subsequent step 524 may not be performed.

The network management network element is a network element responsible for deploying, maintaining, and managing a network slice, and can learn of global data of a network slice. Therefore, the network management network element can determine the satisfaction level information of the service experience information of the first network slice relative to the target service level agreement information of the first network slice, and can further locate a problematic network domain due to which the service experience information of the first network slice over-satisfies or cannot satisfy the target service level agreement information of the first network slice. For example, the located problematic network domain is one or more of the RAN domain, the CN domain, or the TN domain. The network management network element uses the problematic network domain as the first network domain. For example, for a network slice, the network management network element may preset one or more key performance indicators (KPIs) corresponding to each network domain. During actual operation of the network slice, the network management network element compares actually measured values of the key performance indicators of each network domain with preset values, to locate a problematic area.

524: The network management network element sends indication information to the slice management network element.

The indication information is used to indicate that the service experience information of the first network slice cannot satisfy or over-satisfies the target service level agreement information of the first network slice due to the first network domain.

In a possible implementation, the network management network element may send the indication information to the slice management network element in response to the request from the slice management network element.

In another possible implementation, the network management network element may alternatively actively send the indication information to the slice management network element. That is, step 522 may not be performed.

In a possible implementation, the network management network element may further send confidence level information to the slice management network element. The confidence level information is used to indicate a confidence level of the indication information. For details of a representation form of the confidence level information, refer to the representation form of the confidence level of the user quantity limit information in the embodiment in FIG. 5. Details are not described herein. The network management network element generates the confidence level information according to an internal policy or algorithm.

525: The slice management network element determines that the service experience information of the first network slice cannot satisfy or over-satisfies the target service level agreement information of the first network slice due to the first network domain.

In a possible implementation, the slice management network element determines, based on the indication information sent by the network management network element, that the service experience information of the first network slice cannot satisfy or over-satisfies the target service level agreement information of the first network slice due to the first network domain.

It should be noted that, step 522, step 523, and step 524 in this embodiment are optional steps. In another possible implementation, the three steps may not be performed, but the slice management network element may autonomously determine that the service experience information of the first network slice cannot satisfy or over-satisfies the target service level agreement information of the first network slice due to the first network domain. For example, for a determining method, refer to the determining method of the network management network element in step 523.

526: The slice management network element sends the slice quality information of the first network slice to a network device in the first network domain.

After determining, according to any one of the implementations in step 525, that the service experience information of the first network slice cannot satisfy or over-satisfies the target service level agreement information of the first network slice due to the first network domain, the slice management network element determines the network device in the first network domain, and sends the slice quality information of the first network slice to the network device. The network device may refer to all network devices in the first network domain, or some network devices in the first network domain, for example, only a network device that is in the first network domain and that corresponds to information about an area/information about a time.

The slice quality information is used by the network device to schedule a resource for the first network slice based on the slice quality information.

For example, when the first network domain is the access network domain, the slice management network element sends the slice quality information of the first network slice to an access network device in the access network domain, such that the access network device schedules an air interface resource for the first network slice based on the slice quality information of the first network slice. For understanding of details of a manner in which the access network device schedules more or fewer air interface resources for the first network slice based on the slice quality information of the first network slice, refer to the related descriptions in step 105 in FIG. 2 or step 514 in the embodiment in FIG. 7B.

When the first network domain is the core network domain or the transport network domain, a resource scheduling method is basically the same as that used when the first network domain is the access network domain, and only a difference is that a core network resource or a transport network resource is scheduled.

When the first network domain is a combination of two or more of the access network domain, the core network domain, or the transport network domain, a resource scheduling method is also basically the same, and a difference is that corresponding resources are separately scheduled in corresponding network domains.

In a possible implementation, if the slice management network element determines, based on the indication information sent by the network management network element in step 524, that the service experience information of the first network slice cannot satisfy or over-satisfies the target service level agreement information of the first network slice due to the first network domain, and further receives the confidence level information sent by the network management network element, where the confidence level information is used to indicate the confidence level of the indication information, the slice management network element may alternatively send the slice quality information of the first network slice to the network device in the first network domain based on the confidence level information.

For example, when the confidence level information is higher than a preset confidence value (where for example, a value of the confidence level information is greater than 90%), the slice management network element sends the slice quality information of the first network slice to the network device in the first network domain. On the contrary, when the confidence level information is lower than a preset confidence value (where for example, a value of the confidence level information is less than 60%), the slice management network element does not send the slice quality information of the first network slice to the network device in the first network domain.

The quality information of the first network slice in this step may be slice quality information corresponding to an entire network range or entire time range of the first network slice, or may be slice quality information that is of the first network slice and that corresponds to information about an area or information about a time. For example, the information about the area or the information about the time may be the information about the second area and/or the information about the second time determined by the slice management network element using the method in the embodiment in FIG. 2. In other words, the method in the embodiment in FIG. 7C may be used in combination with the method in the embodiment in FIG. 2. Before step 104 in the method in the embodiment shown in FIG. 2, the slice management network element may first locate the first network domain using the method in FIG. 7C, and then sends the information about the second area and/or the information about the second time to the network device in the first network domain, such that the network device in the first network domain schedules a resource for the first network slice based on the information about the second area and/or the information about the second time.

In the embodiment corresponding to FIG. 7C, the slice management network element may first precisely locate a network domain (for example, an access network domain) due to which the service experience information of the first network slice cannot satisfy the target service level agreement requirement information, and then provide the slice quality information of the first network slice for a network device in the network domain, such that the network device in the network domain can adjust resource scheduling. This method can avoid blindly adjusting a resource scheduling status of another normally working network domain, and improve accuracy of resource scheduling.

Figure 7D:
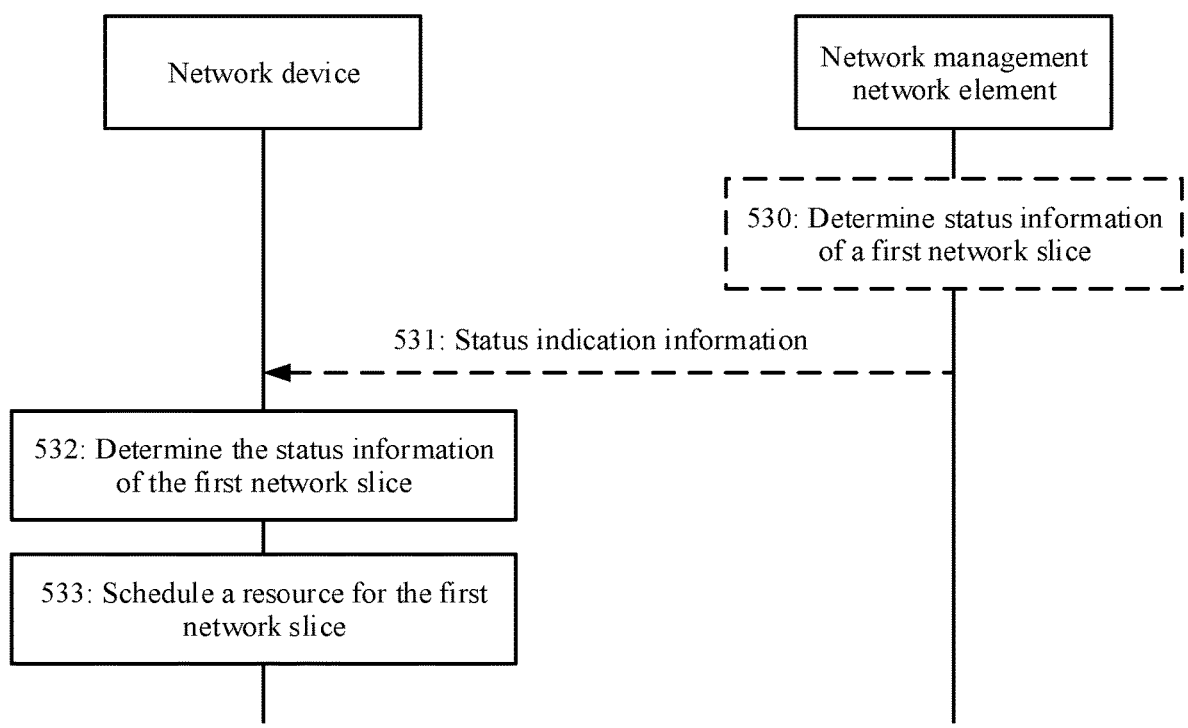
FIG. 7D is a schematic diagram of another embodiment of a resource scheduling method for a network slice according to an embodiment of this application.

FIG. 7D is a schematic diagram of another embodiment of a resource scheduling method for a network slice according to an embodiment of this application.

As shown in FIG. 7D, with reference to the method in the embodiment in FIG. 3 or FIG. 4, the other embodiment of the resource scheduling method for a network slice provided in this application includes one or more of the following steps.

530: A network management network element determines status information of a first network slice.

The status information of the first network slice includes an unsigned SLA state or a signed SLA state of the first network slice.

The unsigned SLA state means that no service level agreement on the first network slice has been signed with a slice tenant. In other words, the first network slice is a newly created network slice or a network slice that is still in a test phase.

The signed SLA state means that a service level agreement on the first network slice has been signed with a slice tenant. In other words, the first network slice is a network slice in a stable state or a network slice whose test phase has been completed.

In a possible implementation, the network management network element may determine, based on internal configuration information, whether a service level agreement corresponding to the first network slice has been signed with the tenant, to determine the status information of the first network slice.

In another possible implementation, the network management network element may alternatively determine the status information of the first network slice based on slice quality information of the first network slice obtained from a data analysis network element. The slice quality information of the first network slice includes service experience information of the first network slice or satisfaction level information of the service experience information of the first network slice relative to target service level agreement requirement information of the first network slice. The network management network element may determine the status information of the first network slice based on whether the service experience information satisfies the target service level agreement requirement information. For example, if the service experience information satisfies the target service level agreement requirement information, it is determined that the status information of the first network slice is a signed SLA state or an equivalent stable state; or if the service experience information does not satisfy the target service level agreement requirement information, it is determined that the status information of the first network slice is an unsigned SLA state or an equivalent test state.

In a possible implementation, the network management network element may further determine confidence level information corresponding to the status information of the first network slice. The confidence level information is used to indicate a confidence level of the status information. For a representation form of the confidence level information, refer to the representation form of the confidence level of the user quantity limit information in the embodiment in FIG. 5.

531: The network management network element sends status indication information of the first network slice to a network device.

The status indication information includes the status information of the first network slice.

In a possible implementation, before step 531, the network management network element receives a status request message that is to be sent by the network device. The status request message is used to request the status information of the first network slice.

In another possible implementation, the network management network element may actively send the status indication information of the first network slice to the network device, that is, does not need to send the status indication information based on the status request message of the network device.

It should be noted that, similar to the method described in step 101, if the target service level agreement requirement information is obtained based on service level agreement requirement information of a plurality of grades, for example, the target service level agreement requirement information is service level agreement requirement information of one grade in the service level agreement requirement information of the plurality of grades, the network management network element may further indicate target service level agreement requirement information corresponding to the status information to the network device. To be more specific, the network management network element notifies the network device that no SLA on the network slice has been signed or notifies the network device of an SLA of the network slice that has been signed.

In a possible implementation, the status indication information may be included in resource configuration information and sent by the network management network element to the network device together. For details of a meaning and content of the resource configuration information, refer to the meaning of the resource configuration information in the embodiment in FIG. 3 or FIG. 4.

In another possible implementation, the status indication information may be independent of resource configuration information, and sent by the network management network element to the network device.

In a possible implementation, the network management network element may further send the confidence level information corresponding to the status information of the first network slice to the network device. The confidence level information may be included in the status indication information and sent to the network device, or may be independent of the status indication information and sent to the network device.

532: The network device determines the status information of the first network slice.

In a possible implementation, the network device determines the status information of the first network slice based on the status indication information of the first network slice sent by the network management network element.

In another possible implementation, the network device autonomously determines the status information of the first network slice. For details, refer to the method for determining the status information of the first network slice by the network management network element in step 520. If the network device can autonomously determine the status information of the first network slice, steps 530 and 531 may be omitted.

It should be noted that, if the target service level agreement requirement information is obtained based on service level agreement requirement information of the plurality of grades, the network device may further determine target service level agreement requirement information corresponding to the status information autonomously or based on a notification of the network management network element. To be more specific, the network device determines that no SLA on the network slice has been signed or determines an SLA of the network slice that has been signed.

533: The network device schedules a resource for the first network slice based on the status information of the first network slice.

In a possible implementation, when the status information of the first network slice is the unsigned SLA state of the first network slice, and status information of a second network slice is a signed SLA state of the second network slice, the network device schedules a resource for the second network slice in preference to the first network slice. In other words, in this case, the network device preferentially schedules a resource for the second network slice, and schedules a resource for the first network slice only when there is a remaining resource. The second network slice is another network slice different from the first network slice.

In another possible implementation, when the status information of the first network slice is the signed SLA state of the first network slice, and status information of a second network slice is an unsigned SLA state of the second network slice, the network device schedules the resource for the first network slice in preference to the second network slice. In other words, in this case, the network device preferentially schedules a resource for the first network slice, and schedules a resource for the second network slice only when there is a remaining resource.

In another possible implementation, when the status information of the first network slice is the unsigned SLA state of the first network slice, and status information of a second network slice is an unsigned SLA state of the second network slice, the network device schedules resources for the first network slice and the second network slice equally. In other words, in this case, there is no priority difference between the two network slices, and resource scheduling may be obtained from the network device at an equal opportunity.

In another possible implementation, when the status information of the first network slice is the signed SLA state of the first network slice, and the status information of the second network slice is a signed SLA state of the second network slice, the network device schedules resources for the first network slice and the second network slice equally;

or the network device schedules resources for the first network slice and the second network slice based on other information. For example, the network device may schedule resources for different network slices based on preemption priority information of different slices. For another example, the network device may alternatively schedule resources for different network slices based on specific SLAs signed for different slices. For example, if a requirement of an SLA signed for the first network slice is higher than a requirement of an SLA signed for the second network slice, resources are preferentially scheduled for the first network slice.

In a possible implementation, if the network device further receives the confidence level information corresponding to the status indication information of the first network slice sent by the network management network element, where the confidence level information is used to indicate the confidence level of the status information, the network device may alternatively schedule a resource for the first network slice based on the confidence level information. For example, when the confidence level information is higher than a preset confidence value (where for example, a value of the confidence level information is greater than 90%), the network device schedules a resource for the first network slice in the foregoing several possible manners. On the contrary, when the confidence level information is lower than a preset confidence value (where for example, a value of the confidence level information is less than 60%), the network device does not schedule a resource for the first network slice in the foregoing several possible manners. There is another possible implementation in which the network device schedules a resource for the first network slice based on the confidence level information. This is not limited in the present disclosure.

In addition to the status information of the first network slice, for a manner in which the network device schedules a resource for the first network slice, refer to the embodiment in FIG. 3 or FIG. 4. In other words, the network device may alternatively schedule a resource for the first network slice based on the resource configuration information sent by the network management network element. Details are not described herein again.

In this embodiment, the network device includes one or more of the following device types: an access network device, a core network device, and a transport network device. For a meaning of the network device herein, refer to the network device in the embodiment in FIG. 3 or FIG. 4.

When the network device is the access network device, step 533 is that the access network device schedules an air interface resource for the first network slice based on the status information of the first network slice.

When the network device is the core network device, step 533 is that the core network device schedules a core network resource for the first network slice based on the status information of the first network slice.

When the network device is the transport network device, step 533 is that the transport network device schedules a transport network resource for the first network slice based on the status information of the first network slice.

When the network device is a combination of two or more of the access network device, the core network device, and the transport network device, in step 533, the corresponding network devices respectively schedules corresponding network resources.

Figure 7E:
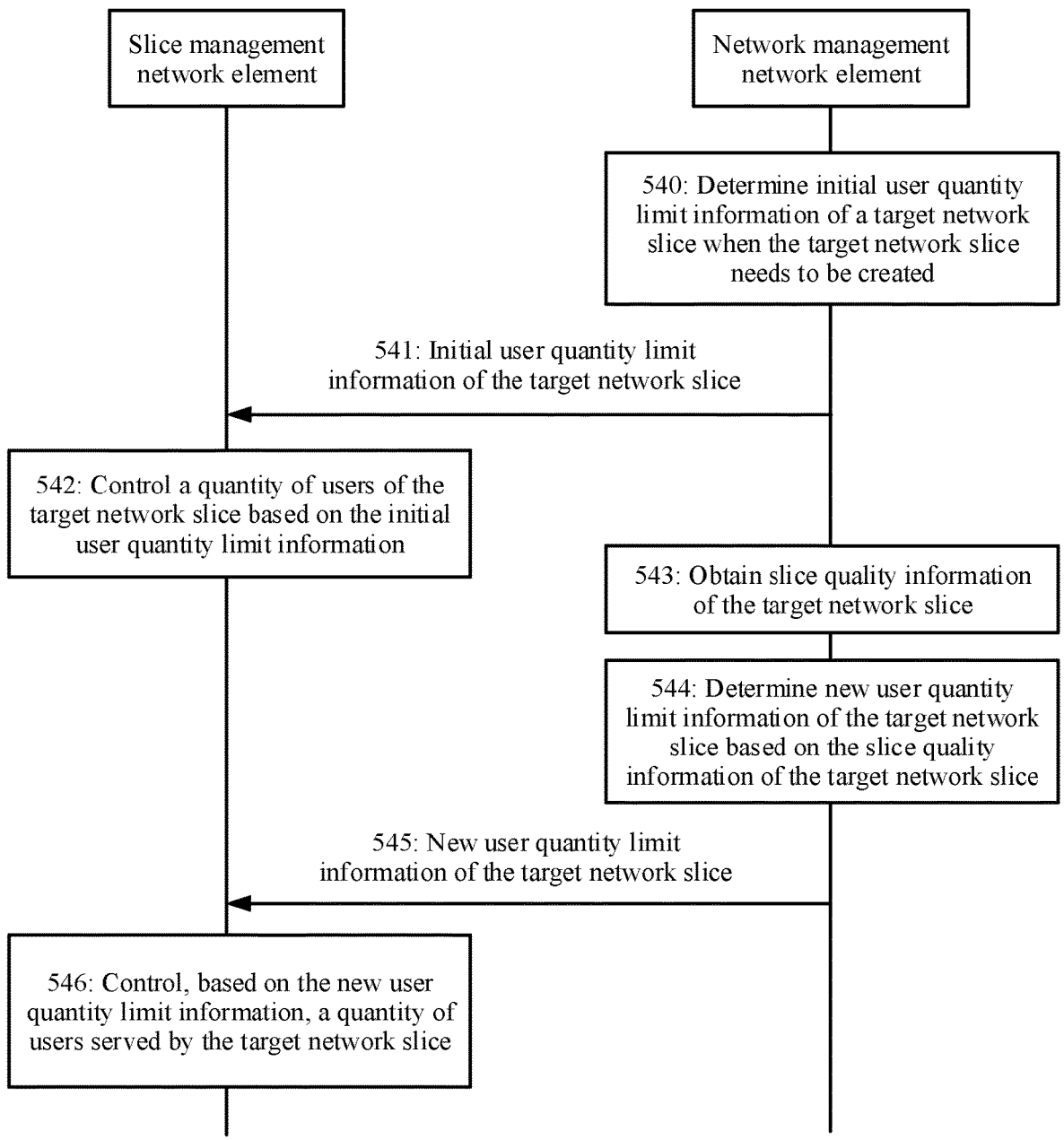
FIG. 7E is a schematic diagram of another embodiment of user quantity control for a network slice according to an embodiment of this application.

FIG. 7E is a schematic diagram of another embodiment of a user quantity control method according to an embodiment of this application.

As shown in FIG. 7E, with reference to the method in the embodiment in FIG. 5, the other embodiment of the user quantity control method provided in this embodiment of this application may include one or more of the following steps.

540: When a new target network slice needs to be created, a network management network element determines initial user quantity limit information of the target network slice.

For details of a meaning and content of the user quantity limit information, refer to the user quantity limit information in the embodiment in FIG. 5. Details are not described herein again.

When a network slice is newly created, the network management network element may determine initial user quantity limit information based on initial service level agreement requirement information provided by a tenant of the network slice. It should be noted that the initial service level agreement requirement information is usually a service level agreement requirement that is used for pilot running and provided by the tenant before a formal service level agreement is signed, and may include the initial user quantity limit information.

541: The network management network element sends the initial user quantity limit information of the target network slice to a slice management network element.

For details of this step, refer to the method for sending, by the network management network element, the user quantity limit information of the target network slice to the slice management network element in step 402. Only a difference is that the indication information in step 402 is not sent in this step. Details are not described herein again.

542: The slice management network element controls a quantity of users of the target network slice based on the initial user quantity limit information.

For details of this step, refer to the method for controlling, based on the user quantity limit information, the quantity of users served by the target network slice in step 403. Details are not described herein again.

543: The network management network element obtains slice quality information of the target network slice.

The slice quality information includes: service experience information of the target network slice, and/or satisfaction level information of the service experience information of the target network slice relative to a target service level agreement requirement of the target network slice. For details of a meaning and content of the slice quality information, refer to the meaning and the content of the slice quality information in the embodiments in FIG. 2 to FIG. 7B. Details are not described herein again.

The network management network element may obtain the slice quality information of the target network slice from the slice management network element or a data analysis network element. For details, refer to the method for obtaining the slice quality information or service experience information of the first network slice by the network management network element in the embodiment in FIG. 4 or FIG. 7A and FIG. 7B. Details are not described herein again.

544: The network management network element determines new user quantity limit information of the target network slice based on the slice quality information of the target network slice.

Optionally, when the quality information of the slice includes only the service experience information of the target network slice, the network management network element may further determine, based on the service experience information of the target network slice, the satisfaction level information of the service experience information relative to the target service level agreement requirement information. The satisfaction level information may include dissatisfaction, satisfaction, and over-satisfaction, or the satisfaction level information may be in another representation form. This is not limited herein.

The network management network element determines the new user quantity limit information of the target network slice based on the satisfaction level information of the service experience information of the target network slice relative to the target service level agreement requirement information of the target network slice. For example, when the satisfaction level information is the dissatisfaction, a quantity of users that is included in the new user quantity limit information determined by the network management network element is less than that in the initial user quantity limit information. In other words, the network management network element determines to reduce the quantity of users of the target network slice. On the contrary, when the satisfaction level information is the over-satisfaction, a quantity of users that is included in the new user quantity limit information determined by the network management network element is greater than that in the initial user quantity limit information. In other words, the network management network element determines to increase the quantity of users of the target network slice. For another example, when the satisfaction level information is the satisfaction, a quantity of users that is included in the new user quantity limit information determined by the network management network element is equal to that in the initial user quantity limit information. In other words, the network management network element determines not to change the quantity of users of the target network slice.

545: The network management network element sends the new user quantity limit information to the slice management network element.

For details, refer to step 541. A difference is that the initial user quantity limit information in step 541 is replaced with the new user quantity limit information.

546: The slice management network element controls, based on the new user quantity limit information, a quantity of users served the target network slice.

In a possible implementation, when the new user quantity limit information is equal to the initial user quantity limit information, the slice management network element does not need to perform any operation.

In a possible implementation, when the new user quantity limit information is less than the initial user quantity limit information, the slice management network element needs to prevent more users from accessing the target network slice, and even needs to remove redundant users accessing the target network slice from the target network slice.

In another possible implementation, when the new user quantity limit information is greater than the initial user quantity limit information, the slice management network element allows more users to access the target network slice.

One or more of steps 543 to 546 are repeatedly performed, and the network management network element and the slice management network element may continuously exchange and update the user quantity limit information of the target network slice, such that the quantity of users achieves an optimal state, namely, a state in which the service experience information of the target network slice satisfies the target service level agreement requirement information.

It should be noted that, for ease of description, that the type of the service experience information (for example, the service experience information corresponding to the information about the first area/the information about first time) of the network slice obtained by the slice management network element from the data analysis network element is the same as the type of the service experience information (for example, the service experience information corresponding to the information about the second area/the information about second time) of the network slice sent by the slice management network element to the network device may be described in some steps (for example, steps 511 and 512*b* in the embodiment shown in FIG. 7B) in some embodiments of this application. For example, the two pieces of service experience information each include experience information at a network granularity and experience information at a service granularity that are of the network slice. Actually, the two pieces of service experience information may alternatively include different types of experience information. For example, the service experience information of the network slice obtained by the slice management network element from the data analysis network element includes experience information at a user granularity, and the service experience information of the network slice sent by the slice management network element to the network device includes experience information at a network granularity and experience information at a service granularity. In other words, the slice management network element may generate to-be-sent service experience information based on the received service experience information. The to-be-sent service experience information may be the same as or different from the received service experience information. This is also applicable to the network management network element.

In addition, it should be noted that in this embodiment, both the slice management network element and the network management network element obtain the service experience information of the network slice from the data analysis network element. For ease of description, this embodiment is described using an example in which both the slice management network element and the network management network element interact with a same data analysis network element. In an instance, there may be a scenario in which the slice management network element and the network management network element may interact with different data analysis network elements to obtain the service experience information of the network slice. This is not excluded in this embodiment.

In addition, the network elements in the embodiments of this application are described herein.

The slice management network element is a network element having at least one of the following functions: a function of managing and controlling user access of a network slice, a resource deployment function, and a function of executing a network management command. The slice management network element may be located on a control plane of a carrier network. For example, the slice management network element is a network slice selection function (NSSF) network element. The slice management network element may alternatively be located on a management plane of the carrier network. For example, the slice management network element is an OAM, an NSMF, or a communication service management function (CSMF) network element.

The data analysis network element is a network element having a function of analyzing at least one of the following types of data: carrier network data, service data, or user data. The data analysis network element may be located on the control plane of the carrier network. For example, the data analysis network element may be a network data analytics function (NWDAF) network element. The data analysis network element may alternatively be located on the management plane of the carrier network. For example, the data analysis network element may be an MDAS.

The network management network element is a network element having at least one of the following functions: a network resource deployment function or a network operation management function. For example, the network management network element may be an NSSF, an OAM, an NSMF, or a CSMF.

The slice management network element may be the NSSF on the control plane, and a corresponding network management network element may be the OAM, the NSMF, or the CSMF.

The slice management network element may alternatively be the NSMF or the CSMF on the management plane, and a corresponding network management network element may be the MDAS.

The foregoing mainly describes the solutions provided in the embodiments of this application from a perspective of interaction between the network elements. It may be understood that to implement the foregoing functions, the foregoing slice management network element, network device, data analysis network element, and network management network element include corresponding hardware structures and/or software modules for implementing the functions. A person skilled in the art should easily be aware that, in combination with the functions described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

From a perspective of a physical device, the foregoing slice management network element, network device, data analysis network element, or network management network element may be implemented by a physical device, may be implemented jointly by a plurality of physical devices, or may be a logical function unit inside a physical device. This is not specifically limited in the embodiments of this application.

Figure 8:
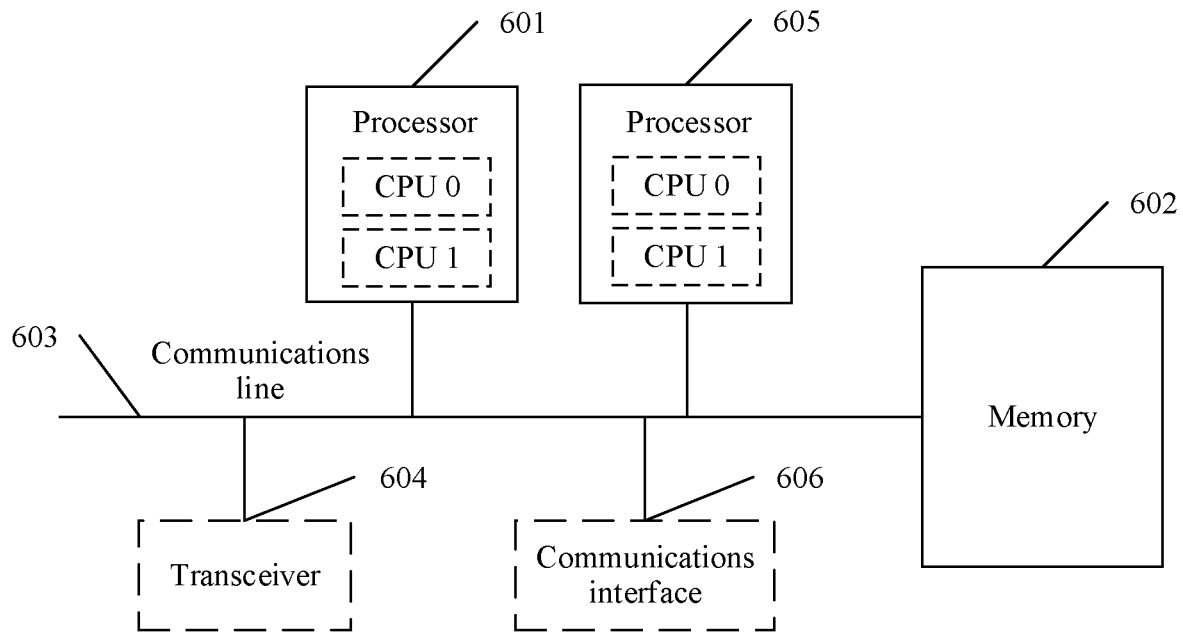
FIG. 8 is a schematic diagram of an embodiment of a communications device according to an embodiment of this application.

For example, the foregoing slice management network element, network device, data analysis network element, or network management network element may be implemented by the communications device in FIG. 8. FIG. 8 is a schematic diagram of a hardware structure of a communications device according to an embodiment of this application. The communications device includes at least one processor 601, a memory 602, and a communications line 603. The communications device may further include at least one of a transceiver 604 or a communications interface 606.

The processor 601 may be a general-purpose central processing unit (CPU), a microprocessor, an application-specific integrated circuit (ASIC), a server integrated circuit (IC), or one or more integrated circuits configured to control program execution in the solutions of this application.

The communications line 603 may include a path for transmitting information between the foregoing components.

The transceiver 604 is any apparatus such as a transceiver, and is configured to communicate with another device or a communications network such as the Ethernet, a radio access network (RAN), or a wireless local area network (WLAN). The transceiver 604 may alternatively be a transceiver circuit or a transceiver. When the communications device is a slice management network element, a network device, a data analysis network element, or a network management network element, the communications device may include the transceiver 604.

The communications device may further include a communications interface 606.

The memory 602 may be a read-only memory (ROM), another type of static storage device capable of storing static information and instructions, a random-access memory (RAM), or another type of dynamic storage device capable of storing information and instructions, or may be an electrically erasable programmable read-only memory (EEPROM), a compact disc read-only memory (CD-ROM), another compact disc storage, an optical disc storage (including a compressed optical disc, a laser disc, an optical disc, a digital versatile disc, a Blu-ray optical disc, and the like), a magnetic disk storage medium, another magnetic storage device, or any other medium capable of including or storing expected program code in a form of instructions or data structures and capable of being accessed by a computer, but is not limited thereto. The memory 602 may exist independently, and is connected to the processor 601 through the communications line 603. The memory 602 may alternatively be integrated with the processor 601.

The memory 602 is configured to store a computer-executable instruction for executing the solutions of this application, and the processor 601 controls execution of the computer-executable instruction. The processor 601 is configured to execute the computer-executable instruction stored in the memory 602, to implement the operations provided in the foregoing method embodiments of this application.

In a possible implementation, the computer-executable instruction in this embodiment of this application may also be referred to as application program code. This is not specifically limited in this embodiment of this application.

During implementation, in an embodiment, the processor 601 may include one or more CPUs, for example, a CPU 0 and a CPU 1 in FIG. 8.

During implementation, in an embodiment, the communications device may include a plurality of processors, for example, the processor 601 and a processor 605 in FIG. 8. Each of the processors may be a single-core (single-CPU) processor or a multi-core (multi-CPU) processor. The processor(s) herein may be one or more devices, circuits, and/or processing cores for processing data (for example, the computer-executable instruction).

From a perspective of a function unit, the slice management network element, the network device, the data analysis network element, or the network management network element in this application may be divided into function units based on the foregoing method embodiments. For example, each function unit may be obtained through division based on each corresponding function, or two or more functions may be integrated into one function unit. The integrated function unit may be implemented in a form of hardware, or may be implemented in a form of a software function unit.

Figure 9:
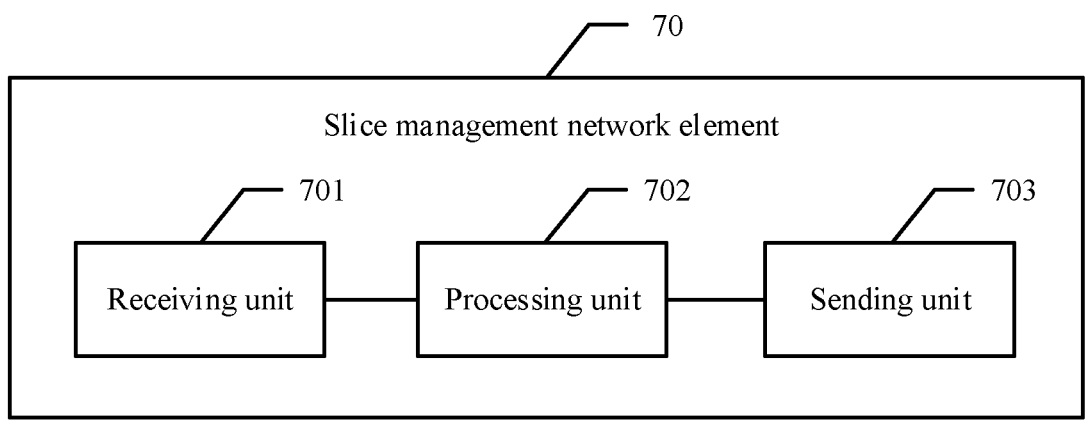
FIG. 9 is a schematic diagram of an embodiment of a slice management network element according to an embodiment of this application.

For example, when function units are divided through integration, FIG. 9 is a schematic structural diagram of a slice management network element 70. As shown in FIG. 9, an embodiment of the slice management network element 70 in this application may include a receiving unit 701, a processing unit 702, and a sending unit 703.

The sending unit 703 is configured to send a request to a data analysis network element. The request includes service experience requirement information of a first network slice.

The receiving unit 701 is configured to receive a response sent by the data analysis network element. The response includes information about a first area and/or information about a first time that are/is of the first network slice and that correspond/corresponds to the service experience requirement information.

The sending unit 703 is configured to send information about a second area and/or information about a second time to a network device based on the information about the first area and/or the information about the first time. The information about the second area and/or the information about the second time are/is used by the network device to schedule a resource for the first network slice based on the information about the second area and/or the information about the second time.

According to the foregoing solution, the network device can schedule the resource based on the information about the second area and/or the information about the second time. This improves accuracy of resource scheduling and network resource utilization, and also improves performance of the network slice.

In some embodiments of this application, the processing unit 702 is configured to determine the information about the second area and/or the information about the second time based on first service experience information.

In some embodiments of this application, the sending unit 703 is configured to send slice quality information corresponding to the information about the second area and/or the information about the second time to the network device. The slice quality information includes at least one of the following information: second service experience information that is of the first network slice and that corresponds to the information about the second area and/or the information about the second time, or satisfaction level information of the second service experience information relative to target service level agreement requirement information of the first network slice.

In some embodiments of this application, when the network device is an access network device, the information about the second area is used by the access network device to schedule an access network resource for the first network slice based on the information about the second area, and the information about the second time is used by the access network device to schedule an access network resource for the first network slice based on the information about the second time.

In some embodiments of this application, the satisfaction level information includes dissatisfaction, satisfaction, and over-satisfaction.

In some embodiments of this application, the request further includes information about a third area. The third area indicated by the information about the third area includes the first area indicated by the information about the first area, and the information about the third area is used to request, from the data analysis network element, the information that is about the first area in the third area and that corresponds to the service experience requirement information.

In some embodiments of this application, the request further includes information about a third time. The third time indicated by the information about the third time includes the first time indicated by the information about the first time, and the information about the third time is used to request, from the data analysis network element, the information that is about the first time in the third time and that corresponds to the service experience requirement information.

In some embodiments of this application, the processing unit 702 is configured to: obtain third service experience information of the first network slice; and if the third service experience information does not correspond to the target service level agreement requirement information, determine the service experience requirement information of the first network slice. The service experience requirement information of the first network slice corresponds to the target service level agreement requirement.

In some embodiments of this application, the processing unit 702 is configured to: compare the third service experience information with the target service level agreement requirement information; and if the third service experience information does not satisfy or over-satisfies the target service level agreement requirement information, determine that the third service experience information does not correspond to the target service level agreement requirement information.

In some embodiments of this application, the processing unit 702 is configured to: if the third service experience information does not satisfy the target service level agreement requirement information, determine service experience requirement information that is of the first network slice and that corresponds to the dissatisfaction; or if the third service experience information over-satisfies the target service level agreement requirement information, determine service experience requirement information that is of the first network slice and that corresponds to the over-satisfaction.

In some embodiments of this application, the processing unit 702 is configured to: if the third service experience information does not satisfy the target service level agreement requirement information, reduce a quantity of users served by the first network slice; or if the third service experience information over-satisfies the target service level agreement requirement information, increase a quantity of users served by the first network slice.

In some embodiments of this application, the processing unit 702 is further configured to: obtain initial service level agreement requirement information of the first network slice; determine at least one piece of service level agreement requirement information based on the initial service level agreement requirement information of the first network slice; and determine one of the at least one piece of service level agreement requirement information as the target service level agreement requirement information.

In some embodiments of this application, the service experience requirement information of the first network slice includes at least one of the following information: a requirement on a quantity of users of the first network slice, a requirement on an average user experience of a service, or a filter requirement on a user satisfaction percentage of the service. The user satisfaction percentage of the service is a percentage of a quantity of users whose user experience corresponding to the service is not less than a preset value to a total quantity of users of the service.

In some embodiments of this application, the sending unit 703 is further configured to send a subscription request to the data analysis network element. The subscription request is used to request service experience information of a second network slice.

In some embodiments of this application, the receiving unit 701 is further configured to learn, from a network management network element, that a new network slice needs to be created or a network slice needs to be deleted.

In some embodiments of this application, the processing unit 702 is further configured to determine that a problematic area and/or a problematic time are/is caused by a first network domain. The problematic area includes the first area or the second area, and the problematic time includes the first time or the second time. The slice management network element determines the network device based on the first network domain.

In some embodiments of this application, the processing unit 702 is configured to learn, from the network management network element, that the problematic area and/or the problematic time are/is caused by the first network domain.

In some embodiments of this application, the processing unit 702 is configured to: obtain first confidence level information from the network management network element, where the first confidence level information is used to indicate a confidence level of information indicating that the problematic area and/or the problematic time are/is caused by the first network domain; and determine the network device based on the first confidence level information and the first network domain.

In some embodiments of this application, the processing unit 702 is configured to learn, from the network management network element, that the third service experience information does not correspond to the target service level agreement requirement information due to a second network domain.

In some embodiments of this application, the processing unit 702 is configured to: obtain second confidence level information from the network management network element, where the second confidence level information is used to indicate a confidence level of information indicating that the third service experience information does not correspond to the target service level agreement requirement information due to the second network domain; and determine the network device based on the second confidence level information and the second network domain.

In some embodiments of this application, the first network domain or the second network domain includes at least one of the following: an access network domain, a core network domain, or a transport network domain.

The slice management network element 70 provided in this embodiment of this application is configured to perform the method performed by the slice management network element in the method embodiment corresponding to FIG. 2 or FIG. 7A and FIG. 7B. Therefore, for understanding of this embodiment of this application, refer to the related descriptions in the method embodiment corresponding to FIG. 2 or FIG. 7A and FIG. 7B.

In this embodiment of this application, the slice management network element 70 is presented in a form of function units divided through integration. The "function unit" herein may be an application-specific integrated circuit, a processor and a memory for executing one or more software or firmware programs, an integrated logic circuit, and/or another device that can provide the foregoing function. In an embodiment, a person skilled in the art may figure out that the slice management network element 70 may be in the form shown in FIG. 8.

For example, the processor 601 in FIG. 8 may invoke the computer-executable instruction stored in the memory 602, such that the slice management network element 70 performs the method performed by the slice management network element in the method embodiment corresponding to FIG. 2 or FIG. 7B.

Functions/implementation processes of the receiving unit 701, the processing unit 702, and the sending unit 703 in FIG. 9 may be implemented by the processor 601 in FIG. 8 by invoking the computer-executable instruction stored in the memory 602. Alternatively, a function/an implementation process of the processing unit 702 in FIG. 9 may be implemented by the processor 601 in FIG. 8 by invoking the computer-executable instruction stored in the memory 602, and functions/implementation processes of the receiving unit 701 and the sending unit 703 in FIG. 9 may be implemented through the transceiver 604 in FIG. 8.

The slice management network element provided in this embodiment of this application may be configured to perform the method in the embodiment corresponding to FIG. 2 or FIG. 7A and FIG. 7B. Therefore, for a technical effect that can be obtained in this embodiment of this application, refer to the method embodiment corresponding to FIG. 2 or FIG. 7A and FIG. 7B. Details are not described herein again.

Figure 10:
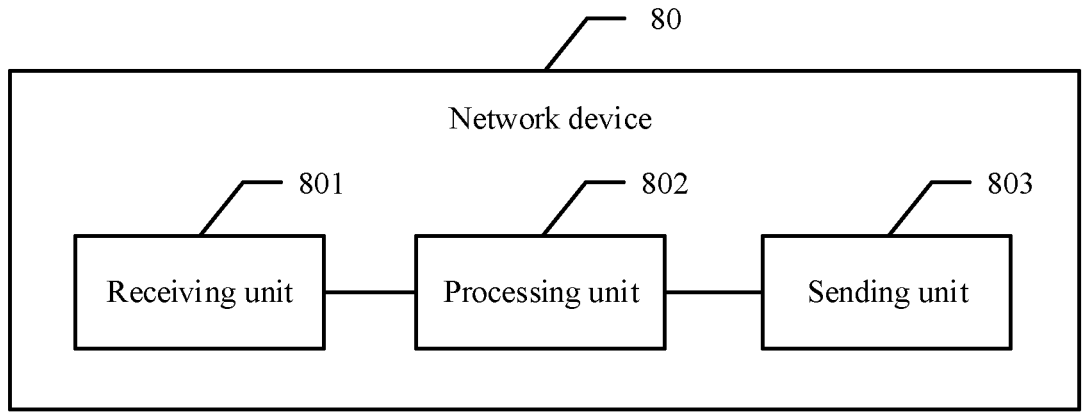
FIG. 10 is a schematic diagram of an embodiment of a network device according to an embodiment of this application.

For example, when the function units are divided through integration, FIG. 10 is a schematic structural diagram of a network device 80. As shown in FIG. 10, an embodiment of the network device 80 provided in this application may include a receiving unit 801, a processing unit 802, and a sending unit 803.

The receiving unit 801 is configured to receive information about a second area and/or information about a second time that are/is of a first network slice and sent by a slice management network element.

The processing unit 802 is configured to schedule a resource for the first network slice based on the information about the second area and/or the information about the second time.

The network device 80 in this application can schedule the resource based on the information about the second area and/or the information about the second time. This improves accuracy of resource scheduling and network resource utilization, and also improves performance of the network slice.

In some embodiments of this application, the receiving unit 801 is further configured to receive slice quality information that corresponds to the first network slice and that is sent by the slice management network element. The slice quality information includes: service experience information of the first network slice, and/or satisfaction level information of the service experience information of the first network slice relative to a target service level agreement requirement. The processing unit 802 is configured to adjust, based on the slice quality information, the resource scheduled for the first network slice.

In some embodiments of this application, the slice quality information corresponding to the first network slice includes: service experience information that is of the first network slice and that corresponds to the second area, and/or satisfaction level information of the service experience information corresponding to the second area relative to the target service level agreement requirement. The second area is an area indicated by the information about the second area.

In some embodiments of this application, the second area is an area in which the target service level agreement requirement cannot be satisfied or is over-satisfied.

In some embodiments of this application, the slice quality information corresponding to the first network slice may include: service experience information that is of the first network slice and that corresponds to the second time, and/or satisfaction level information of the service experience information corresponding to the second time relative to the target service level agreement requirement. The second time is a time indicated by the information about the second time.

In some embodiments of this application, the second time is a time in which the target service level agreement requirement cannot be satisfied or is over-satisfied.

In some embodiments of this application, the slice quality information corresponding to the first network slice includes: service experience information that is of the first network slice and that corresponds to the second area, service experience information that is of the first network slice and that corresponds to the second time, and/or satisfaction level information of the service experience information corresponding to the second area relative to the target service level agreement requirement and satisfaction level information of the service experience information corresponding to the second time relative to the target service level agreement requirement. The second area is an area indicated by the information about the second area. The second time is a time indicated by the information about the second time.

In some embodiments of this application, the processing unit 802 is configured to: if the service experience information of the first network slice cannot satisfy the target service level agreement requirement, schedule an additional resource for the first network slice; or if the service experience information of the first network slice over-satisfies the target service level agreement requirement, reduce resources scheduled for the first network slice.

The network device 80 provided in this embodiment of this application is configured to perform the method performed by the network device in the method embodiment corresponding to FIG. 2 or FIG. 7A and FIG. 7B. Therefore, for understanding of this embodiment of this application, refer to the related descriptions in the method embodiment corresponding to FIG. 2 or FIG. 7A and FIG. 7B.

In this embodiment of this application, the network device 80 is presented in a form of function units divided through integration. The "function unit" herein may be an application-specific integrated circuit, a processor and a memory for executing one or more software or firmware programs, an integrated logic circuit, and/or another device that can provide the foregoing function. In an embodiment, a person skilled in the art may figure out that the network device 80 may be in the form shown in FIG. 8.

For example, the processor 601 in FIG. 8 may invoke the computer-executable instruction stored in the memory 602, such that the network device 80 performs the method performed by the network device in the method embodiment corresponding to FIG. 2 or FIG. 7A and FIG. 7B.

Functions/implementation processes of the receiving unit 801, the processing unit 802, and the sending unit 803 in FIG. 10 may be implemented by the processor 601 in FIG. 8 by invoking the computer-executable instruction stored in the memory 602. Alternatively, a function/an implementation process of the processing unit 802 in FIG. 10 may be implemented by the processor 601 in FIG. 8 by invoking the computer-executable instruction stored in the memory 602, and functions/implementation processes of the receiving unit 801 and the sending unit 803 in FIG. 10 may be implemented through the transceiver 604 in FIG. 8.

The network device 80 provided in this embodiment of this application may be configured to perform the method in the embodiment corresponding to FIG. 2 or FIG. 7A and FIG. 7B. Therefore, for a technical effect that can be obtained in this embodiment of this application, refer to the method embodiment corresponding to FIG. 2 or FIG. 7A and FIG. 7B. Details are not described herein again.

Figure 11:
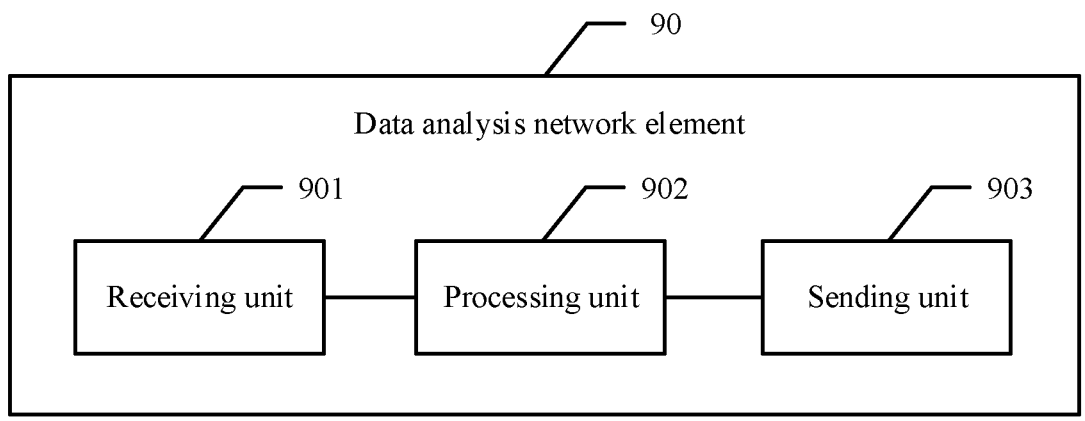
FIG. 11 is a schematic diagram of an embodiment of a data analysis network element according to an embodiment of this application.

For example, when function units are divided through integration, FIG. 11 is a schematic structural diagram of a data analysis network element 90. As shown in FIG. 11, an embodiment of the data analysis network element 90 provided in this application may include a receiving unit 901, a processing unit 902, and a sending unit 903.

The receiving unit 901 is configured to receive a request sent by a slice management network element. The request includes service experience requirement information of a first network slice.

The processing unit 902 is configured to determine information about a first area and/or information about a first time that correspond/corresponds to the service experience requirement information.

The sending unit 903 is configured to send a response to the slice management network element. The response includes the information about the first area and/or the information about the first time that correspond/corresponds to the service experience requirement information.

It can be learned from the solution of this application that the data analysis network element 90 may determine information about a first problematic area of the first network slice and/or information about a first problematic time of the first network slice, to help the network device perform more accurate resource scheduling.

In some embodiments of this application, the processing unit 902 is configured to determine first service experience information that is of the first network slice and that corresponds to the information about the first area and/or the information about the first time. The response further includes the first service experience information that is of the first network slice and that corresponds to the information about the first area and/or the information about the first time.

In some embodiments of this application, the service experience requirement information of the first network slice includes positive service experience requirement information and/or negative service experience requirement information. The positive service experience requirement information is filter information that first service level agreement requirement information is over-satisfied, and the negative service experience requirement information is filter information that second service level agreement requirement information is not satisfied.

In some embodiments of this application, the processing unit 902 is further configured to such that when the request further includes information about a third area, and the third area indicated by the information about the third area includes the first area indicated by the information about the first area, the processing unit 902 obtains, based on the information about the third area, the information that is about the first area in the third area and that corresponds to the service experience requirement information.

In some embodiments of this application, the processing unit 902 is further configured to such that when the request further includes information about a third time, and the third time indicated by the information about the third time includes the first time indicated by the information about the first time, the processing unit 902 obtains, based on the information about the third time, the information that is about the first time and that corresponds to the service experience requirement information from the information about the third time.

In some embodiments of this application, the service experience requirement information of the first network slice includes at least one of the following information: a requirement on a quantity of users of the first network slice, a filter requirement on an average user experience MOS of a service, or a filter requirement on a user satisfaction percentage of the service. The user satisfaction percentage of the service is a percentage of a quantity of users whose user experience corresponding to the service is not less than a preset value to a total quantity of users of the service.

In some embodiments of this application, the first service experience information of the first network slice includes at least one of the following information: user quantity information of the first network slice, user quantity information of a service, average user experience MOS information of a service, or user satisfaction percentage information of the service. A user satisfaction percentage of the service is a percentage of a quantity of users whose user experience corresponding to the service is not less than a preset value to a total quantity of users of the service.

The data analysis network element 90 provided in this embodiment of this application is configured to perform the method performed by the slice management network element in the method embodiment corresponding to FIG. 2 or FIG. 7A and FIG. 7B. Therefore, for understanding of this embodiment of this application, refer to the related descriptions in the method embodiment corresponding to FIG. 2 or FIG. 7A and FIG. 7B.

In this embodiment of this application, the data analysis network element 90 is presented in a form of function units divided through integration. The "function unit" herein may be an application-specific integrated circuit, a processor and a memory for executing one or more software or firmware programs, an integrated logic circuit, and/or another device that can provide the foregoing function. In an embodiment, a person skilled in the art may figure out that the data analysis network element 90 may be in the form shown in FIG. 8.

For example, the processor 601 in FIG. 8 may invoke the computer-executable instruction stored in the memory 602, such that the data analysis network element 90 performs the method performed by the data analysis network element in the method embodiment corresponding to FIG. 2 or FIG. 7A and FIG. 7B.

Functions/implementation processes of the receiving unit 901, the processing unit 902, and the sending unit 903 in FIG. 11 may be implemented by the processor 601 in FIG. 8 by invoking the computer-executable instruction stored in the memory 602. Alternatively, a function/an implementation process of the processing unit 902 in FIG. 11 may be implemented by the processor 601 in FIG. 8 by invoking the computer-executable instruction stored in the memory 602, and functions/implementation processes of the receiving unit 901 and the sending unit 903 in FIG. 11 may be implemented through the transceiver 604 in FIG. 8.

The network device provided in this embodiment of this application may be configured to perform the method in the embodiment corresponding to FIG. 2 or FIG. 7A and FIG. 7B. Therefore, for a technical effect that can be obtained in this embodiment of this application, refer to the method embodiment corresponding to FIG. 2 or FIG. 7A and FIG. 7B. Details are not described herein again.

Figure 12:
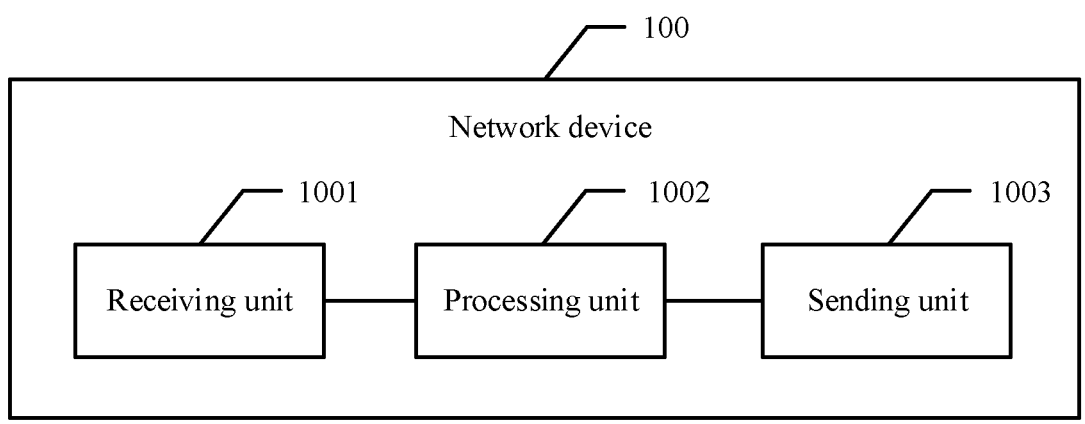
FIG. 12 is a schematic diagram of another embodiment of a network device according to an embodiment of this application.

For example, when the function units are divided through integration, FIG. 12 is a schematic structural diagram of a network device 100. As shown in FIG. 12, an embodiment of the network device 100 in this application may include a receiving unit 1001, a processing unit 1002, and a sending unit 1003.

The receiving unit 1001 is configured to receive resource configuration information that is of a first network slice and sent by a network management network element. The resource configuration information includes maximum resource configuration information and/or guaranteed resource configuration information, the maximum resource configuration information is used to indicate maximum available resources of the first network slice, and the guaranteed resource configuration information is used to indicate a guaranteed available resource of the first network slice.

The processing unit 1002 is configured to schedule a resource for the first network slice based on the resource configuration information of the first network slice.

According to the solution provided in this embodiment of this application, a resource of a network slice does not need to be bound to the network slice. When the resource needs to be used, limited by a quantity of the maximum available resources, the guaranteed available resource is preferentially used. This not only guarantees that a resource is available to the network slice, but also improves resource flexibility.

In some embodiments of this application, a guaranteed available resource of the first network slice is allowed to be used by a second network slice.

In some embodiments of this application, when the network device 100 is an access network device, the maximum resource configuration information is maximum air interface resource configuration information, and/or the guaranteed resource configuration information is guaranteed air interface resource configuration information.

In some embodiments of this application, the processing unit 1002 is configured to: within the quantity limited by the maximum resource configuration information, preferentially guarantee to schedule the guaranteed available resource for the first network slice based on the guaranteed resource configuration information.

In some embodiments of this application, the processing unit 1002 is configured to: when the maximum resource configuration information and/or the guaranteed resource configuration information are/is maximum resource configuration information and/or guaranteed resource configuration information that correspond/corresponds to a first time, schedule a resource for the first network slice in the first time based on the maximum resource configuration information and/or the guaranteed resource configuration information that correspond/corresponds to the first time.

In some embodiments of this application, the processing unit 1002 is configured to: when the maximum resource configuration information and/or the guaranteed resource configuration information are/is maximum resource configuration information and/or guaranteed resource configuration information that correspond/corresponds to a first area, schedule a resource for the first network slice in the first area based on the maximum resource configuration information and/or the guaranteed resource configuration information that correspond/corresponds to the first area.

In some embodiments of this application, the receiving unit 1001 is configured to receive slice quality information that corresponds to the first network slice and that is sent by the slice management network element. The slice quality information includes: service experience information of the first network slice, and/or satisfaction level information of the service experience information of the first network slice relative to a target service level agreement requirement.

The processing unit 1002 is configured to adjust, based on the slice quality information, the resource scheduled for the first network slice.

In some embodiments of this application, the slice quality information corresponding to the first network slice includes: service experience information that is of the first network slice and that corresponds to a second area, and/or satisfaction level information of the service experience information corresponding to the second area relative to the target service level agreement requirement.

In some embodiments of this application, the second area is an area in which the target service level agreement requirement cannot be satisfied or is over-satisfied.

In some embodiments of this application, the slice quality information corresponding to the first network slice includes: service experience information that is of the first network slice and that corresponds to a second time, and/or satisfaction level information of the service experience information corresponding to the second time relative to the target service level agreement requirement.

In some embodiments of this application, the second time is a time in which the target service level agreement requirement cannot be satisfied or is over-satisfied.

In some embodiments of this application, the processing unit 1002 is configured to: if the service experience information of the first network slice cannot satisfy the target service level agreement requirement, schedule an additional resource for the first network slice; or if the service experience information of the first network slice over-satisfies the target service level agreement requirement, reduce resources scheduled for the first network slice.

The network device 100 provided in this embodiment of this application is configured to perform the method performed by the slice management network element in the method embodiment corresponding to FIG. 3, FIG. 4, or FIG. 7A and FIG. 7B. Therefore, for understanding of this embodiment of this application, refer to the related descriptions in the method embodiment corresponding to FIG. 3, FIG. 4, or FIG. 7A and FIG. 7B.

In this embodiment of this application, the network device 100 is presented in a form of function units divided through integration. The "function unit" herein may be an application-specific integrated circuit, a processor and a memory for executing one or more software or firmware programs, an integrated logic circuit, and/or another device that can provide the foregoing function. In an embodiment, a person skilled in the art may figure out that the network device 100 may be in the form shown in FIG. 8.

For example, the processor 601 in FIG. 8 may invoke the computer-executable instruction stored in the memory 602, such that the network device 100 performs the method performed by the network device in the method embodiment corresponding to FIG. 3, FIG. 4, or FIG. 7A and FIG. 7B.

Functions/implementation processes of the receiving unit 1001, the processing unit 1002, and the sending unit 1003 in FIG. 12 may be implemented by the processor 601 in FIG. 8 by invoking the computer-executable instruction stored in the memory 602. Alternatively, a function/an implementation process of the processing unit 1002 in FIG. 12 may be implemented by the processor 601 in FIG. 8 by invoking the computer-executable instruction stored in the memory 602, and functions/implementation processes of the receiving unit 1001 and the sending unit 1003 in FIG. 12 may be implemented through the transceiver 604 in FIG. 8.

The network device 100 provided in this embodiment of this application may be configured to perform the method in the embodiment corresponding to FIG. 3, FIG. 4, or FIG. 7A and FIG. 7B. Therefore, for a technical effect that can be obtained in this embodiment of this application, refer to the method embodiment corresponding to FIG. 3, FIG. 4, or FIG. 7A and FIG. 7B. Details are not described herein again.

Figure 13:
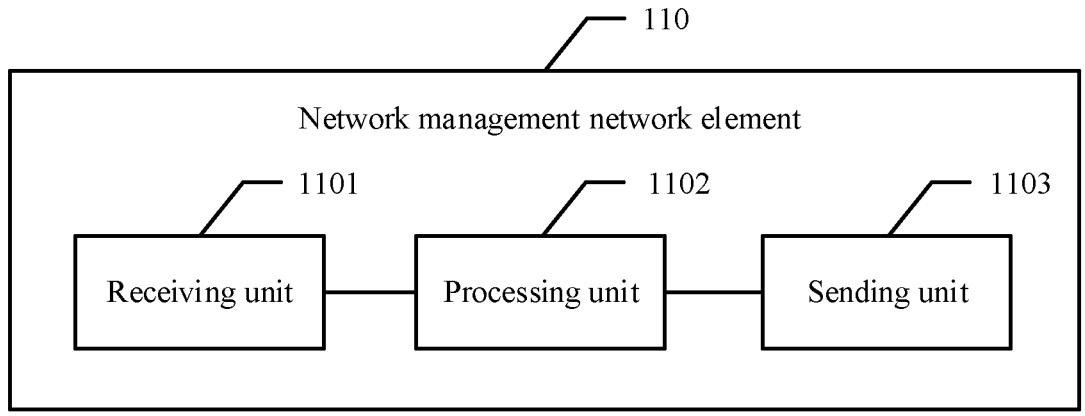
FIG. 13 is a schematic diagram of an embodiment of a network management network element according to an embodiment of this application.

For example, when function units are divided through integration, FIG. 13 is a schematic structural diagram of a network management network element 110. As shown in FIG. 13, an embodiment of the network management network element 110 in this application may include a receiving unit 1101, a processing unit 1102, and a sending unit 1103.

The processing unit 1102 is configured to determine resource configuration information of a first network slice. The resource configuration information includes maximum resource configuration information and/or guaranteed resource configuration information, the maximum resource configuration information is used to indicate maximum available resources of the first network slice, and the guaranteed resource configuration information is used to indicate a guaranteed available resource of the first network slice.

The sending unit 1103 is configured to send the resource configuration information of the first network slice to a network device. The resource configuration information is used by the network device to schedule a resource for the first network slice based on the resource configuration information.

According to the solution provided in this embodiment of this application, a resource of a network slice does not need to be bound to the network slice. When the resource needs to be used, limited by a quantity of the maximum available resources, the guaranteed available resource is preferentially used. This not only guarantees that a resource is available to the network slice, but also improves resource flexibility.

In some embodiments of this application, the maximum resource configuration information is maximum air interface resource configuration information, and/or the guaranteed resource configuration information is guaranteed air interface resource configuration information.

In some embodiments of this application, the maximum resource configuration information and/or the guaranteed resource configuration information are/is maximum resource configuration information and/or guaranteed resource configuration information that correspond/corresponds to a first time. Alternatively, the maximum resource configuration information and/or the guaranteed resource configuration information are/is maximum resource configuration information and/or guaranteed resource configuration information that correspond/corresponds to a first area.

In some embodiments of this application, the processing unit 1102 is configured to determine the resource configuration information of the first network slice based on target service level agreement requirement information of the first network slice.

In some embodiments of this application, the processing unit 1102 is configured to: obtain information about the resource scheduled by the network device for the first network slice; and obtain slice quality information of the first network slice, where the slice quality information includes: service experience information of the first network slice, and/or satisfaction level information of the service experience information of the first network slice relative to the target service level agreement requirement. The processing unit 1102 is further configured to update the resource configuration information of the first network slice based on the information about the resource scheduled by the network device for the first network slice and the slice quality information. The network management network element 110 sends updated resource configuration information to the network device.

In some embodiments of this application, the processing unit 1102 is configured to: when the information about the resource includes information about a resource corresponding to a second area of the first network slice, and the service experience information of the first network slice includes service experience information that is of the first network slice and that corresponds to the second area, update the resource configuration information of the first network slice based on the information about the resource corresponding to the second area and the service experience information corresponding to the second area.

In some embodiments of this application, the processing unit 1102 is configured to: when the information about the resource includes information about a resource corresponding to a second time of the first network slice, and the service experience information of the first network slice includes service experience information that is of the first network slice and that corresponds to the second time, update the resource configuration information of the first network slice based on the information about the resource corresponding to the second time and the service experience information corresponding to the second time.

In some embodiments of this application, the processing unit 1102 is configured to update the maximum resource configuration information and/or the guaranteed resource configuration information, such that updated maximum resource configuration information is not less than the resource scheduled by the network device for the first network slice.

In some embodiments of this application, the receiving unit 1101 is configured to obtain the slice quality information from a slice management network element or a data analysis device.

The network management network element 110 provided in this embodiment of this application is configured to perform the method performed by the slice management network element in the method embodiment corresponding to FIG. 3, FIG. 4, or FIG. 7A and FIG. 7B. Therefore, for understanding of this embodiment of this application, refer to the related descriptions in the method embodiment corresponding to FIG. 3, FIG. 4, or FIG. 7A and FIG. 7B.

In this embodiment of this application, the network management network element 110 is presented in a form of function units divided through integration. The "function unit" herein may be an application-specific integrated circuit, a processor and a memory for executing one or more software or firmware programs, an integrated logic circuit, and/or another device that can provide the foregoing function. In an embodiment, a person skilled in the art may figure out that the network management network element 110 may be in the form shown in FIG. 8.

For example, the processor 601 in FIG. 8 may invoke the computer-executable instruction stored in the memory 602, such that the network management network element 110 performs the method performed by the network management network element in the method embodiment corresponding to FIG. 3, FIG. 4, or FIG. 7A and FIG. 7B.

Functions/implementation processes of the receiving unit 1101, the processing unit 1102, and the sending unit 1103 in FIG. 13 may be implemented by the processor 601 in FIG. 8 by invoking the computer-executable instruction stored in the memory 602. Alternatively, a function/an implementation process of the processing unit 1102 in FIG. 13 may be implemented by the processor 601 in FIG. 8 by invoking the computer-executable instruction stored in the memory 602, and functions/implementation processes of the receiving unit 1101 and the sending unit 1103 in FIG. 13 may be implemented through the transceiver 604 in FIG. 8.

The network management network element provided in this embodiment of this application may be configured to perform the method in the embodiment corresponding to FIG. 3, FIG. 4, or FIG. 7A and FIG. 7B. Therefore, for a technical effect that can be obtained in this embodiment of this application, refer to the method embodiment corresponding to FIG. 3, FIG. 4, or FIG. 7A and FIG. 7B. Details are not described herein again.

Figure 14:
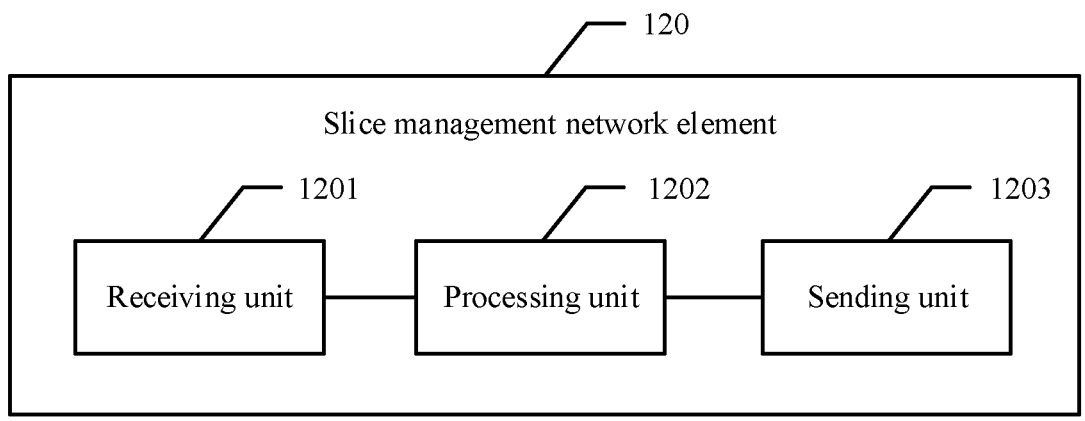
FIG. 14 is a schematic diagram of another embodiment of a slice management network element according to an embodiment of this application.

For example, when function units are divided through integration, FIG. 14 is a schematic structural diagram of a slice management network element 120. As shown in FIG. 14, an embodiment of the slice management network element 120 in this application may include a receiving unit 1201, a processing unit 1202, and a sending unit 1203.

The receiving unit 1201 is configured to receive user quantity limit information of a target network slice and indication information that are sent by a network management network element. The indication information is used to indicate status information of the target network slice or a confidence level of the user quantity limit information.

The processing unit 1202 is configured to control, based on the indication information and the user quantity limit information, a quantity of users served by the target network slice.

According to the solution provided in this embodiment, the quantity of users served by the target network slice may be controlled based on the indication information and the user quantity limit information, such that accuracy of user quantity control can be improved.

In some embodiments of this application, the processing unit 1202 is configured to: when the indication information is used to indicate the status information of the target network slice, control, based on the user quantity limit information and in a control mode corresponding to the status information, the quantity of users served by the target network slice.

In some embodiments of this application, the status information includes a test state or a stable state.

In some embodiments of this application, when the status information is the test state, the control mode is a stepped control mode.

In some embodiments of this application, when the status information is the stable state, the control mode is a one-time control mode.

In some embodiments of this application, the processing unit 1202 is configured to: when the indication information is used to indicate the confidence level of the user quantity limit information, control, based on the user quantity limit information and in a control mode corresponding to the confidence level, the quantity of users served by the target network slice.

In some embodiments of this application, when the confidence level does not satisfy a confidence level requirement, the control mode is a stepped control mode.

In some embodiments of this application, when the confidence level satisfies a confidence level requirement, the control mode is a one-time control mode.

In some embodiments of this application, the receiving unit 1201 is configured to receive service level agreement requirement information that is of the target network slice and sent by the network management network element. The service level agreement requirement information includes the user quantity limit information of the target network slice.

In some embodiments of this application, the receiving unit 1201 is configured to receive user quantity limit information that is sent by the network management network element and that corresponds to information about an area of the target network slice.

The processing unit 1202 is configured to control, based on the indication information and the user quantity limit information corresponding to the information about the area, a quantity of users that are served by the target network slice and in the area indicated by the information about the area.

The slice management network element 120 provided in this embodiment of this application is configured to perform the method performed by the slice management network element in the method embodiment corresponding to FIG. 5 or FIG. 7A and FIG. 7B. Therefore, for understanding of this embodiment of this application, refer to the related descriptions in the method embodiment corresponding to FIG. 5 or FIG. 7A and FIG. 7B.

In this embodiment of this application, the slice management network element 120 is presented in a form of function units divided through integration. The "function unit" herein may be an application-specific integrated circuit, a processor and a memory for executing one or more software or firmware programs, an integrated logic circuit, and/or another device that can provide the foregoing function. In an embodiment, a person skilled in the art may figure out that the slice management network element 120 may be in the form shown in FIG. 8.

For example, the processor 601 in FIG. 8 may invoke the computer-executable instruction stored in the memory 602, such that the slice management network element 120 performs the method performed by the slice management network element in the method embodiment corresponding to FIG. 5 or FIG. 7A and FIG. 7B.

Functions/implementation processes of the receiving unit 1201, the processing unit 1202, and the sending unit 1203 in FIG. 14 may be implemented by the processor 601 in FIG. 8 by invoking the computer-executable instruction stored in the memory 602. Alternatively, a function/an implementation process of the processing unit 1202 in FIG. 14 may be implemented by the processor 601 in FIG. 8 by invoking the computer-executable instruction stored in the memory 602, and functions/implementation processes of the receiving unit 1201 and the sending unit 1203 in FIG. 14 may be implemented through the transceiver 604 in FIG. 8.

The slice management network element provided in this embodiment of this application may be configured to perform the method in the embodiment corresponding to FIG. 5 or FIG. 7A and FIG. 7B. Therefore, for a technical effect that can be obtained in this embodiment of this application, refer to the method embodiment corresponding to FIG. 5 or FIG. 7A and FIG. 7B. Details are not described herein again.

Figure 15:
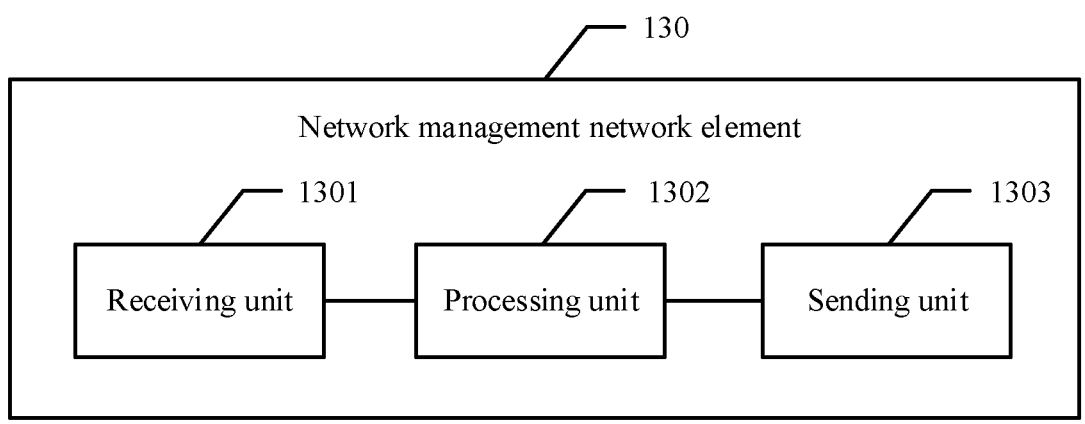
FIG. 15 is a schematic diagram of an embodiment of a network management network element according to an embodiment of this application.

For example, when function units are divided through integration, FIG. 15 is a schematic structural diagram of a network management network element 130. As shown in FIG. 15, an embodiment of the network management network element 130 in this application may include a receiving unit 1301, a processing unit 1302, and a sending unit 1303.

The processing unit 1302 is configured to receive user quantity limit information of a target network slice and indication information. The indication information is used to indicate status information of the target network slice or a confidence level of the user quantity limit information.

The sending unit 1303 is configured to send the user quantity limit information of the target network slice and the indication information to a slice management network element. The indication information and the user quantity limit information are used by the slice management network element to control a quantity of users served by the target network slice.

According to the solution provided in this application, the quantity of users served by the target network slice may be controlled based on the indication information and the user quantity limit information, such that accuracy of user quantity control can be improved.

In some embodiments of this application, the processing unit 1302 is configured to: obtain service level agreement requirement information of the target network slice; and determine the user quantity limit information of the target network slice based on the service level agreement requirement information.

In some embodiments of this application, the sending unit 1303 is configured to send information about an area of the target network slice and user quantity limit information corresponding to the information about the area to the slice management network element. The information about the area and the user quantity limit information corresponding to the information about the area are used by the slice management network element to control a quantity of users that are served by the target network slice and in the area indicated by the information about the area, within a quantity indicated by the user quantity limit information corresponding to the information about the area.

In some embodiments of this application, the sending unit 1303 is configured to send information about a time of the target network slice and user quantity limit information corresponding to the information about the time to the slice management network element. The information about the time and the user quantity limit information corresponding to the information about the time are used to control a quantity of users that are served by the target network slice and in the time indicated by the information about the time, within a quantity indicated by the user quantity limit information corresponding to the information about the time.

The network management network element 130 provided in this embodiment of this application is configured to perform the method performed by the network management network element in the method embodiment corresponding to FIG. 5 or FIG. 7A and FIG. 7B. Therefore, for understanding of this embodiment of this application, refer to the related descriptions in the method embodiment corresponding to FIG. 5 or FIG. 7A and FIG. 7B.

In this embodiment of this application, the network management network element 130 is presented in a form of function units divided through integration. The "function unit" herein may be an application-specific integrated circuit, a processor and a memory for executing one or more software or firmware programs, an integrated logic circuit, and/or another device that can provide the foregoing function. In an embodiment, a person skilled in the art may figure out that the network management network element 130 may be in the form shown in FIG. 8.

For example, the processor 601 in FIG. 8 may invoke the computer-executable instruction stored in the memory 602, such that the network management network element 130 performs the method performed by the network management network element in the method embodiment corresponding to FIG. 5 or FIG. 7A and FIG. 7B.

Functions/implementation processes of the receiving unit 1301, the processing unit 1302, and the sending unit 1303 in FIG. 15 may be implemented by the processor 601 in FIG. 8 by invoking the computer-executable instruction stored in the memory 602. Alternatively, a function/an implementation process of the processing unit 1302 in FIG. 15 may be implemented by the processor 601 in FIG. 8 by invoking the computer-executable instruction stored in the memory 602, and functions/implementation processes of the receiving unit 1301 and the sending unit 1303 in FIG. 15 may be implemented through the transceiver 604 in FIG. 8.

The network management network element 130 provided in this embodiment of this application may be configured to perform the method in the embodiment corresponding to FIG. 5 or FIG. 7A and FIG. 7B. Therefore, for a technical effect that can be obtained in this embodiment of this application, refer to the method embodiment corresponding to FIG. 5 or FIG. 7A and FIG. 7B. Details are not described herein again.

Figure 16:
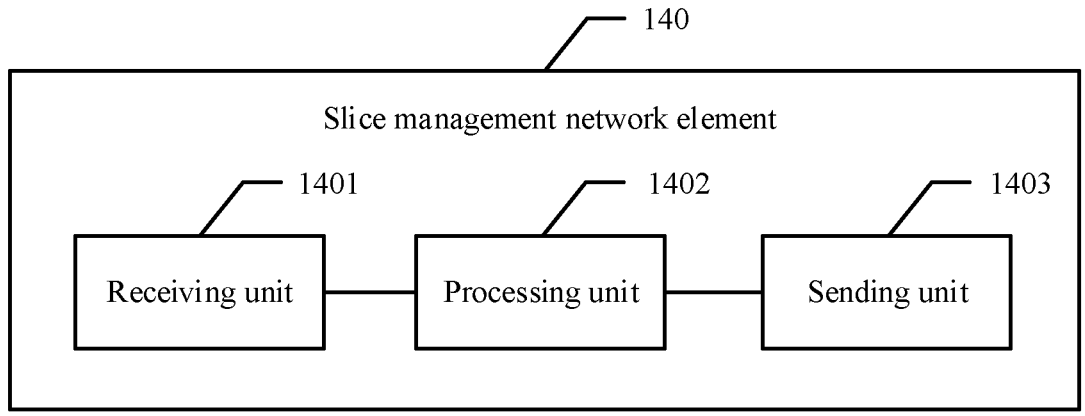
FIG. 16 is a schematic diagram of another embodiment of a slice management network element according to an embodiment of this application.

For example, when function units are divided through integration, FIG. 16 is a schematic structural diagram of a slice management network element 140. As shown in FIG. 16, an embodiment of the slice management network element 140 in this application may include a receiving unit 1401, a processing unit 1402, and a sending unit 1403.

The processing unit 1402 is configured to determine that service experience information of a first network slice cannot satisfy or over-satisfies target service level agreement information of the first network slice due to a first network domain.

The sending unit 1403 is configured to send slice quality information of the first network slice to a network device in the first network domain. The slice quality information is used by the network device to schedule a resource for the first network slice based on the slice quality information.

According to the solution provided in this application, the slice management network element may first precisely locate a network domain (for example, an access network domain) due to which the service experience information of the first network slice cannot satisfy the target service level agreement requirement information, and then provide the slice quality information of the first network slice for a network device in the network domain, such that the network device in the network domain can adjust resource scheduling. This method can avoid blindly adjusting a resource scheduling status of another normally working network domain, and improve accuracy of resource scheduling.

In some embodiments of this application, the receiving unit 1401 is configured to obtain the slice quality information of the first network slice from a data analysis network element or a network management network element.

In some embodiments of this application, the processing unit 1402 is further configured to: when the slice quality information of the first network slice is the service experience information of the first network slice, determine, based on the service experience information of the first network slice, satisfaction level information of the service experience information of the first network slice relative to the target service level agreement requirement information.

In some embodiments of this application, the processing unit 1402 is further configured to determine that the service experience information of the first network slice cannot satisfy or over-satisfies the target service level agreement information of the first network slice.

In some embodiments of this application, the receiving unit 1401 is configured to obtain indication information from the network management network element. The indication information is used to indicate that the service experience information of the first network slice cannot satisfy or over-satisfies the target service level agreement information of the first network slice due to the first network domain.

The processing unit 1402 is further configured to determine, based on the indication information, that the service experience information of the first network slice cannot satisfy or over-satisfies target service level agreement information of the first network slice due to the first network domain.

In some embodiments of this application, the sending unit 1403 is configured to send a request message to the network management network element. The request message is used to request the network domain due to which the service experience information of the first network slice cannot satisfy or over-satisfies the target service level agreement information of the first network slice.

The receiving unit 1401 is configured to receive a response message sent by the network management network element. The response message includes the indication information.

In some embodiments of this application, the receiving unit 1401 is configured to obtain confidence level information from the network management network element. The confidence level information is used to indicate a confidence level of the indication information.

The processing unit 1402 is configured to determine, based on the confidence level information and the indication information, that the service experience information of the first network slice cannot satisfy or over-satisfies target service level agreement information of the first network slice due to the first network domain.

In some embodiments of this application, the service experience information includes service experience information that is of the first network slice and that corresponds to information about an area and/or information about a time.

In some embodiments of this application, the satisfaction level information includes dissatisfaction, satisfaction, and over-satisfaction.

In some embodiments of this application, the processing unit 1402 is configured to: obtain initial service level agreement requirement information of the first network slice; determine at least one piece of service level agreement requirement information based on the initial service level agreement requirement information of the first network slice; and determine one of the at least one piece of service level agreement requirement information as the target service level agreement requirement information.

In some embodiments of this application, the first network domain includes at least one of the following: an access network domain, a core network domain, or a transport network domain.

In some embodiments of this application, the network device includes at least one of the following devices: an access network device, a core network device for allocating a user plane resource or a control plane resource, or a transport network device.

In some embodiments of this application, the service level agreement requirement information includes at least one of the following information: user quantity requirement information of the first network slice, average user experience requirement information of a service, or user satisfaction percentage requirement information of the service. A user satisfaction percentage of the service is a percentage of a quantity of users whose user experience corresponding to the service is not less than a preset value to a total quantity of users of the service.

The slice management network element 140 provided in this embodiment of this application is configured to perform the method performed by the slice management network element in the method embodiment corresponding to FIG. 7C. Therefore, for understanding of this embodiment of this application, refer to the related descriptions in the method embodiment corresponding to FIG. 7C.

In this embodiment of this application, the slice management network element 140 is presented in a form of function units divided through integration. The "function unit" herein may be an application-specific integrated circuit, a processor and a memory for executing one or more software or firmware programs, an integrated logic circuit, and/or another device that can provide the foregoing function. In an embodiment, a person skilled in the art may figure out that the slice management network element 140 may be in the form shown in FIG. 8.

For example, the processor 601 in FIG. 8 may invoke the computer-executable instruction stored in the memory 602, such that the slice management network element 140 performs the method performed by the slice management network element in the method embodiment corresponding to FIG. 7C.

Functions/implementation processes of the receiving unit 1401, the processing unit 1402, and the sending unit 1403 in FIG. 16 may be implemented by the processor 601 in FIG. 8 by invoking the computer-executable instruction stored in the memory 602. Alternatively, a function/an implementation process of the processing unit 1402 in FIG. 16 may be implemented by the processor 601 in FIG. 8 by invoking the computer-executable instruction stored in the memory 602, and functions/implementation processes of the receiving unit 1401 and the sending unit 1403 in FIG. 16 may be implemented through the transceiver 604 in FIG. 8.

The slice management network element 140 provided in this embodiment of this application may be configured to perform the method in the embodiment corresponding to FIG. 7C. Therefore, for a technical effect that can be obtained in this embodiment of this application, refer to the method embodiment corresponding to FIG. 7C. Details are not described herein again.

Figure 17:
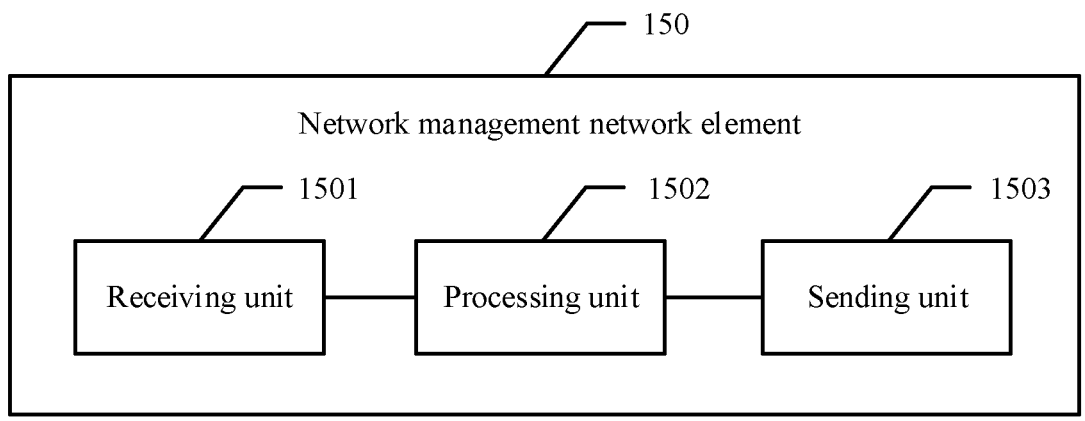
FIG. 17 is a schematic diagram of another embodiment of a network management network element according to an embodiment of this application.

For example, when function units are divided through integration, FIG. 17 is a schematic structural diagram of a network management network element 150. As shown in FIG. 17, an embodiment of the network management network element 150 in this application may include a receiving unit 1501, a processing unit 1502, and a sending unit 1503.

The processing unit 1502 is configured to: determine that service experience information of a first network slice cannot satisfy or over-satisfies target service level agreement information of the first network slice due to a first network domain; and send indication information to a slice management network element, where the indication information is used to indicate that the service experience information of the first network slice cannot satisfy or over-satisfies the target service level agreement information of the first network slice due to the first network domain.

In this embodiment of this application, the network management network element 150 may notify the slice management network element of the first network domain due to which the service experience information of the first network slice cannot satisfy or over-satisfies the target service level agreement information of the first network slice, for example, an access network domain, such that resource scheduling of another normally working network domain can be prevented from being blindly adjusted, and accuracy of resource scheduling can be improved.

In some embodiments of this application, the processing unit 1502 is further configured to determine confidence level information. The confidence level information is used to indicate a confidence level of the indication information.

The sending unit 1503 is further configured to send the confidence level information to the slice management network element.

In some embodiments of this application, the receiving unit 1501 is configured to obtain slice quality information of the first network slice from a data analysis network element. The slice quality information includes at least one of the following information: the service experience information of the first network slice, or satisfaction level information of the service experience information of the first network slice relative to the target service level agreement requirement information.

In some embodiments of this application, the processing unit 1502 is further configured to: when the slice quality information of the first network slice is the service experience information of the first network slice, determine, based on the service experience information of the first network slice, the satisfaction level information of the service experience information of the first network slice relative to the target service level agreement requirement information.

In some embodiments of this application, the processing unit 1502 is further configured to determine that the service experience information of the first network slice cannot satisfy or over-satisfies the target service level agreement information of the first network slice.

In some embodiments of this application, the service experience information includes service experience information that is of the first network slice and that corresponds to information about an area and/or information about a time.

In some embodiments of this application, the receiving unit 1501 is further configured to receive a request message sent by the slice management network element. The request message is used to request the network domain due to which the service experience information cannot satisfy or over-satisfies the target service level agreement information of the first network slice.

The sending unit 1503 is further configured to send a response message to the slice management network element. The response message includes the indication information.

In some embodiments of this application, the processing unit 1502 is further configured to: obtain initial service level agreement requirement information of the first network slice; determine at least one piece of service level agreement requirement information based on the initial service level agreement requirement information of the first network slice; and determine one of the at least one piece of service level agreement requirement information as the target service level agreement requirement information.

In some embodiments of this application, the first network domain includes at least one of the following: an access network domain, a core network domain, or a transport network domain.

In some embodiments of this application, the service level agreement requirement information includes at least one of the following information: user quantity requirement information of the first network slice, average user experience requirement information of a service, or user satisfaction percentage requirement information of the service. A user satisfaction percentage of the service is a percentage of a quantity of users whose user experience corresponding to the service is not less than a preset value to a total quantity of users of the service.

The network management network element 150 provided in this embodiment of this application is configured to perform the method performed by the network management network element in the method embodiment corresponding to FIG. 7C. Therefore, for understanding of this embodiment of this application, refer to the related descriptions in the method embodiment corresponding to FIG. 7C.

In this embodiment of this application, the network management network element 150 is presented in a form of function units divided through integration. The "function unit" herein may be an application-specific integrated circuit, a processor and a memory for executing one or more software or firmware programs, an integrated logic circuit, and/or another device that can provide the foregoing function. In an embodiment, a person skilled in the art may figure out that the network management network element 150 may be in the form shown in FIG. 8.

For example, the processor 601 in FIG. 8 may invoke the computer-executable instruction stored in the memory 602, such that the network management network element 150 performs the method performed by the network management network element in the method embodiment corresponding to FIG. 7C.

Functions/implementation processes of the receiving unit 1501, the processing unit 1502, and the sending unit 1503 in FIG. 17 may be implemented by the processor 601 in FIG. 8 by invoking the computer-executable instruction stored in the memory 602. Alternatively, a function/an implementation process of the processing unit 1502 in FIG. 17 may be implemented by the processor 601 in FIG. 8 by invoking the computer-executable instruction stored in the memory 602, and functions/implementation processes of the receiving unit 1501 and the sending unit 1503 in FIG. 17 may be implemented through the transceiver 604 in FIG. 8.

The network management network element 150 provided in this embodiment of this application may be configured to perform the method in the embodiment corresponding to FIG. 7C. Therefore, for a technical effect that can be obtained in this embodiment of this application, refer to the method embodiment corresponding to FIG. 7C. Details are not described herein again.

Figure 18:
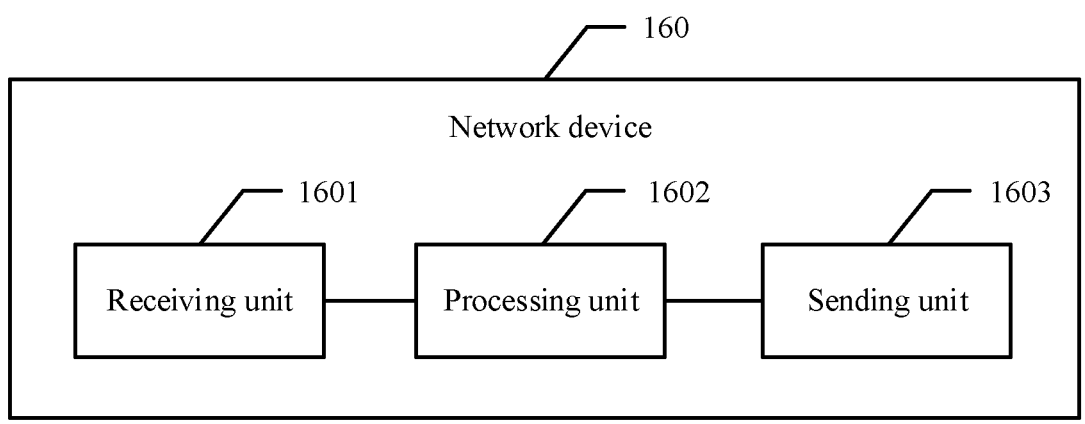
FIG. 18 is a schematic diagram of another embodiment of a network device according to an embodiment of this application.

For example, when the function units are divided through integration, FIG. 18 is a schematic structural diagram of a network device 160. As shown in FIG. 18, an embodiment of the network device 160 in this application may include a receiving unit 1601, a processing unit 1602, and a sending unit 1603.

The processing unit 1602 is configured to determine status information of a first network slice. The status information of the first network slice includes that the first network slice is in an unsigned SLA state or a signed SLA state.

The processing unit 1602 is further configured to schedule a resource for the first network slice based on the status information of the first network slice.

In some embodiments of this application, the processing unit 1602 is configured to: when the network device is an access network device, schedule an air interface resource for the first network slice based on the status information of the first network slice.

In some embodiments of this application, the processing unit 1602 is further configured to determine that status information of a second network slice is that the second network slice is in a signed SLA state.

The processing unit 1602 is configured such that when the status information of the first network slice indicates that the first network slice is in the unsigned SLA state, the processing unit 1602 schedules a resource for the second network slice in preference to the first network slice.

In some embodiments of this application, the processing unit 1602 is further configured to determine that status information of a second network slice is that the second network slice is in an unsigned SLA state.

The processing unit 1602 is configured to: when the status information of the first network slice is the signed SLA state of the first network slice, schedule the resource for the first network slice in preference to the second network slice.

In some embodiments of this application, the processing unit 1602 is configured to determine the status information of the first network slice based on status indication information that is of the first network slice and sent by a network management network element. The status indication information includes the status information of the first network slice.

In some embodiments of this application, the receiving unit 1601 is configured to receive resource configuration information that is of the first network slice and sent by the network management network element. The resource configuration information includes maximum resource configuration information and/or guaranteed resource configuration information. The maximum resource configuration information is used to indicate maximum available resources of the first network slice. The guaranteed resource configuration information is used to indicate a guaranteed available resource of the first network slice. The network device 160 schedules the resource for the first network slice based on the resource configuration information of the first network slice and the status information of the first network slice. The resource configuration information may further include the status information of the first network slice.

In some embodiments of this application, when the network device 160 is an access network device, the maximum resource configuration information is maximum air interface resource configuration information, and/or the guaranteed resource configuration information is guaranteed air interface resource configuration information.

The network device 160 provided in this embodiment of this application is configured to perform the method performed by the network device in the method embodiment corresponding to FIG. 7D. Therefore, for understanding of this embodiment of this application, refer to the related descriptions in the method embodiment corresponding to FIG. 7D.

In this embodiment of this application, the network device 160 is presented in a form of function units divided through integration. The "function unit" herein may be an application-specific integrated circuit, a processor and a memory for executing one or more software or firmware programs, an integrated logic circuit, and/or another device that can provide the foregoing function. In an embodiment, a person skilled in the art may figure out that the network device 160 may be in the form shown in FIG. 8.

For example, the processor 601 in FIG. 8 may invoke the computer-executable instruction stored in the memory 602, such that the network device 160 performs the method performed by the network device in the method embodiment corresponding to FIG. 7D.

Functions/implementation processes of the receiving unit 1601, the processing unit 1602, and the sending unit 1603 in FIG. 18 may be implemented by the processor 601 in FIG. 8 by invoking the computer-executable instruction stored in the memory 602. Alternatively, a function/an implementation process of the processing unit 1602 in FIG. 18 may be implemented by the processor 601 in FIG. 8 by invoking the computer-executable instruction stored in the memory 602, and functions/implementation processes of the receiving unit 1601 and the sending unit 1603 in FIG. 18 may be implemented through the transceiver 604 in FIG. 8.

The network device 160 provided in this embodiment of this application may be configured to perform the method in the embodiment corresponding to FIG. 7D. Therefore, for a technical effect that can be obtained in this embodiment of this application, refer to the method embodiment corresponding to FIG. 7D. Details are not described herein again.

Figure 19:
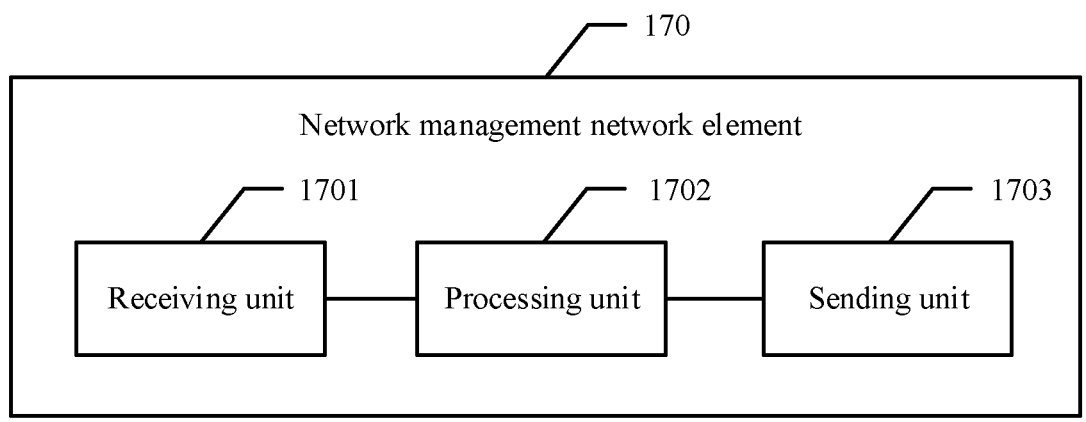
FIG. 19 is a schematic diagram of another embodiment of a network management network element according to an embodiment of this application.

For example, when function units are divided through integration, FIG. 19 is a schematic structural diagram of a network management network element 170. As shown in FIG. 19, an embodiment of the network management network element 170 in this application may include a receiving unit 1701, a processing unit 1702, and a sending unit 1703.

The processing unit 1702 is configured to determine status information of a first network slice. The status information of the first network slice includes that the first network slice is in an unsigned SLA state or a signed SLA state.

The sending unit 1703 is configured to send the status information of the first network slice to a network device. The status information of the first network slice is used by the network device to schedule a resource for the first network slice.

In this embodiment of this application, the network management network element 170 can notify the status information of the first network slice to the network device in time, such that the network device performs corresponding resource scheduling based on an SLA state of the first network slice.

In some embodiments of this application, the processing unit 1702 is configured to: determine resource configuration information of the first network slice. The resource configuration information includes maximum resource configuration information and/or guaranteed resource configuration information. The maximum resource configuration information is used to indicate maximum available resources of the first network slice. The guaranteed resource configuration information is used to indicate a guaranteed available resource of the first network slice. The network management network element 170 sends the resource configuration information of the first network slice to the network device. The resource configuration information is used by the network device to schedule the resource for the first network slice based on the resource configuration information. The resource configuration information may further include the status information of the first network slice.

In some embodiments of this application, when the network device is an access network device, the maximum resource configuration information is maximum air interface resource configuration information, and/or the guaranteed resource configuration information is guaranteed air interface resource configuration information.

In some embodiments of this application, the resource configuration information includes the status information of the first network slice.

The network management network element 170 provided in this embodiment of this application is configured to perform the method performed by the network management network element in the method embodiment corresponding to FIG. 7D. Therefore, for understanding of this embodiment of this application, refer to the related descriptions in the method embodiment corresponding to FIG. 7D.

In this embodiment of this application, the network management network element 170 is presented in a form of function units divided through integration. The "function unit" herein may be an application-specific integrated circuit, a processor and a memory for executing one or more software or firmware programs, an integrated logic circuit, and/or another device that can provide the foregoing function. In an embodiment, a person skilled in the art may figure out that the network management network element 170 may be in the form shown in FIG. 8.

For example, the processor 601 in FIG. 8 may invoke the computer-executable instruction stored in the memory 602, such that the network management network element 170 performs the method performed by the network management network element in the method embodiment corresponding to FIG. 7D.

Functions/implementation processes of the receiving unit 1701, the processing unit 1702, and the sending unit 1703 in FIG. 19 may be implemented by the processor 601 in FIG. 8 by invoking the computer-executable instruction stored in the memory 602. Alternatively, a function/an implementation process of the processing unit 1702 in FIG. 19 may be implemented by the processor 601 in FIG. 8 by invoking the computer-executable instruction stored in the memory 602, and functions/implementation processes of the receiving unit 1701 and the sending unit 1703 in FIG. 19 may be implemented through the transceiver 604 in FIG. 8.

The network management network element provided in this embodiment of this application may be configured to perform the method in the embodiment corresponding to FIG. 7D. Therefore, for a technical effect that can be obtained in this embodiment of this application, refer to the method embodiment corresponding to FIG. 7D. Details are not described herein again.

In the devices in FIG. 9 to FIG. 19 of this application, a communications connection is implemented between the components. To be more specific, the processing unit (or the processor), the storage unit (or the memory), and the transceiver unit (the transceiver) communicate with each other through an internal connection path, to transfer a control signal and/or a data signal. The foregoing method embodiments of this application may be applied to the processor, or the processor implements the steps in the foregoing method embodiments. The processor may be an integrated circuit chip and has a signal processing capability. In an implementation process, the steps in the foregoing method embodiments may be performed using a hardware integrated logical circuit in the processor, or using instructions in a form of software. The processor may be a central processing unit (CPU), a network processor (NP), a combination of a CPU and an NP, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, the steps, and logical block diagrams that are disclosed in this application. The general-purpose processor may be a microprocessor, or the processor may be any conventional processor or the like. Steps of the methods disclosed in this application may be directly executed and completed using a hardware decoding processor, or may be executed and completed using a combination of hardware and software modules in a decoding processor. The software module may be located in a mature storage medium in the art, such as a random-access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. Although only one processor is shown in the figure, the apparatus may include a plurality of processors, or the processor includes a plurality of processing units. For example, the processor may be a single-core (single-CPU) processor or a multi-core (multi-CPU) processor.

The memory is configured to store a computer instruction executed by the processor. The memory may be a storage circuit or a memory. The memory may be a volatile memory or a non-volatile memory, or may include both a volatile memory and a non-volatile memory. The non-volatile memory may be a read-only memory, a programmable read-only memory, an erasable programmable read-only memory, an electrically erasable programmable read-only memory, or a flash memory. The volatile memory may be a random-access memory, and is used as an external cache. The memory may be independent of the processor, or may be a storage unit in the processor. This is not limited herein. Although only one memory is shown in the figure, the apparatus may alternatively include a plurality of memories, or the memory includes a plurality of storage units.

The transceiver is configured to implement content exchange between the processor and another unit or network element. For example, the transceiver may be a communications interface of the apparatus, may be a transceiver circuit or a communications unit, or may be a transceiver. The transceiver may alternatively be a communications interface or a transceiver circuit of the processor. Optionally, the transceiver may be a transceiver chip. The transceiver may further include a sending unit and/or a receiving unit. In a possible implementation, the transceiver may include at least one communications interface. In another possible implementation, the transceiver may alternatively be a unit implemented in a form of software. In the embodiments of this application, the processor may interact with another unit or network element through the transceiver. For example, the processor obtains or receives content from another network element through the transceiver. If the processor and the transceiver are two physically separated components, the processor may exchange content with another unit in the apparatus without using the transceiver.

In a possible implementation, the processor, the memory, and the transceiver may be connected to each other using a bus. The bus may be a peripheral component interconnect (PCI) bus, an extended industry standard architecture (EISA) bus, or the like. The bus may be classified into an address bus, a data bus, a control bus, and the like.

In the embodiments of this application, the term such as "example" or "for example" is used to represent giving an example, an illustration, or a description. Any embodiment or design solution described using "example" or "for example" in the embodiments of this application shall not be construed as being more preferred or more advantageous than another embodiment or design solution. Thus, use of the term such as "example" or "for example" is simply intended to present a relative concept in an example manner.

In the embodiments of this application, for ease of understanding, a plurality of examples are used for description. However, these examples are merely examples, but this does not mean that these examples are optimal implementations for implementing this application.

In the embodiments of this application, for ease of description, a request message, a response message, and names of various other messages are used. However, these messages are merely used as examples to describe content that needs to be carried or a function that needs to be implemented. Specific names of the messages are not limited in this application. For example, the messages may be a first message, a second message, and a third message. These messages may be some specific messages, or may be some fields in messages. These messages may alternatively represent various service operations.

All or some of the foregoing embodiments may be implemented using software, hardware, firmware, or any combination thereof. When the software is used for implementation, all or some of the embodiments may be implemented in a form of a computer program product.

The computer program product includes one or more computer instructions. When the computer-executable instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk or solid state drive (SSD)), or the like.

The technical solutions provided in this application are described in detail above. The principle and implementation of this application are described herein through examples in this application. The descriptions about the embodiments are merely provided to help understand the methods and core ideas of this application. In addition, a person of ordinary skill in the art can make variations to the implementations and application scopes based on the ideas of this application. Therefore, the content of this specification shall not be construed as a limitation to this application.

What is claimed is:

1. A method, comprising:
obtaining, by a network management network element, information about a resource scheduled by a network device for a first network slice;
obtaining, by the network management network element, slice quality information of the first network slice from a data analysis device; and
updating, by the network management network element, resource configuration information of the first network slice based on the information about the resource and the slice quality information.

2. The method of claim 1, further comprising sending, by the network management network element, updated resource configuration information to the network device.

3. The method of claim 1, wherein the slice quality information of the first network slice comprises service experience information of the first network slice.

4. The method of claim 3, wherein the service experience information comprises experience information at a service granularity of the first network slice.

5. The method of claim 4, wherein the experience information at the service granularity of the network slice comprises first quality information at the service granularity or second quality information at a user granularity of a service.

6. The method of claim 5, wherein the first quality information at the service granularity comprises an average user experience value of the service or user experience value distribution information of the service.

7. The method of claim 1, wherein the resource configuration information comprises air interface resource configuration information when the network device is an access network device.

8. The method of claim 1, wherein the resource configuration information comprises at least one of maximum resource configuration information or guaranteed resource configuration information, wherein the maximum resource configuration information indicates maximum available resources of the first network slice, and wherein the guaranteed resource configuration information indicates a guaranteed available resource of the first network slice.

9. An apparatus, comprising:
a memory configured to store computer instructions; and
one or more processors coupled to the memory and configured to execute the computer instructions in the memory to cause the apparatus to:
obtain information about a resource scheduled by a network device for a first network slice;
obtain slice quality information of the first network slice from a data analysis device; and
update resource configuration information of the first network slice based on the information about the resource and the slice quality information.

10. The apparatus of claim 9, wherein the one or more processors are further configured to execute the computer instructions in the memory to cause the apparatus to send updated resource configuration information to the network device.

11. The apparatus of claim 9, wherein the slice quality information of the first network slice comprises service experience information of the first network slice.

12. The apparatus of claim 11, wherein the service experience information of the first network slice comprises experience information at a service granularity of the first network slice.

13. The apparatus of claim 12, wherein the experience information at the service granularity of the first network slice comprises first quality information at the service granularity or second quality information at a user granularity of a service.

14. The apparatus of claim 13, wherein the first quality information at the service granularity comprises an average user experience value of the service or user experience value distribution information of the service.

15. The apparatus of claim 9, wherein the resource configuration information comprises air interface resource configuration information when the network device is an access network device.

16. The apparatus of claim 9, wherein the resource configuration information comprises at least one of maximum resource configuration information or guaranteed resource configuration information, wherein the maximum resource configuration information indicates maximum available resources of the first network slice, and wherein the guaranteed resource configuration information indicates a guaranteed available resource of the first network slice.

17. A non-transitory computer readable medium comprising instructions that, when executed by one or more processors, cause the one or more processors to:
obtain information about a resource scheduled by a network device for a first network slice;
obtain slice quality information of the first network slice from a data analysis device; and
update resource configuration information of the first network slice based on the information about the resource and the slice quality information.

18. The non-transitory computer readable medium of claim 17, wherein the resource configuration information comprises at least one of maximum resource configuration information or guaranteed resource configuration information, wherein the maximum resource configuration information indicates maximum available resources of the first network slice, and wherein the guaranteed resource configuration information indicates a guaranteed available resource of the first network slice.

19. The non-transitory computer readable medium of claim 17, wherein the information about the resource comprises at least one of information of physical resource block, information of processor resource, or information of storage resource.

20. The method of claim 1, wherein the information about the resource comprises at least one of information of physical resource block, information of processor resource, or information of storage resource.

21. The apparatus of claim 9, wherein the information about the resource comprises at least one of information of physical resource block, information of processor resource, or information of storage resource.

* * * * *